United States Patent
Uesaki et al.

(10) Patent No.: US 7,212,205 B2
(45) Date of Patent: May 1, 2007

(54) CURVED SURFACE IMAGE PROCESSING APPARATUS AND CURVED SURFACE IMAGE PROCESSING METHOD

(75) Inventors: Akira Uesaki, Takatsuki (JP); Akio Nishimura, Sakai (JP); Tadashi Kobayashi, Ibaraki (JP); Yoshiyuki Mochizuki, Suita (JP); Kazu Segawa, Ibaraki (JP); Makoto Yamakura, Ibaraki (JP); Kazutaka Nishio, Ibaraki (JP); Hitoshi Araki, Hirakata (JP); Kenji Nishimura, Nabari (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 426 days.

(21) Appl. No.: 10/703,508

(22) Filed: Nov. 10, 2003

(65) Prior Publication Data

US 2004/0090437 A1  May 13, 2004

(30) Foreign Application Priority Data

| Nov. 12, 2002 | (JP) | ............................. 2002-328052 |
| Nov. 13, 2002 | (JP) | ............................. 2002-329441 |
| Nov. 13, 2002 | (JP) | ............................. 2002-329442 |
| Nov. 13, 2002 | (JP) | ............................. 2002-329443 |

(51) Int. Cl.
    *G06T 15/00* (2006.01)
(52) U.S. Cl. ....................... 345/423; 345/442; 345/419
(58) Field of Classification Search ................ 345/419, 345/420, 441–442, 423
See application file for complete search history.

(56) References Cited

U.S. PATENT DOCUMENTS

| 5,278,948 A |   | 1/1994  | Luken, Jr. ................... 395/123 |
| 5,377,320 A |   | 12/1994 | Abi-Ezzi et al. ............ 395/163 |
| 5,900,884 A |   | 5/1999  | Minami et al. ............. 345/442 |
| 5,995,109 A | * | 11/1999 | Goel et al. .................. 345/423 |

(Continued)

FOREIGN PATENT DOCUMENTS

JP    3-201073     9/1991

(Continued)

OTHER PUBLICATIONS

Rogers et al., Mathematical Elements for Computer Graphics, McGraw Hill College Division, Mar. 1999.*

(Continued)

*Primary Examiner*—Phu K. Nguyen
(74) *Attorney, Agent, or Firm*—Wenderoth, Lind & Ponack, L.L.P.

(57) ABSTRACT

A curved surface image processing apparatus 100 according to the present invention that can render an object at higher speed and in higher quality by performing image processing using NURBS data includes: a data input unit 101 for receiving NURBS data; a coordinate transformation unit 102 for performing coordinate transformation on NURBS data; an animation control unit 103 for controlling animation data of each frame to be rendered; a data transformation unit 104 for transforming NURBS data into rational Bezier data; a patch division unit 105 for subdividing a rational Bezier surface patch; a normal determination unit 106 for calculating normals of control points of a divided surface patch; a perspective transformation unit 107 for performing perspective transformation on a divided surface patch; and a rendering unit 108 for rendering a surface patch.

39 Claims, 45 Drawing Sheets

U.S. PATENT DOCUMENTS

| | | | | |
|---|---|---|---|---|
| 6,057,848 | A | * | 5/2000 | Goel .......................... 345/423 |
| 6,100,894 | A | * | 8/2000 | Goel .......................... 345/423 |
| 6,211,883 | B1 | * | 4/2001 | Goel .......................... 345/423 |
| 6,336,865 | B1 | * | 1/2002 | Kinjo .......................... 463/34 |
| 6,462,738 | B1 | | 10/2002 | Kato .......................... 345/428 |
| 6,906,718 | B1 | * | 6/2005 | Papakipos et al. .......... 345/441 |
| 2005/0073520 | A1 | * | 4/2005 | Papakipos et al. .......... 345/420 |

FOREIGN PATENT DOCUMENTS

| | | |
|---|---|---|
| JP | 6-223197 | 8/1994 |
| JP | 8-329261 | 12/1996 |
| JP | 11-7544 | 1/1999 |
| JP | 2001-52194 | 2/2001 |
| JP | 2001-218977 | 8/2001 |
| JP | 2001-331812 | 11/2001 |

OTHER PUBLICATIONS

Prautzsh, A Short proof of the Oslo Algorithm, Computer Aid Design, vol. 1, pp. 95-96, 1984.*

Bohm, "Inserting New Knots into B-Spline Curves," Computer Aid Design, pp. 199-201, 1980.*

Rockwood, A., Heaton, K., Davis, T., " *Real-Time Rendering of Trimmed Surfaces*", Computer Graphics, vol. 23, No. 3, Jul. 31, 1989, pp. 107-116, XP002359342.

Kumar S., et al., " *Interactive Display of Large Nurbs Models*", IEEE Transactions of Visualization and Computer Graphics, IEEE Service Center, Los Alamitos, CA, US, vol. 2, No. 4, Dec. 1, 1996, XP000636822.

Kumar S., et al., " *Efficient Rendering Of Trimmed Nurbs Surfaces*", Computer Aided Design, Elsevier Publishers BV., Barking, GB, vol. 27, No. 7, Jul. 1995, pp. 509-521, XP004022775.

Hui Xie, et al., " *A Physics-Based Framework For Subdivision Surface Design With Automatic Rules Control*", Computer Graphics and Applications, 2002. Proceedings. 10th Pacific Conference on Beijing, China 9-11 Oct. 2002, Los Alamitos, CA, USA, IEEE Comput. Soc, US, Oct. 9, 2002, pp. 304-315, XP010624914.

Guthe, M., et al., " *Fast And Memory Efficient View-Dependent Trimmed Nurbs Rendering*", Computer Graphics and Applications, 2002. Proceedings. 10th Pacific Conference on Beijing, China 9-11 Oct. 2002, Los Alamitos, CA, USA, IEEE Comput. Soc, US, Oct. 9, 2002, pp. 204-213, XP010624904.

Kahlesz, F., Balazs, A., Klein, R., " *Multiresolution Rendering By Sewing Trimmed Nurbs Surfaces*", Symposium on Solid Modeling and Applications, Jun. 17, 2002, pp. 281-288, XP002359343.

Jieqing, Feng et al., " *B-Spline Free-Form Deformation Of Polygonal Objects Through Fast Functional Composition*", Geometric Modeling and Processing 2000. Theory and Applications. Proceedings Hong Kong, China 10-12 Apr. 2000, Los Alamitos, CA, USA, IEEE Comput. Soc, US, Apr. 10, 2000, pp. 408-414, XP010377970.

Hui, Xie et al., " *Automatic Knot Determination Of Nurbs For Interactive Geometric Design*", Shape Modeling and Applications, SMI 2001 International Conference on May 7-11, 2001, pp. 267-276, XP010541341.

Shantz, M., et al. " *Rendering Trimmed Nurbs With Adaptive Forward Differencing*", Computer Graphics, New York, NY, US, vol. 22, No. 4, Aug. 1, 1988, pp. 189-198, XP00561667.

\* cited by examiner

Initial knot vector u[0] < u[1] < u[2] < u[3] < u[4] < u[5] < u[6] < u[7]

Knot insertion

Final knot vector u'[0] < u'[1] < u'[2] < u'[3] = u'[4] = u'[5]

Initial knot vector  u[0]<u[1]<u[2]<u[3]<u[4] ...

Initial control points  Q[0], Q[1], Q[2], Q[3], Q[4] ...

Insert one knot  u[0]<u[1]<u[2]<u[3]=~u<u[4] ...

Q[0], Q'[1], Q'[2], Q[2], Q[3], Q[4] ...

Insert one more knot  u[0]<u[1]<u[2]<u[3]=~u=u[3]<u[4] ...

Q[0], Q'[1], Q"[2], Q'[2], Q[2], Q[3] ...

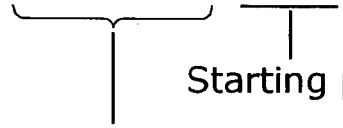

Starting point of NURBS surface

Unnecessary control points

FIG. 25

Initial knot vector  u[0]<u[1]<u[2]=u[3]<u[4] ...

Initial control points  Q[0], Q[1], Q[2], Q[3], Q[4] ...

Insert one knot  u[0]<u[1]<u[2]=u[3]=~u<u[4] ...

Q[0], Q'[1], Q[1], Q[2], Q[3], Q[4] ...

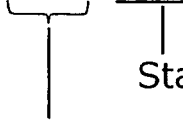

Starting point of NURBS surface

Unnecessary control points

Initial knot vector  u[0]<u[1]<u[2]<u[3]=u[4] ...

Initial control points  Q[0], Q[1], Q[2], Q[3], Q[4] ...

Insert one knot  u[0]<u[1]<u[2]<u[3]=~u=u[4] ...

Q[0], Q[1], Q'[2], Q[2], Q[3], Q[4] ...

Starting point of NURBS surface

Unnecessary control points

Ultimate knot vector         Final control points u'[0]
:
:                            Q'[0]
u'[j]                        Q'[1]    Unnecessary
:             :      control points
u'[3]   Multiplexed          Q'[k−4]
:
u'[k]                        :
                             Q'[I'−1]
:
u'[I'+3]

FIG. 35A
3501

| Maximum area | Subdivision level of silhouette edge forming patch |
|---|---|
| $0 < A_p + \|A_m\| < MA_0$ | 0 |
| $MA_0 <= A_p + \|A_m\| < MA_1$ | 1 |
| $MA_1 <= A_p + \|A_m\| < MA_2$ | 2 |
| $MA_2 <= A_p + \|A_m\| < MA_3$ | 3 |
| $MA_3 <= A_p + \|A_m\| < MA_4$ | 4 |
| $MA_4 <= A_p + \|A_m\|$ | 5 |

FIG. 35B
3502

| Signed area | Subdivision level |
|---|---|
| $0 <= A_p < A_0$ | 0 |
| $A_0 <= A_p < A_1$ | 1 |
| $A_1 <= A_p < A_2$ | 2 |
| $A_2 <= A_p < A_3$ | 3 |
| $A_3 <= A_p < A_4$ | 4 |
| $A_4 <= A_p$ | 5 |

| Signed area | Subdivision level of silhouette edge forming patch |
|---|---|
| $0 < A_p + |A_m| < A_0$ | 0 |
| $A_0 <= A_p + |A_m| < A_1$ | 1 |
| $A_1 <= A_p + |A_m| < A_2$ | 2 |
| $A_2 <= A_p + |A_m| < A_3$ | 3 |
| $A_3 <= A_p + |A_m| < A_4$ | 4 |
| $MA_4 <= A_p + |A_m|$ | 5 |

| Curvature parameter C | Subdivision level |
|---|---|
| $0 <= C < C_0$ | 0 |
| $C_0 <= C < C_1$ | 1 |
| $C_1 <= C < C_2$ | 2 |
| $C_2 <= C < C_3$ | 3 |
| $C_3 <= C < C_4$ | 4 |
| $C_4 <= C$ | 5 |

| Curvature parameter | Maximum subdivision level |
|---|---|
| $0 <= C < \varepsilon_0$ | 0 |
| $\varepsilon_0 <= C < \varepsilon_1$ | 1 |
| $\varepsilon_1 <= C < \varepsilon_2$ | 2 |
| $\varepsilon_2 <= C < \varepsilon_3$ | 3 |
| $\varepsilon_3 <= C < \varepsilon_4$ | 4 |
| $\varepsilon_4 <= C$ | 5 |

| Signed area | Subdivision level |
|---|---|
| $0 <= A_p < A_0$ | CLIP(MAXL-5) |
| $A_0 <= A_p < A_1$ | CLIP(MAXL-4) |
| $A_1 <= A_p < A_2$ | CLIP(MAXL-3) |
| $A_2 <= A_p < A_3$ | CLIP(MAXL-2) |
| $A_3 <= A_p < A_4$ | CLIP(MAXL-1) |
| $A_4 <= A_p$ | MAXL |

| Control point | Coordinate |
|---|---|
| $P_{00}$ | $(x_{00}, y_{00}, z_{00})$ |
| $P_{01}$ | $(x_{01}, y_{01}, z_{01})$ |
| $P_{02}$ | $(x_{02}, y_{02}, z_{02})$ |
| ... | ... |
| $P_{33}$ | $(x_{03}, y_{03}, z_{03})$ |

| Control point | Normal data |
|---|---|
| $P_{00}$ | $(nx_{00}, ny_{00}, nz_{00})$ |
| $P_{03}$ | $(nx_{03}, ny_{03}, nz_{03})$ |
| $P_{30}$ | $(nx_{30}, ny_{30}, nz_{30})$ |
| $P_{33}$ | $(nx_{33}, ny_{33}, nz_{33})$ |

CURVED SURFACE IMAGE PROCESSING APPARATUS AND CURVED SURFACE IMAGE PROCESSING METHOD

BACKGROUND OF THE INVENTION

(1) Field of the Invention

The present invention relates to a curved surface image processing apparatus for rendering a three-dimensional (3D) object using graphic information described by a non uniform rational B-spline (NURBS) function in the field of 3D computer graphics, and a method thereof.

(2) Description of the Background Art

With recent significant improvement in computer performance in the field of image processing, CAGD (Computer Aided Geometric Design) systems and geometric modeling systems have increasingly developed so as to handle free-form surfaces for representing complicated shapes. Among a number of representation methods for creating free-form surfaces, NURBS curves and NURBS surfaces have an advantage in their ability of representing smooth surfaces using fewer control points. In addition to the control points, use of NURBS curves and NURBS surfaces make it possible to change shapes locally because of a lot of parameters such as weights and knots as well as control points for controlling the shapes, and to represent conic sections such as circular arcs, straight lines and parabolas in an integrated manner. Because of such excellent representation ability, techniques for rendering image models created using NURBS data have been demanded.

Four conventional rendering techniques (A~D) using NURBS data and their problems will be described below in this order.

First, as the technique A, the background art of the general processing of generating curved surface images using NURBS data will be explained.

FIG. 3A and FIG. 3B are diagrams showing examples of a NURBS curve and a NURBS surface. In FIG. 3A, a NURBS curve 31 is a parametric curve represented by a parameter u, and the shape thereof is controlled by a plurality of control points 32, weights on respective control points and a collection of knots (knot vector) that indicate how much influence respective control points have on a parametric curve with a variation in the parameter u. The control points 32 are not always located on the NURBS curve 31.

In FIG. 3B, a NURBS surface 33 is a parametric surface represented by parameters u and v, and the shape thereof is controlled by a plurality of control points 34, weights thereon and a collection of knots (knot vector), as in the case of the NURBS curve 31.

Generally, a NURBS surface S(u, v) is expressed by Equation 1.

$$S(u, v) = \frac{\sum_{i=0}^{m-1} \sum_{j=0}^{n-1} B_{i,m}(u) B_{j,n}(v) w_{ij} Q_{ij}}{\sum_{i=0}^{m-1} \sum_{j=0}^{n-1} B_{i,m}(u) B_{j,n}(v) w_{ij}} \quad (1)$$

In Equation 1, w is a weight and Q is a control point. Also, a function B here is referred to as a B-spline basis function, and expressed by Equation 2 and Equation 3 using de Boor-Cox recurrence formula.

$$B_{i,1}(t) = \begin{cases} 1 & (t_i \leq t < t_{i+1}) \\ 0 & (t < t_i, t \geq t_{i+1}) \end{cases} \quad (2)$$

$$B_{i,k}(t) = \frac{t - t_i}{t_{i+k-1} - t_i} B_{i,k-1}(t) + \frac{t_{i+k} - t}{t_{i+k} - t_{i+1}} B_{i+1,k-1}(t) \quad (3)$$

In Equation 2 and Equation 3, k is a degree, t is a parameter, and $t_i$ is a knot.

The existing image processing of NURBS data has a problem that these equations require an extremely large amount of computation and thus causes a limited amount of NURBS data that can be represented by an image processing system that requires real time processing. In addition, a circuit for integrating such a system into hardware increases in size, which is an obstacle to miniaturization.

In order to reduce an amount of computation, a conventional curved surface image processing apparatus that performs the following processing on a cubic (degree=3) NURBS surface at a preprocessing stage (See Background Art 1, Japanese Laid-Open Patent Application No. 2001-218977, pp. 7–23, for example).

In this background art, the recurrence formulas of Equation 2 and Equation 3 are expanded into ordinary cubic equations without being calculated recursively, and by substituting knot vectors in these equations, coefficient matrices (4×4) for obtaining B-spline basis functions are computed. These coefficient matrices are calculated for all the control points that define a NURBS surface. On the other hand, in real-time processing, each point on a NURBS surface is computed using control points and a coefficient matrix with variation in parameters u and v.

In order to enhance the computation processing speed, the curved surface image processing apparatus according to this background art introduces a differential matrix obtained by multiplying a coefficient matrix by a matrix of Δu and Δv which are differentials of respective parameters u and v. It computes each point on a NURBS surface recursively using control points, a differential matrix and a knot vector with variation in parameters u and v.

Next, as the technique B, the background art for performing polygon division of a NURBS surface will be explained.

First, the common definition of a parametric surface such as a Bezier surface and a B-spline surface will be described. There are several types of free-form surfaces such as a Bezier surface and a B-spline surface, but a NURBS surface is widely used as a more popular representation style of free-form surfaces. In 3D space, a parametric surface is defined as a continuous sequence of points (x, y, z) on the surface using two parameters u and v.

More specifically, one 3D coordinate (x, y, z) is obtained for a pair of parameters u and v. In order to describe the relationship between them mathematically, control points having weights and basis functions are used. A control point is a 3D coordinate necessary for determining the location and the outline of the shape of a parametric surface, and the weight thereof is a parameter indicating how much influence the control point gives on the surface, or, more plain and simple, how much the surface is pulled by the control point. The 3D coordinate and the weight of the control point are described by a two-dimensional (2D) array having discrete indices i and j corresponding to the respective directions of the parameters u and v. The basis function is a function for corresponding the control points and the detailed shape of the parametric surface.

Here, a coordinate <P>=(px, py, pz) of a point on a curved surface for a pair of parameters u and v is expressed by the following equations, where the 3D coordinate of the control point is <Q[i][j]>=(qx[i][j], qy[i][j], qz[i][j]), the weight of the control point is qw[i][j], the basis function in the u direction is B[n][i](u), and the basis function in the v direction is B[m][i](v). Note that the mark < > indicates a vector.

$$<P>=(\Sigma\Sigma B[n][i](u)*B[m][j](v)*qw[i][j]*<Q[i][j]>)/\\(\Sigma\Sigma B[n][i](u)*B[m][j](v)*qw[i][j])$$

Namely, $$px=(\Sigma\Sigma B[n][i](u)*B[m][j](v)*qw[i][j]*qx[i][j])/(\Sigma\Sigma B[n][i](u)*B[m][j](v)*qw[i][j])$$

$$py=(\Sigma\Sigma B[n][i](u)*B[m][j](v)*qw[i][j]*qy[i][j])/(\Sigma\Sigma B[n][i](u)*B[m][j](v)*qw[i][j])$$

$$pz=(\Sigma\Sigma B[n][i](u)*B[m][j](v)*qw[i][j]*qz[i][j])/(\Sigma\Sigma B[n][i](u)*B[m][j](v)*qw[i][j])$$

Here, I=0, 1, 2, ..., (I−1), j=0, 1, 2, ..., (J−1), and the mark $\Sigma$ indicates the sum of i and j in the above ranges. I is the number of control points in the u direction and J is the number of control points in the v direction. And n and m are degrees of the basis functions in the u direction and the v direction.

Considering a NURBS surface as a parametric surface, a basis function is defined by a knot vector as well as parameters and a degree (or an order).

This knot vector is a sequence of parameter values in ascending order of the values at certain intervals that characterizes the shape of a curved surface. Different basis functions can be defined using degrees and knot vectors different from each other in the directions of the parameters u and v. The basis functions B[n][i](u) and B[m][j](v) of a NURBS surface are expressed by the following Cox-de Boor's recurrence formula using the knot vector in the u direction (u[0], u[1], ..., u[I+n+1]) and the knot vector in the v direction (v[0], v[1], ..., v[J+m+1]).

As for the u direction, $$B[n][i](u) = [(u - u[i])/(u[i+n] - u[i])] * B[n-1][i](u) + \\ [(u[i+n+1] - u)/(u[i+n+1] - u[i+1])] * B[n-1][i+1](u)$$

In the above equation, the degree n is not 0. Since the above equation is a recurrence formula, the basis function of n=3 is obtained based on the basis function of n=2. Repeat of this calculation requires the basis function of n=0, but it is assumed here that the basis function B[0][i](u) of n=0 has the value 1 only when u is in the range of (u[i], u[i+1]), while it has the value 0 in other cases. Values of elements of a knot vector are same as values of indices or monotonously increase as the indices increase, and a coefficient expressed by a fraction in the above recurrence formula is defined to be 0 when a denominator is 0. The above recurrence formula may be represented using an order instead of a degree. An order is a value of a degree plus 1. As for the v direction, the following basis function is defined in the same manner.

$$B[m][j](v) = [(v - v[j])/(v[j+m] - v[j])] * B[m-1][j](v) + \\ [(v[j+m+1] - v)/(v[j+m+1] - v[j+1])] * B[m-1][j+1](v)$$

When a NURBS surface is divided into polygons, a 3D coordinate <P>=(px, py, pz) needs to be obtained by substituting parameters necessary for the above recurrence formula.

For the sake of simplicity, a NURBS curve, not a NURBS surface, will be explained first. In FIG. 19, a NURBS curve 1901 is defined by a degree n=3, a plurality of control points (Q[0], Q[1], Q[2] and Q[3]), and a knot vector having 8 elements (u[0], u[1], ..., u[7]). A parameter for drawing this NURBS curve 1901 is only u, and the 2D coordinate <P>=(px, py) is expressed as follows.

$$<P>=(\Sigma B[n][i](u)*qw[i]*<Q[i]>)/(\Sigma B[n][i](u)*qw[i])$$

$$px=(\Sigma B[n][i](u)*qw[i]*qx[i])/(\Sigma B[n][i](u)*qw[i])$$

$$py=(\Sigma B[n][i](u)*qw[i]*qy[i])/(\Sigma B[n][i](u)*qw[i])$$

A NURBS curve is defined in 2D space which is easy to understand visually in FIG. 19 and the above equations, but it may be a NURBS curve in 3D space by adding the definition of a Z coordinate pz. The relationship between the number of elements of a knot vector, a degree and the number of control points can be obtained by the number of elements of the knot vector (I+n+1) where the degree is n and the number of control points is I. In a case of FIG. 19, the number of elements of the knot vector is 4+3+1=8. Also, in FIG. 19, the effective range of the knot vector for drawing the NURBS curve 1901 is a range of (u[3], u[4]). As mentioned above, at least 4 control points are necessary for drawing a NURBS curve of a degree n=3. Addition of one control point at a fixed degree n=3 means addition of one element of a knot vector, and thus the effective range of the knot vector for drawing the NURBS curve expands to a range of (u[3], u[5]). FIG. 20 shows a NURBS curve obtained by adding one control point. As shown in FIG. 19 and FIG. 20, a NURBS curve does not generally pass on control points. However, as mentioned later, a NURBS curve has control points as edge points if elements of a knot vector represent a rational Bezier curve.

Next, suppose that the NURBS curve as shown in FIG. 19 is approximated to two line segments. For that purpose, three points put on both ends and the midpoint of the NURBS curve are connected by straight lines. Position coordinates of the points on the NURBS curve can be obtained by substituting u[3] and u[4] and the midpoint between them (u[3]+u[4])/2, for example, as values of a parameter u, into the above equations because the effective range of the knot vector is (u[3], u[4]). In order to divide a NURBS curve 2001 as shown in FIG. 20 into two line segments, a value of a parameter u can be u[3], u[4] or u[5], for example, because the effective range of the knot vector is (u[3], u[5]). The number of control points and the number of divided line segments of the NURBS curve are not limited to this example, but can be set freely.

On the basis of the above description, suppose that a NURBS surface in 3D space is divided into plane polygons. FIG. 22 shows the simplest NURBS surface 2201. In FIG. 22, the degrees in both directions of u and v are n=m=3, and the number of control points in both directions u and v are I=J=4, namely, 4×4=16. Knot vectors in the directions of u and v are respectively (u[0], u1, ..., u[7]) and (v[0], v[1], ..., v[7]), and the numbers of elements of the knot vectors in the directions of u and v are both (I+n+1)=(J+m+1)=8. The effective ranges of knot vectors for drawing the NURBS surface 2201 are ranges of (u[3], u[4]) and (v[3], v[4]). Therefore, 9 points on the surface can be obtained using u[3] and u[4] and the midpoint between them (u[3]+u[4])/2 as values of u and v[3] and v[4] and the midpoint between them (v[3]+v[4])/2 as values of v. It is possible to divide the surface into 4 rectangle polygons using these nine points thereon. It may be divided into 8 triangle polygons, of course. The number of control points on a NURBS surface and the number of divided polygons are not limited to this example, but may be set freely (See Background Art 2, Japanese Laid-Open Patent Application No. 03-201073, for example).

Next, as the technique C, the background art in which a parametric surface such as a Bezier surface is subdivided into minute polygons to be handled will be explained.

As a method for displaying a 3D object including a parametric surface on a 2D image display apparatus, a method for approximating the object to a collection of minute plane polygons for rendering is generally used at present.

An object, that is a 3D image, represented smoothly in a form of a parametric surface such as a NURBS surface and a Bezier surface has a smaller amount of data than an object represented by a collection of polygons such as triangles, and thus has an affinity for transmission via a network which has recently developed rapidly.

As a common method for dividing a parametric surface into polygons, a method of generating plane polygons by directly obtaining points on the parametric surface with a discrete variation in a parameter value at regular intervals and combining a plurality of pairs of these points adjacent to each other is used. This processing is generally called "tessellation".

FIG. 30 shows an example of a cubic (the order=4) rational Bezier surface that is a typical parametric surface. A cubic (the order=4) rational Bezier surface is expressed by Equation 4.

$$B(u, v) = UMQM^T V = UM \begin{bmatrix} Q_{00} & Q_{01} & Q_{02} & Q_{03} \\ Q_{10} & Q_{11} & Q_{12} & Q_{13} \\ Q_{20} & Q_{21} & Q_{22} & Q_{23} \\ Q_{30} & Q_{31} & Q_{32} & Q_{33} \end{bmatrix} M^T V \quad (4)$$

$$M = \begin{bmatrix} -1 & 3 & -3 & 1 \\ 3 & -6 & 3 & 0 \\ -3 & 3 & 0 & 0 \\ 1 & 0 & 0 & 0 \end{bmatrix}, U = [u^3 u^2 u\ 1], V = [v^3 v^2 v\ 1]^T$$

A parametric surface is represented using two parameters u and v, where $0<=u<=1$ and $0<=v<=1$. $Q_{ij}$ (i=0, ..., 3, j=0, ..., 3) is control points defining the shape of a Bezier surface, and there exist 4×4=16 points in a case of a cubic (the order=4) surface. Among the control points, $Q_{00}$, $Q_{30}$, $Q_{03}$ and $Q_{33}$ are located on the surface but other points are not located on the surface. Each control point includes a W element corresponding to weight in addition to X, Y and Z elements. Therefore, an arbitrary point P on a curved surface is represented by P(X(u, v)/W(u, v), Y(u, v)/W(u, v), Z(u, v)/W(u, v)). Also, it is known that a Bezier surface has convex hull property and thus the surface is completely contained by a polyhedron that is formed by the control points.

An object is represented by a collection of the above-mentioned parametric surfaces. Such parametric surfaces that form an object are hereinafter referred to as patches for explanation. If an object is represented by approximation of each patch using a lot of small polygons, the object can be rendered with high definition. However, the calculation load increases as the number of polygons to be processed increases. Therefore, a method for rendering an object with high definition while restraining an amount of polygon generation needs to be established.

For that purpose, a background art suggests a method for calculating smoothness of each divided patch every time a surface patch is divided into a left surface patch and a right surface patch, and dividing the patch again if the smoothness is a permissible value or more, and then repeating the division of the patch until the smoothness thereof becomes less than the permissible value (See Background Art 3, Japanese Laid-Open Patent Application No. 11-007544, pp. 11–14, for example).

There is another method of generating an edge by connecting edge points of control points, calculating a vector from the midpoint of the edge to the midpoint on a curved surface that represents the surface of a polygon, as a deviation vector of a chord, and thus determining resolution depending on the length of the vector on a screen obtained by perspective transformation of the deviation vector of the chord (See Background Art 4, Japanese Laid-Open Patent Application No. 2001-52194, p. 5, for example).

Next, as the technique D, the background art for calculating a normal of each control point that defines a subdivided surface patch will be explained.

A Bezier surface obtained as a result of parameter transformation of a NURBS surface by knot insertion forms a Bezier surface of the degree bi-n if (n+1)×(n+1) control points are given. But it is just referred to as a Bezier surface of the degree n here. In the field of 3D computer graphics, a cubic Bezier surface is heavily used because of its easy controllability (See Background Art 10, "Mathematical Elements for Computer Graphics, second edition" by David F. Rogers and J. Alan Adams published by McGraw Hill College Divs., March 1999), for example).

A cubic Bezier surface is generally expressed by the following Equation 5. $P_{ij}$ in Equation 5 is a coordinate of a control point, and $J_i$ and $K_j$ are Bernstein functions expressed by Equation 6 and Equation 7. P(u, v) indicates a vertex coordinate on a free-form surface for particular u and v ($0 \leq u, v \leq 1$).

$$P(u, v) = \sum_{i=0}^{3} \sum_{j=0}^{3} P_{ij} J_i K_j \quad (5)$$

$$J_i = \frac{3!}{i!(3-i)!} u^i (1-u)^{3-i} \quad (6)$$

$$K_j = \frac{3!}{j!(3-j)!} u^j (1-u)^{3-j} \quad (7)$$

A Bezier surface is sometimes rendered directly using Equation 5 and Equation 6. In this case, an iteration method or the like is used for calculation of an edge between a curved surface and another curved surface or a projected surface, which takes an enormous amount of calculation time.

On the other hand, in order to render more quickly than such a direct rendering method, a tessellation method for calculating points on a free-form surface using a particular pair of parameters P(u, v) and rendering the surface by approximation of a collection of polygons obtained by connecting these points on the surface (See Background Art 5, Japanese Laid-Open Patent Application No. 2001-331812, for example).

Or, there is another method of rendering by polygon approximation using a so-called subdivision method, that is, the repetition of the processing of generating new control points by averaging the coordinates of adjacent control points (See Background Art 6, Japanese Laid-Open Patent Application No. 11-7544).

In the field of 3D computer graphics, not only the quality of an object shape but also the processing such as coloring and shading is an important element for determination of image quality. Since normals of an object are used for shading each surface, precise calculation of the normals is important.

However, in the conventional curved surface image processing apparatus for handling the technique A, namely, the general calculation procedures of the entire apparatus, there is a problem that an amount of data other than NURBS data increases because the conventional curved surface image processing apparatus computes each coefficient matrix at the preprocessing stage.

There is another problem that input data is limited to cubic NURBS surfaces. There is still another problem that increments of the parameters u and v are limited to fixed values (Δu, Δv) if a difference matrix is used. In addition, there is further still another problem that a coefficient matrix needs to be rationalized for strict representation of a NURBS surface and thus each point on the computed NURBS surface needs to be divided, which causes increase in an amount of computation.

Next, in order to render a NURBS surface using the above technique B, points on the NURBS surface are directly obtained for polygon division. However, this conventional method has a problem that basis functions expressed by the above Cox-de Boor's recurrence formula need to be obtained for calculating the coordinates of the points on the NURBS surface, and thus an enormous amount of computation is required.

Conventionally, a CPU performs the above-mentioned direct division of a parametric surface into polygons, namely, the tessellation processing. However, in order to represent a target 3D object more finely and closer to an actual object, the number of polygon divisions inevitably needs to be larger for approximation of the surface, and thus the load on the CPU becomes heavier. There is another problem that a computation circuit for obtaining points on a surface becomes larger in size when a circuit for dividing a parametric surface into polygons (tessellator) is integrated into hardware.

So, in order to solve these problems, the present invention does not obtain points on a NURBS surface directly, but directly obtains points on a relatively simple rational Bezier surface obtained by equivalent transformation of a NURBS surface, and then divides the rational Bezier surface into polygons. That is why it is easy to obtain control points on a rational Bezier surface by applying the subdivision method. Note that there are the Oslo algorithm and the Bohm method as methods of transforming a B-spline curve into a piecewise rational Bezier curve by knot insertion (See Background Art 7, Prautzsh, H., "A Short Proof of the Oslo Algorithm" Comp. Aid. Geom. Des., Vol. 1, pp. 95–96, 1984, and Background Art 8, Bohm, W., "Inserting New Knots into B-spline curves" Comp. Aid. Des., Vol. 12, pp. 199–201, 1980).

First, problems involving equivalent transformation of a NURBS surface into a rational Bezier surface will be described. For equivalent transformation of a NURBS surface into a rational Bezier surface, a method called knot insertion can be used. A curved surface transformation method using a knot insertion algorithm will be explained below in detail.

For the sake of simplicity, a method of transforming a NURBS curve into a rational Bezier curve will be explained first. As for knot insertion into a NURBS curve, the following algorithm is known. When the degree is n, a plurality of control points are (Q[0], Q[1], . . . , Q[I−1]) (the number of control points is I), and an initial knot vector is (u[0], u[1], . . . , u[I+n]) (the number of elements of the knot vector is I+n+1), if a new knot ~u is inserted between the knot u[k] and u[k+1] (the position of knot insertion is k), new control points (Q'[0], Q'[1], . . . , Q'[I]) are expressed by the following equation.

$<Q'[i]>=(1-a[i])*<Q[i-1]>+a[i]*<Q[i]>$ where i is not 0. When i is 0, the control points are expressed by the following equation.

$<Q'[0]>=a[0]*<Q[0]>$

Here, the coefficient array a[i] in the above equation is expressed by the following equation.

$a[i]=1$ (when $i$ is $k-n$ or smaller)

$a[i]=0$ (when $i$ is $k+1$ or larger)

$a[i]=(\sim u-u[i])/(u[i+n]-u[i])$ (when $i$ is any other value)

For example, when initial control points are (Q[0], Q[1], Q[2], Q[3]), an initial knot vector is (u[0], u[1], . . . , u[7]) and a new knot ~u is inserted between a knot u[3] and a knot u[4], new control points (Q'[0], Q'[1], . . . , Q'[4]) are as follows. Since the position of knot insertion is k=3, the coefficient array is:

$a[0]=1$ $a[1]=(\sim u-u[1])/(u[4]-u[1])=(u[3]-u[1])/(u[4]-u[1])$ $a[2]=(\sim u-u[2])/(u[5]-u[2])=(u[3]-u[2])/(u[5]-u[2])$ $a[3]=(\sim u-u[3])/(u[6]-u[3])=0$ $a[4]=0$ and using the above, the following is obtained.

$<Q'[0]>=a[0]*<Q[0]>=<Q[0]>$ $<Q'[1]>=(1-a[1])*<Q[0]>+a[1]*<Q[1]>$ $<Q'[2]>=(1-a[2])*<Q[1]>+a[2]*<Q[2]>$ $<Q'[3]>=(1-a[3])*<Q[2]>+a[3]*<Q[3]>=<Q[2]>$ $<Q'[4]>=(1-a[4])*<Q[3]>+a[4]*<Q[4]>=<Q[3]>$

This shows that the initial control point <Q[1]> disappears and control points are generated at new positions <Q'[1]> and <Q'[2]>.

By the way, control points actually have their weights. In this case, the homogeneous coordinates transformed from the position coordinates of the control points need to be substituted into the above equations. To be more specific, when a control point is expressed by a 2D coordinate <Q[i]>=(qx[i], qy[i]) and the weight is qw[i], the homogeneous coordinate thereof <Q[i]>=(qw[i]*qx[i], qw[i]*qy[i], qw[i]) is obtained by multiplying the position coordinate by the weight. Also, when the control point coordinate is expressed by a 3D coordinate <Q[i]>=(qx[i], qy[i], qz[i]), the homogeneous coordinate $<Q[i]>=(qw[i]*qx[i], qw[i]*qy[i], qw[i]*qz[i], qw[i])$ is obtained. As mentioned above, the final control points are also expressed by homogeneous coordinates as a result of the above knot insertion using the control points transformed into those expressed by the homogeneous coordinates, and thus divisions by weights are required for transformation back into the control points expressed by the normal coordinates.

However, there is a problem that unnecessary control points to be abandoned are generated when equivalent transformation of a NURBS curve is performed to transform it into a rational Bezier curve using the knot insertion algorithm, and thus there occurs another problem that the number of control points to be abandoned varies depending on the elements of the initial knot vector. Therefore, only transformation of a NURBS curve into a rational Bezier curve by knot insertion does not clearly indicate the positions and the number of control points to be abandoned, and thus there occurs a problem of making subsequent subdivision processing difficult.

The problem that unnecessary control points are generated when a NURBS curve as shown in FIG. 19 is transformed into a rational Bezier curve will be explained below using a concrete example.

As the first example where unnecessary control points are generated, the NURBS curve 1901 in FIG. 19 is defined by the degree n=3, control points (Q[0], Q[1], Q[2], Q[3]) and a knot vector (u[0], u[1], . . . , u[7]). In other words, the number of control points is 4 and the number of elements of the knot vector is 8. It is assumed that u[i]<u[j] is satisfied for all the different indices i and j (i<j). Here, suppose that the final knot vector is (u'[0], u'[1], u'[2], . . . ) as a result of inserting knots one by one into the initial knot vector (u[0], u[1], . . . , u[7]). If the following relation is satisfied, the generated final NURBS curve is transformed equivalently into a single rational Bezier curve without changing the shape thereof.

u[0]=u'[0]
u[1]=u'[1]
u[2]=u'[2]
u[3]=u'[3]=u'[4]=u'[5]
u[4]=u'[6]=u'[7]=u'[8]
u[5]=u'[9]
u[6]=u'[10]
u[7]=u'[11]

To be more specific, since the effective range of the initial knot vector of the NURBS curve is (u[3], u[4]), the final knot vector (u'[0], u'[1], u'[2], . . . , u'[11]) is obtained by inserting knots so that the multiplicities of the knots u[3] and u[4] in this range become "3" (so that the degrees thereof are both n=3) respectively. In this case, 4 knots are newly inserted. Therefore, the final number of control points becomes 8 because 4 control point are added, and thus the final control points are (Q'[0], Q'[1], . . . , Q'[7]). It is known that the NURBS curve defined by such a knot vector is equivalent to a rational Bezier curve, which completely matches the original NURBS curve in shape. Here, "the final number of control points after knot insertion" is 8 but "the number of control points that define the rational Bezier curve" is 4, so it is found that 4 control points, among the final control points, are unnecessary for representation of the rational Bezier curve.

As the second example where unnecessary control points are generated, suppose that the initial knot vector is (u[0], u[1], . . . , u[8]) by adding one more knot. It is assumed that u[i]<u[j] is satisfied for all the different indices i and j (i<j).

In order to obtain a rational Bezier curve, the final knot vector (u'[0], u'[1], u'[2], . . . ) after knot insertion needs to be as follows.

u[0]=u'[0]
u[1]=u'[1]
u[2]=u'[2]
u[3]=u'[3]=u'[4]=u'[5]
u[4]=u'[6]=u'[7]=u'[8]
u[5]=u'[9]=u'[10]=u'[11]
u[6]=u'[12]
u[7]=u'[13]
u[8]=u'[14]

To be more specific, since the effective range of the initial knot vector of the NURBS curve is (u[3], u[5]), the final knot vector (u'[0], u'[1], u'[2], . . . , u'[14]) is obtained by inserting knots so that the multiplicities of the knots u[3], u[4] and u[5] in this range become "3" (so that the degrees thereof are all n=3) respectively. In other words, "the final number of control points after knot insertion" is 11 (the number of elements of the knot vector 15−4=11). In this case, the original NURBS curve is divided into two continuous rational Bezier curves. However, since these two rational Bezier curves share one control point on their connection point, "the number of control points that define the rational Bezier curves" is 7 (4×2−1=7). Therefore, it is found here that 4 control points are also unnecessary.

However, the number of control points to be abandoned is not always 4 depending on the elements of the initial knot vector. The number of control points to be abandoned varies depending on the initial knot vector. This occurs when the initial knot vector includes knots with the same value.

To be more specific, the third example that unnecessary control points are generated is a case where an initial knot vector includes knots of u[i]=u[j] for different indices i and j (i<j). For example, in the above example, suppose that u[2] is equal to u[3] among the initial knot vector (u[0], u[1], . . . , u[8]). In order to transform the NURBS curve which is finally generated by knot insertion equivalently into two continuous rational Bezier curves, the following relation needs to be satisfied.

u[0]=u'[0]
u[1]=u'[1]
u[2]=u'[2]=u'[3]=u'[4]
u[4]=u'[5]=u'[6]=u'[7]
u[5]=u'[8]=u'[9]=u'[10]
u[6]=u'[11]
u[7]=u'[12]
u[8]=u'[13]

To be more specific, since the effective range of the initial knot vector of the NURBS curve is (u[3], u[5]) and u[2] is equal to u[3], the final knot vector (u'[0], u'[1], u'[2], . . . , u'[13]) is obtained by inserting knots so that the multiplicities of the knots u[2] and u[3], and u[4] and u[5] become "3" respectively. Here, "the final number of control points after knot insertion" is 10 (14−4=10) but "the number of control points that define the rational Bezier curves" is 7 (4×2−1=7). Therefore, it is found here that 3 control points are unnecessary.

Unnecessary control points are also generated in exactly the same manner when a NURBS surface is transformed equivalently into a rational Bezier surface.

As the fourth example where unnecessary control points are generated will be explained with reference to a case of a NURBS surface. As for NURBS surface, the control points are defined by a 2D array, and the degrees and knot vectors that are parameters for basis functions are defined in the u and v directions respectively. Therefore, knot insertion in both u and v directions makes it possible to transform a NURBS surface equivalently into a rational Bezier surface.

For example, it is supposed that the number of control points Q[i][j] on a NURBS surface is 5×5=25, the degree in the u and v directions is m=n=3, the initial knot vector in the u direction is (u[0], u[1], . . . , u[8]) and the initial knot vector in the v direction is (v[0], v[1], . . . , v[8]). It is also supposed that u[i]<u[j] is satisfied in the knot vector in the u direction for all the different indices i and j (i<j), whereas v[2] is equal to v[3] and v[i]<v[j] is satisfied in the knot vector in the v direction. When the final knot vectors in the u and v directions obtained after knot insertion are (u'[0], u'[1], u'[2], . . . ) and (v'[0], v'[1], v'[2], . . . ), the following relation needs to be satisfied in order to transform the NURBS surface equivalently into a rational Bezier surface on the analogy of the above examples.

u[0]=u'[0]
u[1]=u'[1]
u[2]=u'[2]
u[3]=u'[3]=u'[4]=u'[5]
u[4]=u'[6]=u'[7]=u'[8]
u[5]=u'[9]=u'[10]=u'[11]
u[6]=u'[12]
u[7]=u'[13]
u[8]=u'[14]
v[0]=v'[0]
v[1]=v'[1]
v[2]=v[3]=v'[2]=v'[3]=v'[4]
v[4]=v'[5]=v'[6]=v'[7]
v[5]=v'[8]=v'[9]=v'[10]
v[6]=v'[11]
v[7]=v'[12]
v[8]=v'[13]

Accordingly, "the final number of control points after knot insertion" is 110 (11×10=110) in total because the number in the u direction is 11 and that in the v direction is 10. On the other hand, "the number of control points that define a rational Bezier surface" is 49 (7×7=49) in total because the number in the u direction is 7 and that in the v direction is 7. Therefore, the number of unnecessary control points to be abandoned is 61 (110−49=61).

As described above, there is a problem that unnecessary control points are generated in the process of knot insertion when a NURBS surface is transformed into a rational Bezier surface.

Since the number of these unnecessary control points varies depending on the elements of the initial knot vector, particularly the multiplicity of the knots in the effective range of the initial knot vector, the relation between the multiplicity and the control points needs to be generalized.

The control points which are finally transformed into a rational Bezier surface by knot insertion is transferred to the subsequent block for performing polygon division using the subdivision method. Only "the control points that define the rational Bezier surface" are necessary for the subdivision, and "the control points that do not define the rational Bezier surface" are unnecessary for that purpose. Therefore, it is necessary to remove "the control points that do not define the rational Bezier surface" from "the final control points obtained after knot insertion" for reduction of the data amount.

Next, the technique C and its problem will be described. Since smoothness of a surface patch needs to be calculated on every subdivision in the subdivision processing shown in the background art 3, for example, Japanese Laid-Open Patent Application No. 11-007544 (pp. 11–14), there is a problem that an enormous amount of smoothness calculation load is put on the curved surface image processing apparatus.

Also, in the above-mentioned background art 4, Japanese Laid-Open Patent Application No. 2001-52194 (p. 5), a deviation vector of a chord cannot be used as an index for detecting a patch that forms a silhouette edge of an object (hereinafter referred to as a silhouette edge forming patch).

Next, the technique D and its problems will be described. In calculating a normal of each control point that forms a Bezier surface using the method of the above-mentioned background art 4, Japanese Laid-Open Patent Application No. 2001-52194 (p. 5), vertices on the surface are calculated by directly giving parameters such as u, v and the like to the points on the surface and then the normals of the generated points on the surface are calculated using midpoints obtained in the process of the vertex calculation. This background art 4 describes that the normal calculation on each control point on the surface patch is avoided when it is judged that the control points on the four corners and the adjacent points coincide with each other, but does not show specifically how to avoid the calculation.

The above-mentioned background art 6, Japanese Laid-Open Patent Application No. 11-7544, has a problem of an enormous amount of time for calculating a normal on a surface because it uses a common formula. Also, it uses a Coon's patch, and a normal is obtained by approximate calculation.

Further, the above-mentioned background art 5 or 6, Japanese Laid-Open Patent Application No. 2001-331812 or Japanese Laid-Open Patent Application No. 11-7544, has a problem of increase in an amount of computation because it also calculates normals of unnecessary control points when only the control points on a surface are used for final image generation.

SUMMARY OF THE INVENTION

In view of the above problems, the first object of the present invention is to provide a curved surface image processing apparatus that allows high-speed and high-quality rendering in image processing using NURBS data as graphic information.

The second object of the present invention is to provide a curved surface image processing apparatus that allows more efficient reduction of an amount of computation, even in the image processing in the computation procedures of polygon division by the subdivision method after transforming NURBS data into rational Bezier data by knot insertion.

The third object of the present invention is to provide a curved surface image processing apparatus that allows more efficient surface division and thus reduction of computation, even in the polygon division of the surface by the subdivision method.

And the fourth object of the present invention is to provide a curved surface image processing apparatus that allows efficient calculation of correct normals using a method appropriate for normal calculation of control points on the four corners of a surface that are vertices thereof, even in the normal calculation using information of control points on a surface such as a Bezier surface.

In order to solve the above problems, the curved surface image processing apparatus according to the present invention is a curved surface image processing apparatus for rendering a 3D object on a screen using NURBS data that is shape data of the 3D object, comprising: a data transformation unit operable to perform parameter transformation on the NURBS data to transform said NURBS data into rational Bezier control points, said NURBS data forming a NURBS curve and a NURBS surface, and said rational Bezier control points forming a rational Bezier curve and a rational Bezier surface; a curved surface division unit operable to subdivide a rational Bezier surface patch into a plurality of surface patches, said rational Bezier surface patch being made up of the rational Bezier control points transformed by the data transformation unit; and a rendering unit operable to render the 3D object using said plurality of surface patches.

NURBS data cannot be subdivided just as it is due to a large amount of computation. However, since the curved surface image processing apparatus according to present invention includes the data transformation unit for performing parameter transformation on NURBS data to transform it into Bezier data, it can reduce efficiently an amount of computation in rendering a 3D object and thus achieve the rendering in a shorter time and with higher accuracy.

In the curved surface image processing apparatus according to the present invention, the NURBS data includes control points and knot vectors, and the data transformation unit includes: a knot insertion unit operable to perform an operation of inserting knots into the knot vectors using knot insertion algorithm; and a control point trimming unit operable to delete unnecessary control points in control points that are generated by the operation performed by the knot insertion unit. More preferably, in the curved surface image processing apparatus according to the present invention, the knot insertion unit searches for an index of a knot located at a particular position on a final knot vector in the process of transforming an initial knot vector and initial control points included in the NURBS data into the final knot vector and final control points that represent the rational Bezier control point data, and the control point trimming unit deletes a particular control point in the final control points using the searched index.

Accordingly, the curved surface image processing apparatus according to the present invention performs subdivision processing after removing appropriately unnecessary control points which are generated in the process of parameter transformation from NURBS data into Bezier data, and thus can reduce redundant computation and achieve efficient rendering of a 3D object.

In the curved surface image processing apparatus according to the present invention, the curved surface division unit further includes: an area calculation unit operable to calculate a signed area of 2D graphics obtained by performing perspective transformation on the rational Bezier control point data that defines a shape of each of the surface patches that form the object; and a detection unit operable to detect whether said each surface patch is a silhouette edge forming patch or not based on a value of the signed area, said silhouette edge forming patch being a surface patch that forms a contour of the object. Also, in the curved surface image processing apparatus according to the present invention, the curved surface division unit further includes a subdivision level determination unit operable to determine a subdivision level of said each surface patch depending on a result of the detection of the silhouette edge forming patch and the value of the signed area of said each surface patch on a screen calculated by the area calculation unit.

Accordingly, since the curved surface image processing apparatus according to the present invention detects a silhouette edge that is a contour of a rational Bezier surface subdivided by the subdivision unit, raises the subdivision level of a surface patch that forms the silhouette edge and lowers the subdivision level of a surface patch that does not form the silhouette edge, it can omit existing redundant subdivision operation and thus achieve more accurate rendering by subdividing the edge at higher level. In addition, since it determines the subdivision level using a value of a signed area, it can subdivide a surface patch more effectively.

The curved surface image processing apparatus according to the present invention further comprises a normal calculation unit operable to calculate a normal of each of four corner control points using the rational Bezier control points of the rational Bezier surface, wherein the normal calculation unit includes: a selection unit operable to select each of said four corner control points, and select two control points adjacent to the selected corner control point of which normal is to be calculated, in order to calculate normals of all the four corner control points on the surface patch; and a calculation unit operable to calculate the normal of said selected corner control point by calculating differential vectors between said selected corner control point and said adjacent two control points respectively, calculating a product of the calculated two differential vectors and normalizing the product. More preferably, in the curved surface image processing apparatus according to the present invention, in order to calculate the normals of said four corner control points on the rational Bezier surface, the selection unit selects said each of four corner control points, and selects one or two other control points which are adjacent to but not degenerated into said selected corner control point when at least one of the two adjacent control points is degenerated into the selected corner control point on the same coordinate, and the calculation unit calculates the normal of said selected corner control point by calculating differential vectors between said selected corner control point and said adjacent two control points selected by the selection unit respectively, calculating a product of the calculated two differential vectors and normalizing the product, and proceeds with the calculation until said two adjacent control points are not degenerated into said selected corner control point.

Accordingly, since the curved surface image processing apparatus according to the present invention does not select control points degenerated into other control points in calculation of normals of the control points of a subdivided surface patch, it can calculate a normal of each control point that forms a rational Bezier surface more accurately and thus achieve more accurate rendering of brightness or the like of an 3D object.

Needless to say, the present invention can be realized not only as the above-mentioned curved surface image processing apparatus, but also as a curved surface image processing method including steps executed by the units included in this curved surface image processing apparatus and as a program for causing a computer or the like to execute this curved surface image processing method, and the program can be distributed via a recording medium such as a DVD and a CD-ROM or a transmission medium such as a communication network.

As described above, the curved surface image processing apparatus according to the present invention includes: the data transformation unit for transforming NURBS data into rational Bezier control points that form a rational Bezier surface and a rational Bezier curve; and the surface patch division unit for subdividing a rational Bezier surface patch that is made up of the rational Bezier control point points transformed by the data transformation unit. Therefore, compared with rendering based on direct computation of a NURBS surface, the curved surface image processing apparatus according to the present invention allows rendering with a relatively small amount of computation without increase in data other than control point data. Also, since there is no need to perform viewing transformation on the subdivided rational Bezier control point data of the rational Bezier surface patch, an overall amount of computation involving the viewing transformation can be reduced and thus a high-performance curved surface image processing apparatus that allows rendering of a smooth and high-quality NURBS surface in real time can be structured.

Also, since projection transformation and perspective transformation are performed as a single processing before rendering by handling NURBS data and rational Bezier control point data in the homogeneous coordinate system, division by weight involving projection transformation can be omitted and thus high-speed rendering of a NURBS surface can be achieved.

According to the curved surface image processing apparatus of the present invention, the control point trimming unit can delete unnecessary control points generated when transforming NURBS control point data into rational Bezier control point data. Therefore, unnecessary data is not generated when transforming a NURBS surface into a rational Bezier surface, and thus the subsequent surface patch division unit can perform efficient polygon division by subdivision.

The curved surface image processing apparatus according to the present invention includes the subdivision level determination unit for controlling the subdivision level adaptively depending on a value of a singed area of a patch on a screen when polygon approximation is performed on an object represented in the form of a NURBS surface using the subdivision algorithm. Therefore, redundant polygon division of a surface patch can be restrained.

Further, the curved surface image processing apparatus according to the present invention includes the silhouette edge detection unit for judging whether or not a patch forms a silhouette edge of an object displayed on a screen. Therefore, it performs appropriate subdivision of a silhouette edge and reduces an amount of calculation in subdividing other portions of a surface patch than the silhouette edge, and thus keeps the calculation load required for subdivision at minimum. As a result, an object with a smooth edge can be generated with restraining redundant polygon division.

The curved surface image processing apparatus according to the present invention includes the selection unit for selecting appropriate control points from adjacent control points when calculating normals of the control points of polygon data subdivided by the subdivision unit.

Accordingly, even if control points adjacent to control points on the four corners of a Bezier surface are degenerated into the control points on the corners, appropriate control points can be selected for calculation of the normals. This calculation can be made efficiently and accurately only using vector differences and vector products.

In view of the above description, the curved surface image processing apparatus according to the present invention can render a free-form surface using NURBS data more efficiently and more accurately, and thus the practical value thereof is extremely high.

FURTHER INFORMATION ABOUT TECHNICAL BACKGROUND TO THIS APPLICATION

The following documents are incorporated herein by reference.

Japanese Patent Application No. 2002-328052 filed on Nov. 12, 2002;

Japanese Patent Application No. 2002-329441 filed on Nov. 13, 2002;

Japanese Patent Application No. 2002-329442 filed on Nov. 13, 2002; and

Japanese Patent Application No. 2002-329443 filed on Nov. 13, 2002.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 24 is a diagram explaining a principle of curved surface transformation by knot insertion;

FIG. 25 is a diagram explaining specification of unnecessary control points in a fourth embodiment;

FIG. 35A is a diagram showing an example of a table indicating correspondences between maximum values of signed areas and subdivision levels of a silhouette edge forming patch;

FIG. 35B is a diagram showing an example of a table indicating correspondences between signed areas and subdivision levels;

FIG. 40 is a diagram showing an example of a table indicating correspondences between signed areas and subdivision levels of a silhouette edge forming patch in the sixth embodiment;

FIG. 43 is a table for corresponding curvature parameters C and subdivision levels;

FIG. 46 is a diagram showing an example of a table indicating correspondences between curvature parameters and maximum subdivision levels;

FIG. 47 is a diagram showing an example of a table indicating correspondences between signed areas and subdivision levels of a patch;

FIG. 55A is a diagram showing en example of a list describing control points and their coordinates stored in a memory; and FIG. 55B is a diagram showing an example of a list describing control points and their normal data stored in a memory.

DESCRIPTION OF THE PREFERRED EMBODIMENT(S)

The curved surface image processing apparatus according to the present invention will be explained below with reference to the drawings. The following first, second and third embodiments are the description of a curved surface image processing apparatus 100 that is characterized in its general processing of generating a curved surface image using NURBS data.

(First Embodiment)

Figure 1:
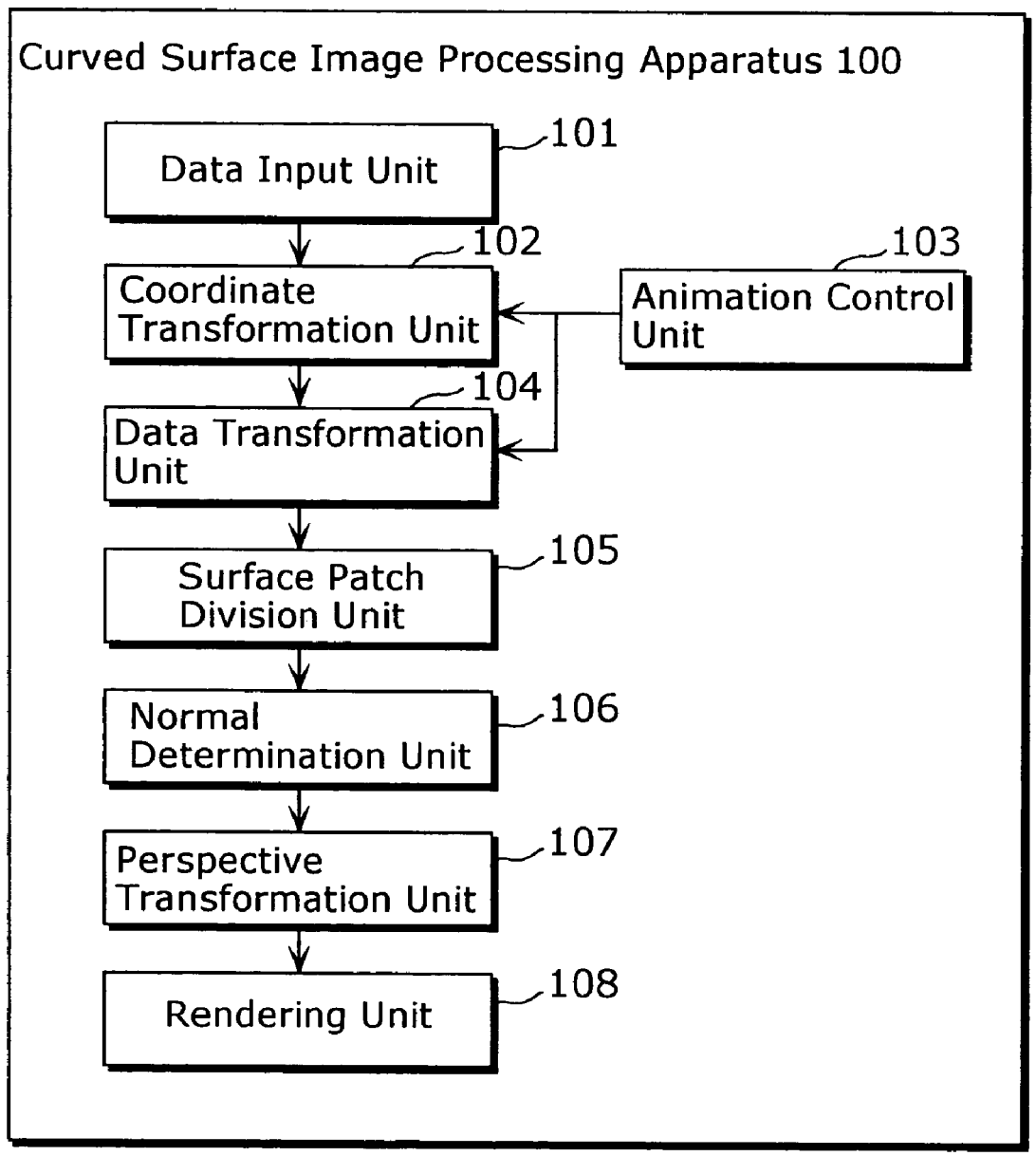
FIG. 1 is a functional block diagram of a curved surface image processing apparatus in a first embodiment.

FIG. 1 is a functional block diagram showing the curved surface image processing apparatus 100 in the first embodiment of the present invention.

This curved surface image processing apparatus 100 includes a data input unit 101 for receiving NURBS data, a coordinate transformation unit 102 for performing coordinate transformation of the NURBS data, an animation control unit 103 for controlling animation data of each frame to be rendered, a data transformation unit 104 for transforming the NURBS data into rational Bezier data, a surface patch division unit 105 for subdividing rational Bezier surface patches, a normal determination unit 106 for calculating normal vectors of control points on the divided surface patch, a perspective transformation unit 107 for performing perspective transformation of the divided surface patch, and a rendering unit 108 for rendering the surface patch.

This curved surface image processing apparatus 100 is not limited to the structure of FIG. 1. The coordinate transformation unit 102, the data transformation unit 104 and the surface patch division unit 105 are essential elements, and other units may be arbitrary elements.

To begin with, what are NURBS data and rational Bezier control point data and how the curved surface image processing apparatus 100 in the first embodiment of the present invention handles these data will be explained.

NURBS data that forms a NURBS curve and a NURBS surface consists of three elements; NURBS control points, weights on respective control points and a knot vector. Rational Bezier control point data that forms a rational Bezier curve and a rational Bezier surface consists of two elements; rational Bezier control points and weights on respective control points.

Generally, using a normal coordinate system in 3D Euclidean space, an arbitrary control point and a weight thereon in NURBS data and rational Bezier control point data are expressed by a combination of P(x, y, z) and w.

On the other hand, a coordinate system in which a weight element w is considered to be one coordinate is referred to as a homogeneous coordinate and expressed as P(X, Y, Z, w). Space expressed by a homogeneous coordinate system is referred to as projection space. When a point P(x, y, z) on 3D Euclidean space is expressed as a point P(X, Y, Z, w) in projection space, the following relation between them is established.

$$P(X,Y,Z,w) = P(wx, wy, wz, w) = wP(x,y,z,1) \quad (8)$$

In the first embodiment, as for NURBS data and rational Bezier control point data, a control point and a weight thereon are hereinafter referred to as a control point as a single term, and handled in a form of P(X, Y, Z, w) using a homogeneous coordinate system in projection space.

Figure 2:
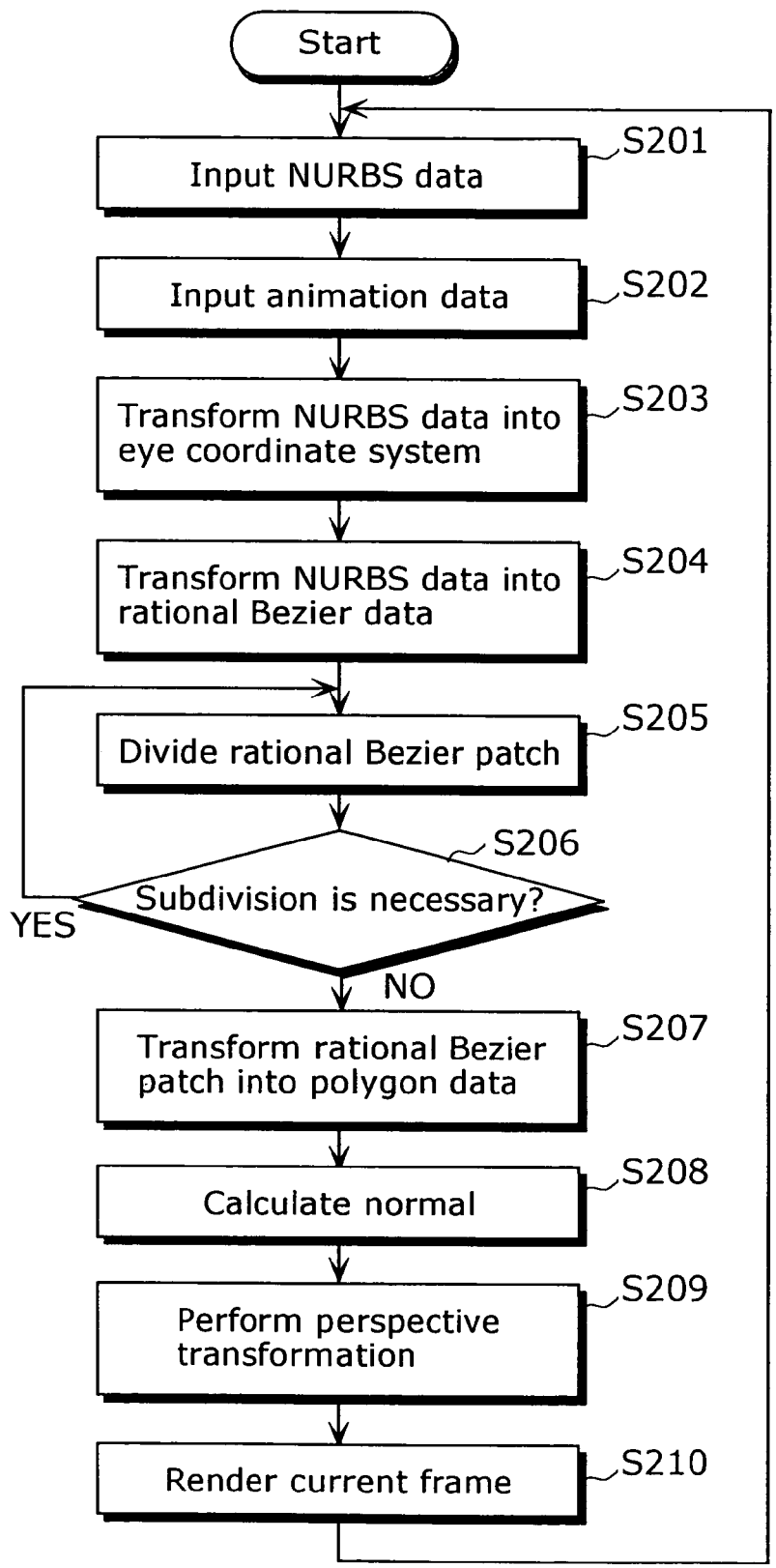
FIG. 2 is a flowchart showing an overall flow of the curved surface image processing apparatus in the first embodiment.

The operation of the curved surface image processing apparatus 100 structured as mentioned above will be explained with reference to FIG. 2. FIG. 2 is a flowchart showing a flow of the overall processing performed by the curved surface image processing apparatus 100 in the first embodiment.

First, the data input unit 101 inputs NURBS data to the coordinate transformation unit 102 (S201).

Next, the animation control unit 103 calculates animation data in a current frame. Here, the animation data includes time information indicating elapsed time information of the current frame, a viewpoint including camera location information, a viewing direction including camera direction information, light source information including information on a type, location and intensity of a light source, and others (S202).

The coordinate transformation unit 102 performs modeling transformation, viewing transformation and clipping in 3D space for the NURBS data, using the information of the viewpoint and the viewing direction in the animation data inputted from the animation control unit 103, so as to calculate the NURBS data in the eye coordinate system (S203).

Next, the data transformation unit 104 transforms each NURBS curve that forms NURBS data into a piecewise rational Bezier curve consisting of segments by inserting knots (S204). Methods of transforming a B-spline curve into a piecewise rational Bezier curve by means of knot insertion includes the Oslo algorithm and the Bohm method as shown in the above-mentioned background art 7 and 8.

The surface patch division unit 105 calculates a plurality of rational Bezier surface patches from NURBS data and subdivides each piecewise rational Bezier surface (S205). In the first embodiment, the de Casteljau's algorithm is used for this subdivision.

Next, the surface patch division unit 105 judges based on the distance from the present viewpoint to the rational Bezier surface patch whether each surface patch has enough smoothness or not as a result of the subdivision, and it divides the rational Bezier patch again when it needs further subdivision (NO in S206). On the other hand, when all the rational Bezier surface patches have been subdivided finely enough (YES in S206), the perspective transformation unit 107 transforms each rational Bezier surface patch into polygon data having vertices as control points using polygon approximation (S207).

The normal determination unit 106 calculates normal vectors of control points of each subdivided polygon data (S208), the perspective transformation unit 107 performs perspective transformation to transform the 3D coordinates into the 2D coordinates on the screen (S209), the rendering unit 108 arranges and renders each polygon data, and then the rendering processing of a 3D object ends (S210).

The processing in all the steps is executed over and over for each frame to be rendered, and once all the frames are rendered, a series of procedures end.

Figure 3A:
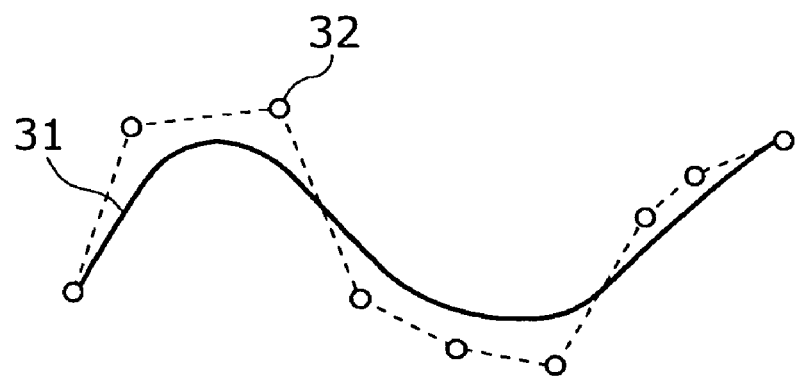
FIG. 3A is a diagram showing an example of a NURBS curve.
Figure 3B:
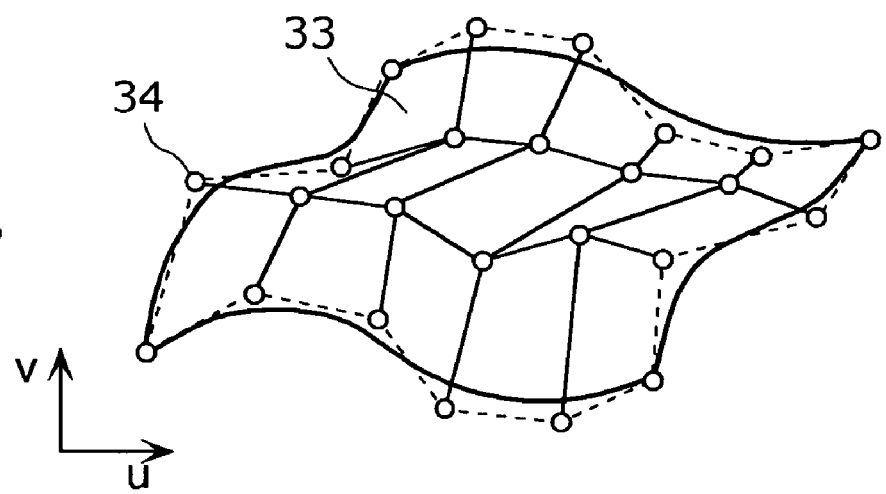
FIG. 3B is a diagram showing an example of a NURBS surface.

By the way, a NURBS surface is made up of a set of non-uniform rational B-spline curves. For example, in FIG. 3B, a NURBS surface 33 is made up of a set of NURBS curves in two directions represented by parameters u and v.

Figure 4A:
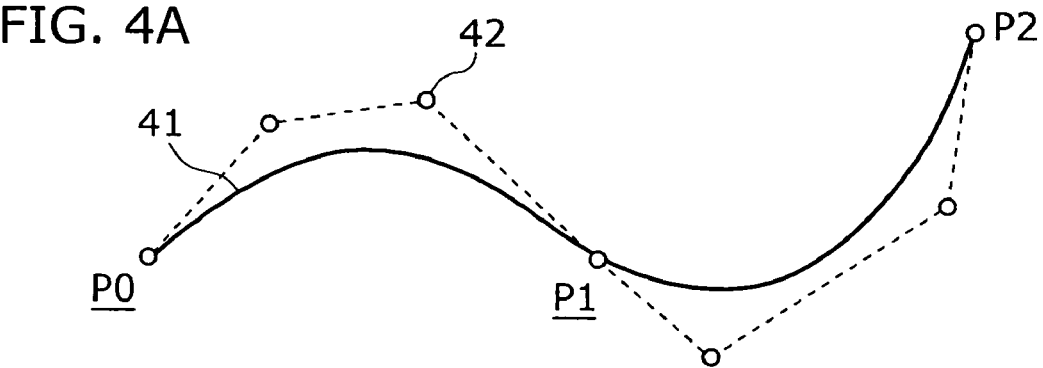
FIG. 4A is a diagram showing an example of a cubic rational Bezier curve.
Figure 4B:
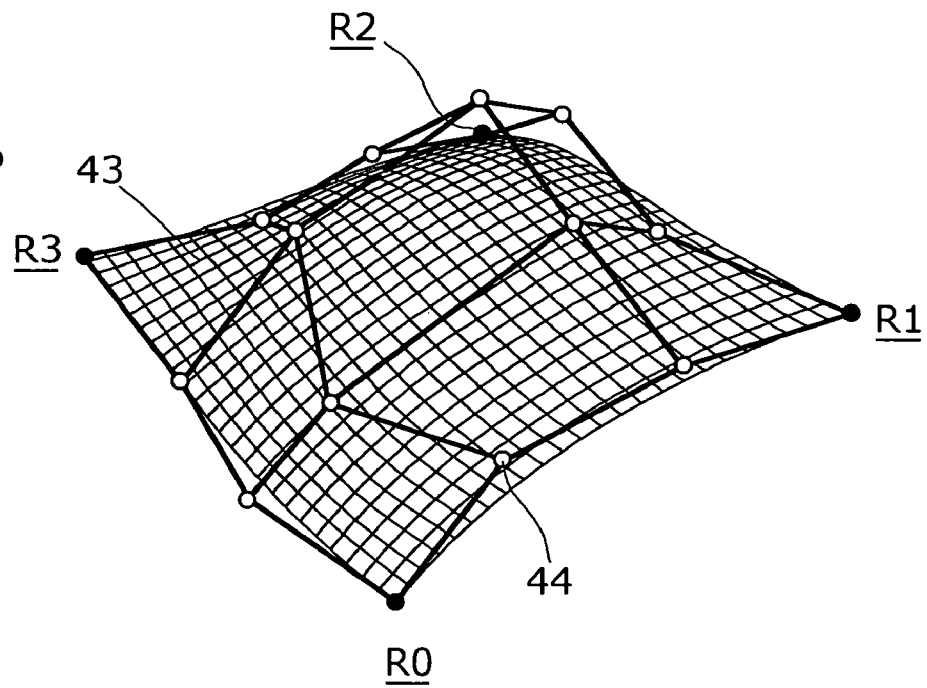
FIG. 4B is a diagram showing an example of a cubic rational Bezier surface.

FIG. 4A and FIG. 4B are diagrams showing examples of a cubic rational Bezier curve and a cubic rational Bezier surface. In FIG. 4A, the shape of a cubic rational Bezier curve 41 is controlled by a plurality of control points 42. Generally, a rational Bezier curve having a minimum number of constituent elements is referred to as a segment. A n-degree segment is made up of (n+1) pieces of control points, and particularly the first and the (n+1)th control points that are points on the curve are referred to as edge points. For example, a cubic segment is made up of 4 control points, and the first and the fourth control points are edge points. A curve that is a sequence of segments is referred to as a piecewise rational Bezier curve.

In FIG. 4A, P0, P1 and P2 are edge points, and sections P0–P1 and P1–P2 are respectively segments. Such continuity of edge points allows representation of a smooth piecewise rational Bezier curve. The cubic rational Bezier curve

41 is a parametric curve represented by a parameter u, as is the case with a NURBS curve, and is given by Equation 9.

$$P(u)=(1-u)^3 P_0 + 3u(1-u)^2 P_1 + 3u^2(1-u) P_2 + u^3 P_3 \quad (9)$$

In Equation 9, P0, P1, P2 and P3 are control points. Computation using this rational Bezier curve is simpler than computation of a NURBS curve, and thus can be incorporated into hardware using a relatively small-scale circuit.

In FIG. 4B, a rational Bezier surface patch 43 is a parametric surface represented by parameters u and v, and the shape of the surface is controlled by control points 44, as is the case with the rational Bezier curve 41. Generally, a rational Bezier surface patch can be defined by a set of segments in two directions using parameters u and v. There are (n+1)×(n+1) pieces of control points of an n-degree rational Bezier surface patch, and the points on the four corners of the patch are edge points on the curved surface. In FIG. 4B, R0, R1, R2 and R3 are edge points on the cubic rational Bezier surface patch 43.

As described above, in Step S204, a plurality of rational Bezier surface patches are calculated from NURBS data. Note that the parameters u and v for defining the NURBS data do not always coincide with the parameters u and v for defining the cubic rational Bezier surface patch calculated by the transformation in S204.

Next, a method by which the surface patch division unit 105 divides a rational Bezier surface patch using the de Casteljau's algorithm will be explained.

Figure 5:
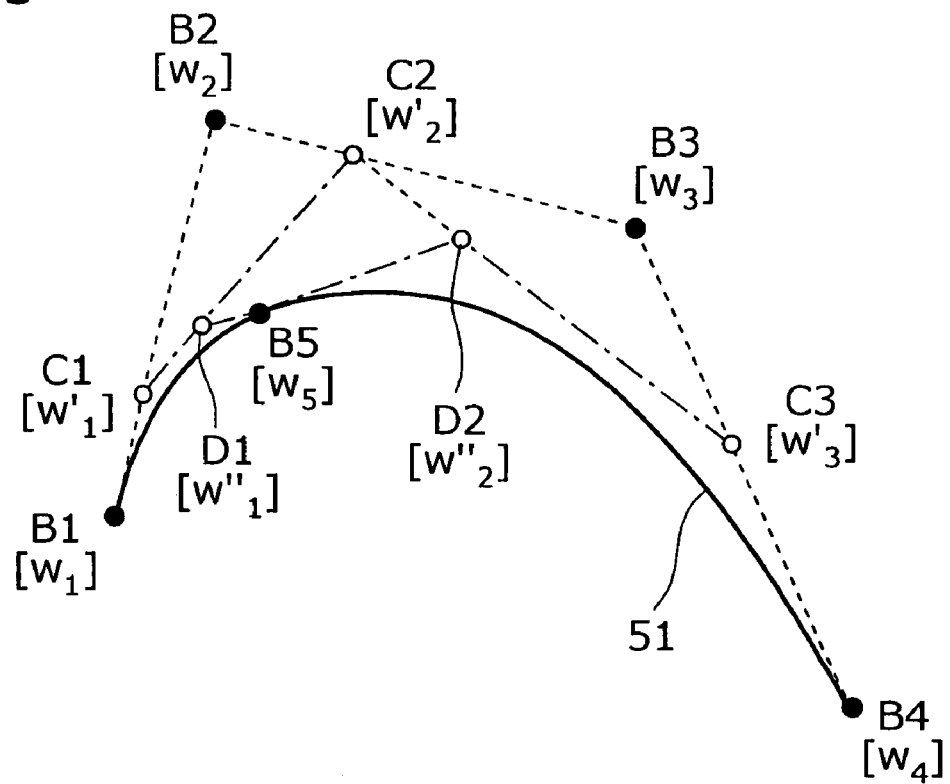
FIG. 5 is an example of segments of a cubic rational Bezier curve in 3D Euclidean space.

FIG. 5 is an example of segments of a cubic rational Bezier curve 51 in 3D Euclidean space. In FIG. 5, B1, B2, B3 and B4 are control points that form a rational Bezier segment 51, and B1 and B4 are edge points. Here, the weights on the control points B1, B2, B3 and B4 are respectively w1, w2, w3 and w4.

Generally, it is known that B5 is a point on the segment 51 and the calculated w5 is a weight on B5 when the following is satisfied using the rational de Casteljau's algorithm in 3D Euclidean space:

In one segment 51, points that internally divide straight lines between respective control points, B1–B2, B2–B3 and B3–B4 at a ratio of $w_{i+1}*t:w_i*(1-t)$, where $0<t<1$ and $i=1, 2, 3$ and 4, are C1, C2 and C3, and the weights on these points C1, C2 and C3 are $w'_i = w_i*(1-t) + w_{i+1}*t$, points that internally divide straight lines between respective control points, C1–C2 and C2–C3 at a ratio of $w'_{i+1}*t: w'_i*(1-t)$, where $i=1, 2$, and 3, are D1 and D2, and the weights on these points D1 and D2 are $w''_i = w'_i*(1-t) + w'_{i+1}*t$, and a point that internally divides a straight line between respective control points D1–D2 at a ratio of $w''_{i+1}*t:w''_i*(1-t)$, where $i=1$ and 2, is B5, and the weight on this point B5 is $w''_i*(1-t) + w''_{i+1}*t$. Here, B1, C1, D1 and B5 are control points for a segment B1–B5, and B5, D2, C3 and B4 are control points for a segment B5–B4.

In Step S44 of the present embodiment, since control points are handled in the homogeneous coordinate system, the de Casteljau's algorithm in projection space is used. This de Catelijau's algorithm in projection space is shown in the background art 9 ("NURBS from Projective Geometry to Practical Use (second edition)" written by Gerald E. Farin). Also, t=1/2 is applied in the present embodiment.

Figure 6:
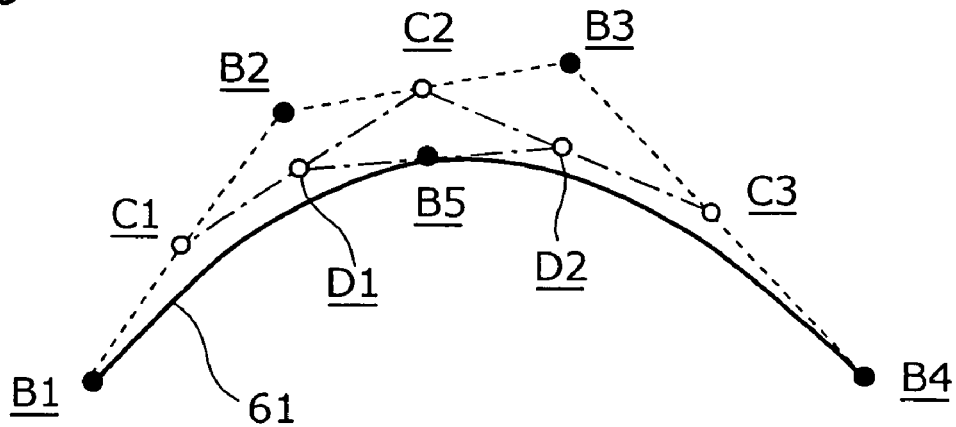
FIG. 6 is a diagram showing an example obtained by dividing cubic rational Bezier curve segments into other segments using the de Casteljau's algorithm in perspective space.

FIG. 6 is an example where the de Casteljau's algorithm is used for a cubic segment in projection space. In FIG. 6, B1, B2 B3 and B4 are control points that form a segment 61, and B1 and B4 are edge points.

In Step S205, B5 is a point on the segment 61, when in the segment 61, points that internally divide straight lines B1–B2, B2–B3 and B3–B4 at a ratio of 1/2:(1−1/2) (i.e., midpoints) are C1, C2 and C3, midpoints of straight lines C1–C2 and C2–C3 are D1 and D2, and a midpoint of a straight line D1–D2 is B5.

As a result, the segment 61 is divided into two segments B1–B5 and B5–B4. The control points of the newly created segment B1–B5 are B1, C1, D1 and B5, and the control points of the segment B5–B4 are B5, D2, C3 and B4.

As described above, in the surface patch division unit 105 of the first embodiment, since t=1/2 is applied to the de Casteljau's algorithm in projection space using the homogeneous coordinate system, computation for the division does not need multiplication nor division but needs only shift operation and addition, which allows drastic speedup in the division processing.

Figure 7:
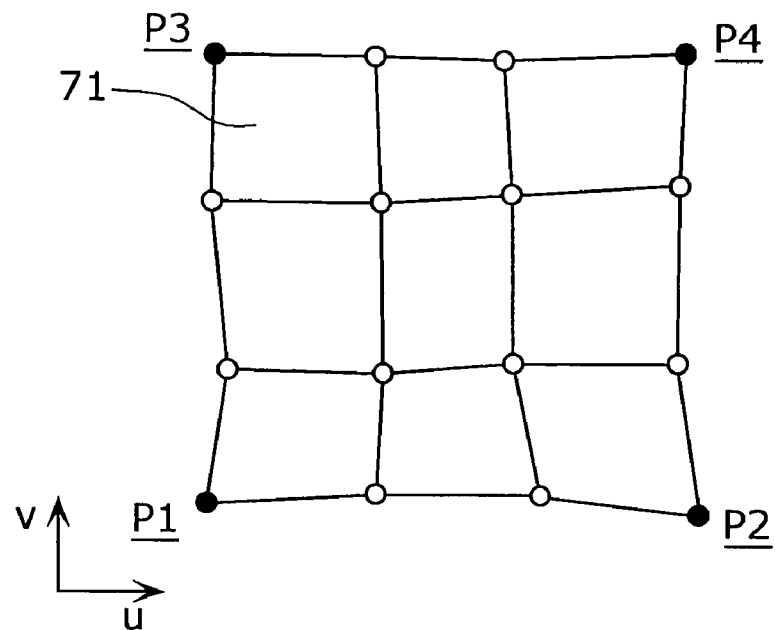
FIG. 7 is a reference diagram showing a cubic rational Bezier surface patch using 16 control points.

FIG. 7 is a reference diagram showing a cubic rational Bezier surface patch 71 represented by 16 pieces of control points. In FIG. 7, P1, P2, P3 and P4 are edge points, and respective edge points are located on the surface patch.

Figure 8:
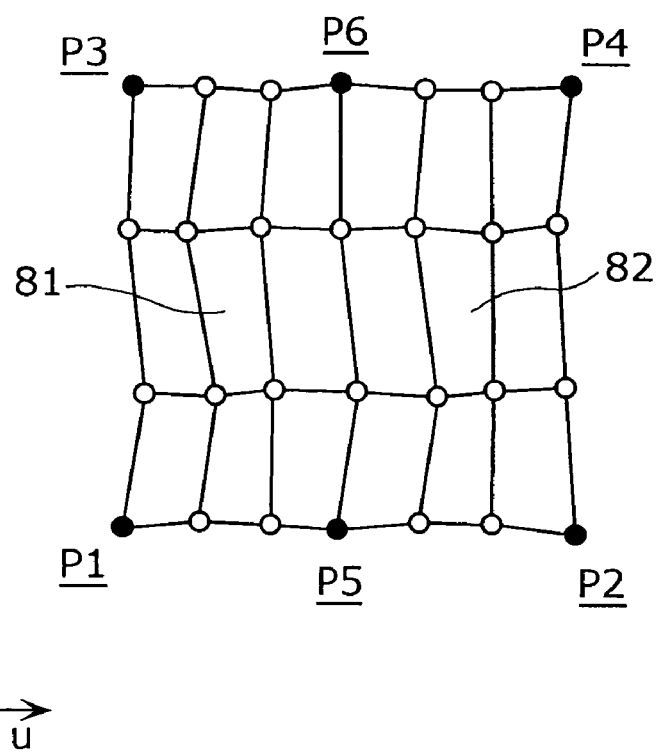
FIG. 8 is a reference diagram of a rational Bezier surface patch obtained as a result of dividing segments in the parameter u direction that form a rational Bezier surface patch using the processing in Step S205.

FIG. 8 is a reference diagram showing rational Bezier surface patches obtained as a result of dividing segments in the parameter u direction that form the rational Bezier surface patch 71 in FIG. 7 by applying the processing in Step S205.

P6 that is obtained by dividing the segment P3–P4, and P5 that is obtained by dividing the segment P1–P2, respectively by Step S205, are located on the rational Bezier surface patch 71. More specifically, the rational Bezier surface patch 71 is divided into two patches, a rational Bezier surface patch 81 having edge points P1, P5, P6 and P3, and a rational Bezier surface patch 82 having edge points P5, P2, P4 and P6.

Figure 9:
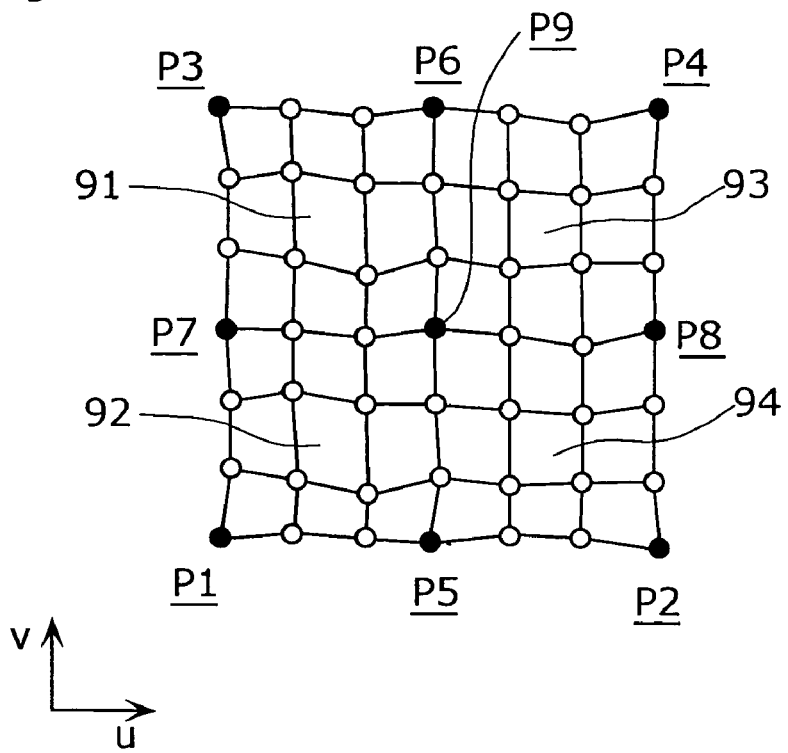
FIG. 9 is a reference diagram of a rational Bezier surface patch obtained as a result of further dividing the segments in the parameter v direction of the rational Bezier surface patch using the processing in Step S205.

FIG. 9 is a reference diagram showing rational Bezier surface patches obtained as a result of further dividing the segments of the rational Bezire surface patches 81 and 82 in FIG. 8 in the parameter v direction by applying the processing in Step S205.

Here, points P7, P8 and P9 on the rational Bezier surface patch are newly calculated, and the rational Bezier surface patch 81 is divided into a rational Bezier surface patch 91 having edge points P7, P9, P6 and P3, and a rational Bezier surface patch 92 having edge points P1, P5, P9 and P7, and the rational Bezier surface patch 82 is divided into a rational Bezier surface patch 93 having edge points P9, P8, P4 and P6, and a rational Bezier surface patch 94 having edge points P5, P2, P8 and P9.

Figure 10:
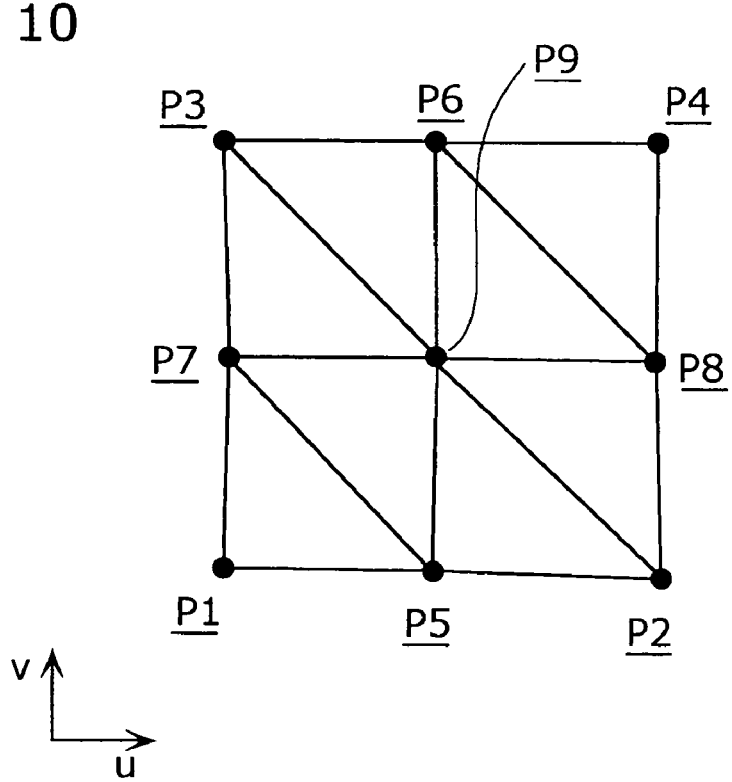
FIG. 10 is a diagram showing an example of transformation of four surface patches into polygon data.

FIG. 10 shows an example of polygon data transformed from four surface patches in FIG. 9. The surface patches 91, 92, 93 and 94 are transformed into 8 pieces of polygon data having control points on the curved surface as vertices.

Since the vertices of these polygon data are points in projection space, they need to be transformed into points in 3D Euclidean space for rendering.

Generally, transformation from a coordinate defined in projection space into a coordinate defined in 3D Euclidean space is called projection transformation. Transformation from a coordinate defined in 3D Euclidean space into a 2D screen coordinate is called perspective transformation. An equation for projection transformation from a homogeneous coordinate P(wx, wy, wz, w) in projection space into a normal coordinate P(x, Y, z) in 3D Euclidean space is given by the following Equation 10 based on Equation 8.

$$P(x, y, z, 1) = \frac{P(X, Y, Z, w)}{w} \quad (10)$$

On the other hand, since the vertices of the polygon data have already been transformed into the eye coordinates by the coordinate transformation unit 102, the viewpoint is the origin and the viewing direction is the Z axis. Therefore, an equation for perspective transformation from the vertices of the polygon data in 3D Euclidean space into the screen coordinates is given by the following Equation 11.

$$(xs, ys) = R\left(\frac{x}{z}, \frac{y}{z}\right) + (xo, yo) \quad (11)$$

In Equation 11, P=(x, y, z) is an arbitrary vertex of polygon data, R is a distance between a viewpoint and a screen, So=(xo, yo) is an origin of a screen coordinate, and Ps=(xs, ys) is a vertex of polygon data in the screen coordinate after perspective transformation.

In Step S209, projection transformation and perspective transformation of each vertex of the polygon data obtained in Step S208 are performed as a single processing using Equation 12.

$$(xs, ys) = R\left(\frac{\frac{x}{w}}{\frac{z}{w}}, \frac{\frac{y}{w}}{\frac{z}{w}}\right) + (xo, yo) \quad (12)$$
$$= R\left(\frac{x}{z}, \frac{y}{z}\right) + (xo, yo)$$

Accordingly, in the present embodiment, division by weights involving perspective transformation can be omitted. Further, after rendering, such as shading and texture mapping, of polygon data using the present light source information is performed in Step S210, the flow goes back to Step S202 for rendering the next frame.

As described above, according to the first embodiment of the present invention, the data transformation unit 104 and the surface patch division unit 105 are provided, so as to transform NURBS data into rational Bezier control point data in Step S204 and then divide the rational Bezier surface patch in Step S205. Accordingly, unlike rendering of a NURBS surface by direct computation, the present invention allows rendering of a NURBS surface with relatively small amount of computation without increase in an amount of data other than control points.

Also, since the coordinate transformation unit 102 transforms NURBS data into the eye coordinate system in advance, viewing transformation does not need to be performed for rational Bezier control point data obtained as a result of subdivision of a rational Bezier surface patch, and thus entire amount of computation involving coordinate transformation can be reduced.

Further, the perspective transformation unit 107 can perform both projection transformation and perspective transformation before rendering as a single processing by handling control points and weights of NURBS data and rational Bezier control point data as control points in the homogeneous coordinate system, and thus division by the weights involving the projection transformation can be omitted, which allows high-speed rendering of a NURBS surface.

In addition, even if the surface patch division unit 105 repeats subdivision of a rational Bezier surface patch in order to obtain sufficiently approximate polygons, the computation required for the subdivision can be realized only by shift operation, multiplication and addition, and thus the processing load can be reduced. Therefore, in the curved surface image processing apparatus 100 according to the present invention, a smooth and high-quality NURBS surface can be obtained as a result of rendering at high speed.

In the first embodiment, the coordinate transformation unit 102 performs eye coordinate transformation for the NURBS data inputted from the data input unit 11, but it may perform eye coordinate transformation on the rational Bezier control point data that forms a rational Bezier surface patch obtained as a result of division by the surface patch division unit 105, without performing eye coordinate transformation in advance.

(Second Embodiment)

The second embodiment of the present invention will be explained below with reference to the drawings.

The functional block diagram of the curved surface image processing apparatus 100 in the second embodiment is same as that in the above first embodiment, and in the second embodiment, it is characterized in that the animation data calculated by the animation control unit 103 is inputted both to the coordinate transformation unit 102 and the data transformation unit 104.

First, the operation of the curved surface image processing apparatus 100 in the second embodiment will be explained with reference to FIG. 11. In the second embodiment, control points and weights of NURBS data and rational Bezier control point data are referred to as control points as a single term, and handled using the homogeneous coordinate system in projection space, as is the case with the first embodiment.

Figure 11:
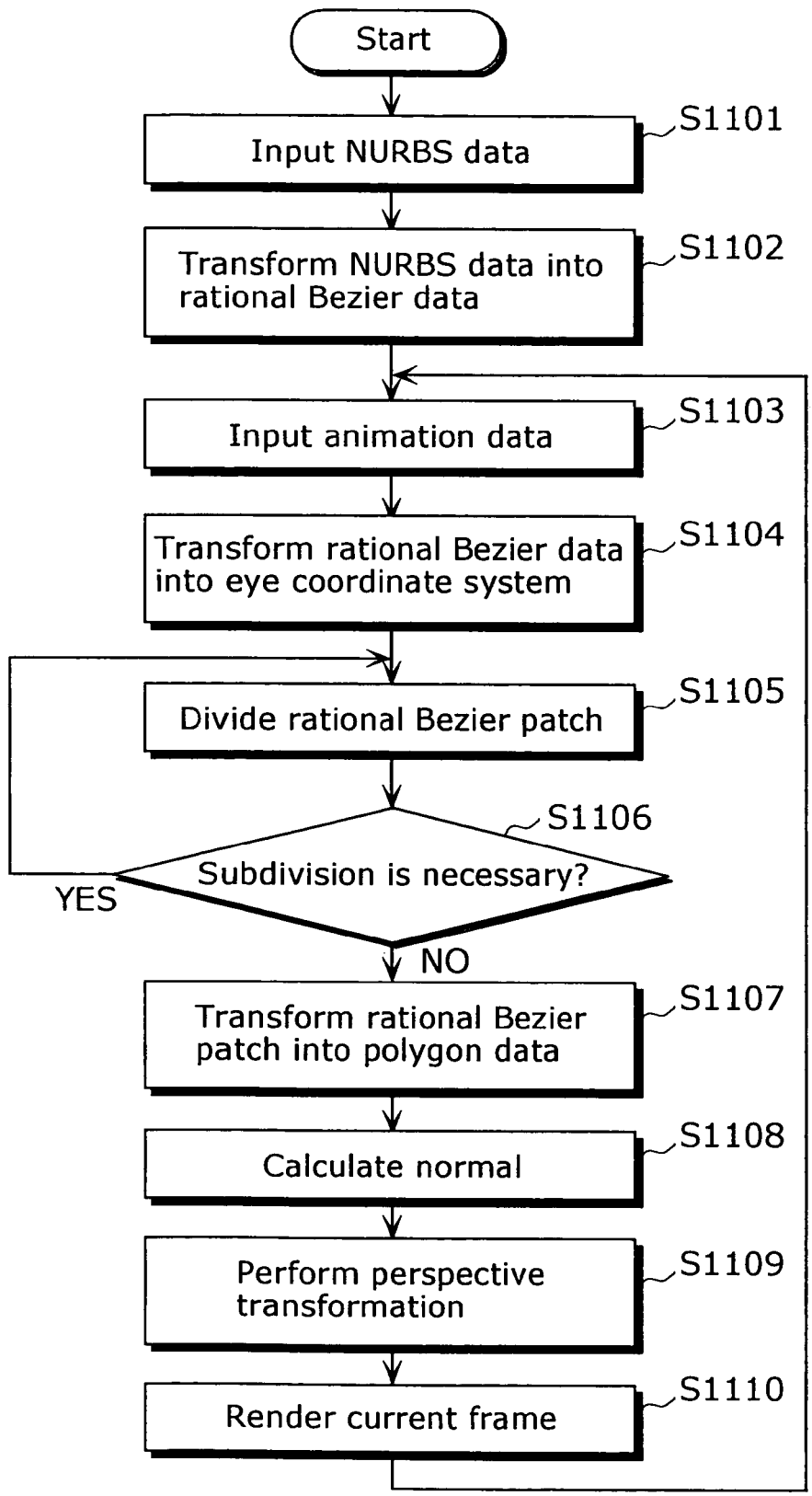
FIG. 11 is a flowchart showing a flow of specific processing performed by a curved surface image processing apparatus in a second embodiment.

FIG. 11 is a diagram showing a flow of specific processing performed by the curved surface image processing apparatus 100 in the second embodiment.

First, the data input unit 101 inputs NURBS data consisting of NURBS control points, weights on respective control points and knot vectors into the data transformation unit 104 (S1101).

Next, the data transformation unit 104 transforms each NURBS curve that forms the NURBS data inputted from the data input unit 101 into a piecewise rational Bezier curve consisting of segments by inserting knots (S1102).

The animation control unit 103 calculates animation data in a current frame (S1103).

The coordinate transformation unit 102 performs modeling transformation, viewing transformation and clipping in 3D space for the rational Bezier control point data that forms each segment calculated by the data transformation unit 101, using information on the viewpoint and viewing direction of the animation data in the current frame obtained from the animation control unit 103, so as to calculate the rational Bezier control point data that forms a segment in the eye coordinate system (S1104).

Next, the surface patch division unit 105 divides the rational Bezier surface patch consisting of segments in the eye coordinate system obtained in Step S1104 based on the calculation by applying t=1/2 to the de Casteljau's algorithm in projection space (S1105).

Then, the surface patch division unit 105 judges whether the present division result is enough or not using a distance between the present viewpoint and the rational Bezier surface patch, and the flow returns to Step S1105 when the division is again needed (NO in S1106).

After all the rational Bezier surface patches are subdivided in a sufficient degree (YES in S1106), the perspective transformation unit 107 transforms the control points of each subdivided rational Bezier surface patch into polygon data having control points of the patch as vertices (S1107), and then the normal determination unit 106 calculates normal vectors of control points of each polygon data (S1108).

The perspective transformation unit 107 performs projection transformation and perspective transformation as single processing for each vertex of the obtained polygon data (S1109). After the rendering unit 108 performs rendering, such as shading and texture mapping, on the polygon data using the present light source information (S1110), the flow goes back to Step S1101 for rendering processing of the next frame. The processing up to Step S1102 is executed only once as preprocessing, and the processing from Step S1103 up to Step S1110 is executed repeatedly for each frame to be rendered.

As described above, the curved surface image processing apparatus 100 in the second embodiment includes the data transformation unit 104, the coordinate transformation unit 102 and the surface patch division unit 105, and the data transformation unit 104 transforms NURBS data into rational Bezier control point data in advance as preprocessing. Therefore, when the shape of a NURBS object does not change over time, namely, deformation is not performed, only the processing following Step 1103 needs to be performed for rendering of each frame, which allows substantial reduction of an amount of computation in the processing for each frame to be rendered. In other words, a high-performance curved surface image processing apparatus 100, which is capable of transforming a smooth and high-quality NURBS surface into a Bezier surface and then subdividing the Bezier surface for real-time rendering, can be structured.

In the second embodiment, it is assumed that deformation is not performed, but even when deformation is performed, the same effect can be obtained by transforming all the key frame data (NURBS data at all the times) into rational Bezier control point data as preprocessing in Step S1102.

Also, in the second embodiment, the coordinate transformation unit 102 performs eye coordinate transformation on the rational Bezier control point data obtained by the data transformation unit 104. However, it may perform eye coordinate transformation on the rational Bezier control point data that forms the rational Bezier surface patch subdivided by the surface patch division unit 105 without performing eye coordinate transformation in advance.

(Third Embodiment)

The curved surface image processing apparatus 100 in the third embodiment will be explained below. The detailed explanation of the functional block diagram of the curved surface image processing apparatus 100 in the third embodiment will be omitted because it is same as that in the first embodiment.

Figure 12:
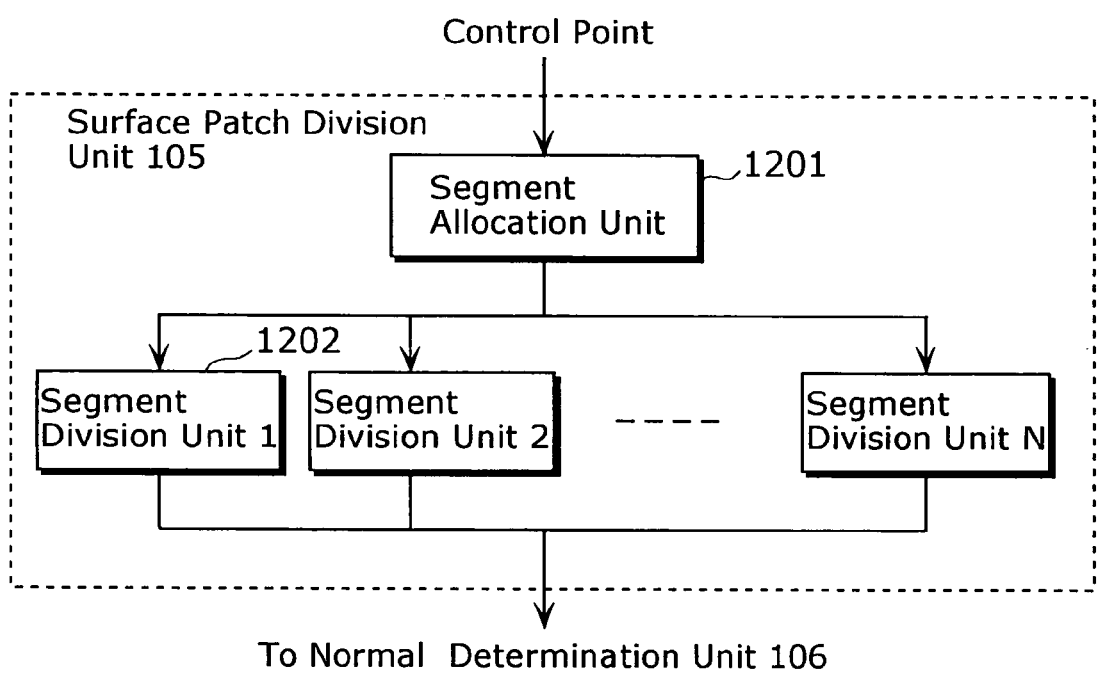
FIG. 12 is a structural block diagram of a surface patch division unit in a third embodiment.

FIG. 12 is the structural block diagram showing the surface patch division unit 105 in the third embodiment. The surface patch division unit 105 includes a segment allocation unit 1201 and at least one segment division unit 1202.

The structure and the operation of the surface patch division unit 105 in the curved surface image processing apparatus 100 will be explained.

The segment division unit 1202 receives four control points that form a cubic segment represented by a parameter u or a parameter v, and outputs seven control points that form two cubic segments obtained as a result of division of these four control points by applying t=1/2 to the de Casteljau's algorithm in projection space. For example, after receiving four control points B1, B2, B3 and B4 that form the segment 51 in FIG. 5, the segment division unit 1202 outputs seven control points B1, C1, D1, B5, D2, C3 and B4 that form two segments B1–B5 and B5–B4.

Here, in the rational Bezier surface patch 71 obtained from the data transformation unit 104, the processing for four segments in the parameter u direction may be performed in any order or all at once. Also, in the rational Bezier surface patch 81 or 82 subdivided in the parameter u direction, the processing for seven segments in the parameter v direction may be performed in any order or all at once. Further, between the different rational Bezier surface patches, for example, the rational Bezier surface patches 81 and 82, the processing for the segments in the parameters u and v directions may be performed in any order or all at once.

Figure 13:
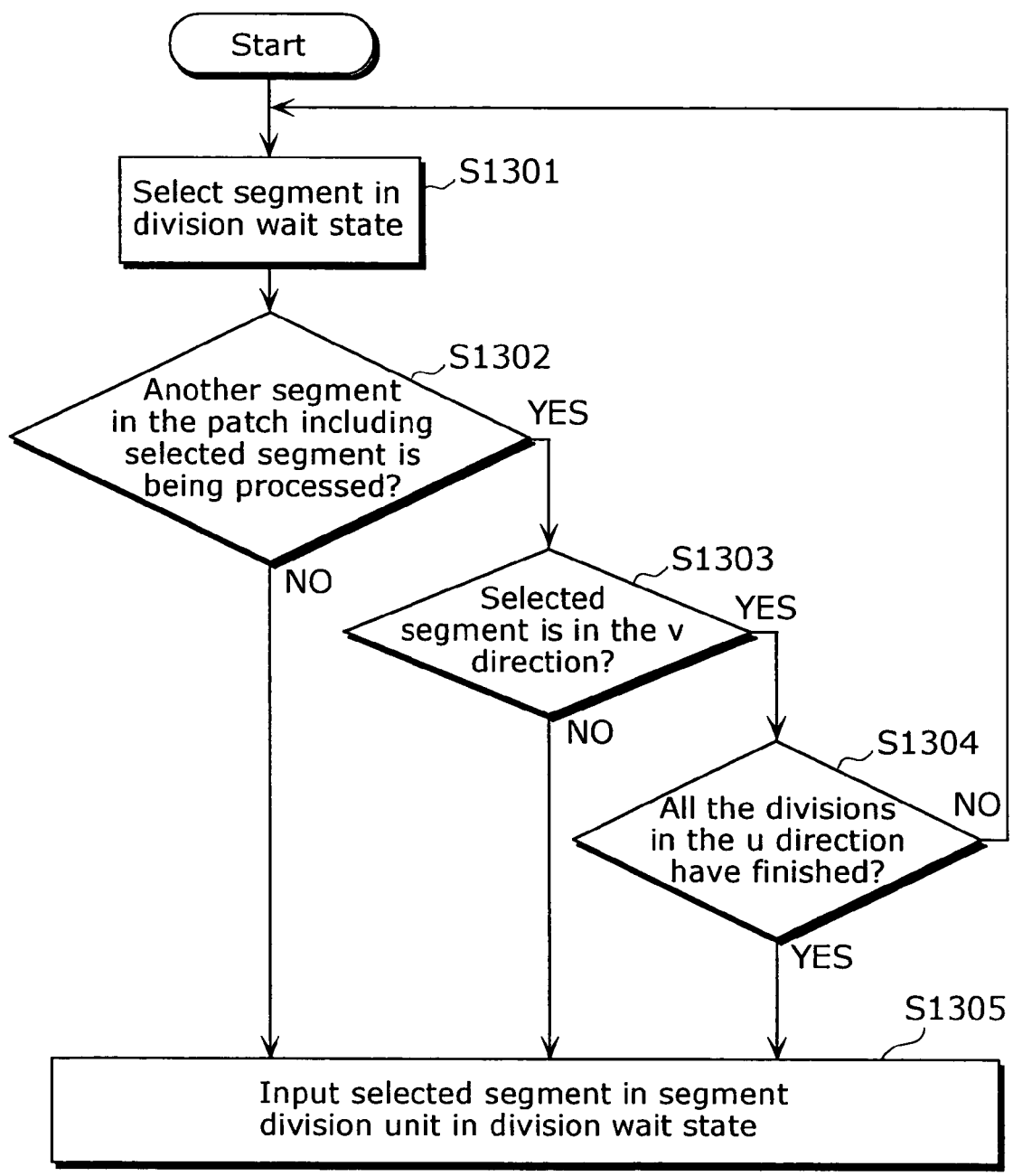
FIG. 13 is a flowchart showing a flow of specific processing performed by a segment allocation unit.

Next, the processing by the segment allocation unit 1201 will be explained with reference to FIG. 13. FIG. 13 is a flowchart showing a flow of the specific processing in the segment allocation unit 1201.

First, the segment allocation unit 1201 selects one segment in a division wait state from among segments that form the rational Bezier surface patch obtained from the data transformation unit.

Next, the segment allocation unit 1201 judges whether or not any of the segment division units 1202 is processing another segment in the patch including the selected segment (S1302). When another segment is not being processed (NO in S1302), the segment allocation unit 1201 inputs the selected segment to any of the segment division units 1202 in a division wait state (S1305).

On the other hand, when another segment is being processed (YES in S1302), the segment allocation unit 1201 judges whether the selected segment is in the v direction or not (S1303). When the segment is not in the v direction (NO in S1303), the segment allocation unit 1201 inputs the segment to any of the segment division units 1202 in the division wait state (S1305).

When the segment is in the v direction (YES in S1303), the segment allocation unit 1201 judges whether or not the same-level divisions in the u direction have already finished for all the segments in the patch including the selected segment. When the divisions have already finished (YES in S1304), the segment allocation unit 1201 inputs the segment to any of the segment division units 1202 in the division wait state (S1305).

When they have not yet finished (NO in S1304), the flow goes back to Step S1301 while the division of the selected segment remains in the wait state. The segment allocation unit 1201 repeats the above-mentioned processing until there remains no segment in the division wait state.

As described above, according to the third embodiment of the present invention, the surface patch division unit 105 includes the segment allocation unit 1201 and at least one segment division unit 1202 for calculating rational Bezier control point data that forms two cubic rational Bezier surfaces obtained by dividing rational Bezier control point data that forms one cubic rational Bezier surface. Accordingly, the division of the segments which can be processed simultaneously is executed in parallel, and thus high-speed division of a surface patch can be realized. As a result, the high-performance curved surface image processing apparatus 100, which allows real-time rendering of a smooth and high-quality NURBS surface, can be structured.

In each of the above first–third embodiments, the NURBS data inputted from the data input unit 101 may be that stored in a memory medium or that transmitted via a network.

In each of the above embodiments, the surface patch division unit 105 applies t=1/2 to the de Casteljau's algorithm, but it may apply $t=1/2^n$ (2 to the $n^{th}$ power, where n is an positive integer). Further, the surface patch division unit 105 first divides a patch in the parameter u direction and then divides it in the v direction, but it may divide a patch in the parameter v direction first, and then divide it in the u direction.

In each of the above embodiments, the perspective transformation unit 107 transforms each rational Bezier surface patch into polygon data having control points on the surface as vertices, but it may transform the patch into polygon data having control points which are not located on the surface as vertices. (For example, it may transform the divided surface patch 91 into polygon data having the control points other than P3, P7, P9 and P6 as vertices.)

All the vertices of the polygon data do not always need to be control points. For example, the divided surface patch 91 may be transformed into four polygon data having the intersection point of the straight lines P3–P9 and P6–P7 and the control points on the four corners as vertices.

Furthermore, each rational Bezier surface patch is transformed into polygon data in each of the above embodiments, but two or more patches may be transformed into one or more polygon data spreading across a boundary between patches. For example, the surface patches 91, 92, 93 and 94 may be transformed into two polygon data P4–P3–P1 and P4–P1–P2.

(Fourth Embodiment)

Next, the curved surface image processing apparatus 100 in the fourth embodiment will be explained.

In the background art, points on a NURBS surface are directly obtained before subdivision of a surface patch. On the contrary, in the curved surface image processing apparatus 100 in the fourth embodiment, the data transformation unit 104 transforms a NURBS surface equivalently into a rational Bezier surface to obtain control points on the Bezier surface before the surface patch division unit 105 subdivides the surface patch. Therefore, there is a problem that unnecessary control points are generated when the data transformation unit 105 inserts knots, but the curved surface image processing apparatus 100 in the fourth embodiment solves this problem.

Figure 14:
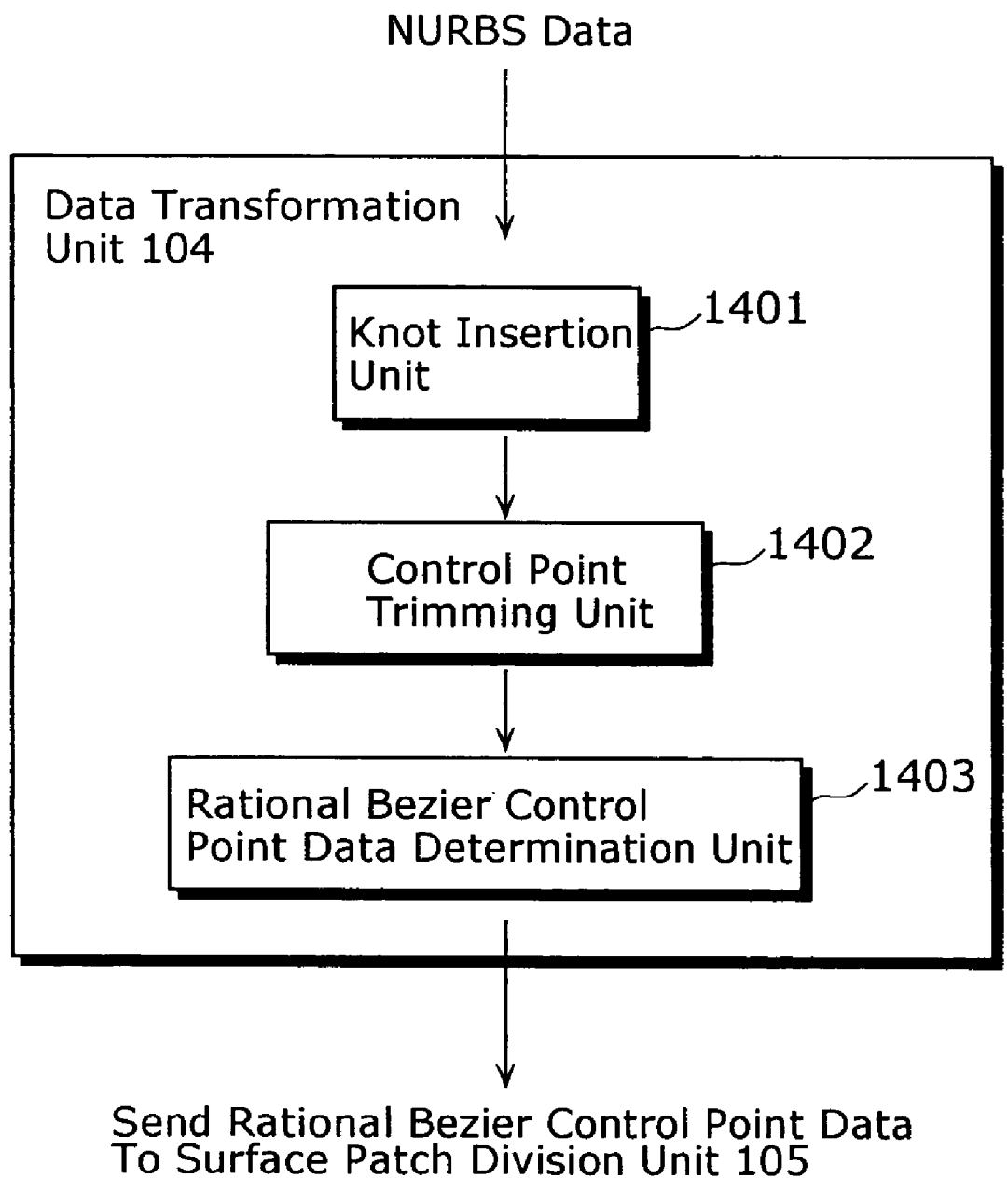
FIG. 14 is a functional block diagram showing a data transformation unit in a fourth embodiment.

FIG. 14 is a functional block diagram showing the structure of the data transformation unit 104 in the fourth embodiment.

In the present embodiment, the data transformation unit 104 includes a knot insertion unit 1401, a control point trimming unit 1402 and a rational Bezier control point data determination unit 1403.

NURBS model data which is inputted to the data transformation unit 104 is model data for describing a NURBS surface. Here, the NURBS model data does not include position coordinates of points on a NURBS surface, which means that it includes a minimum amount of information representing the NURBS surface. Therefore, the load on the data transmission system for transmitting the NURBS model data is small.

The knot insertion unit 1401 performs knot insertion so that knot vectors in the u and v directions that define a NURBS surface are transformed into one or more rational Bezier surfaces finally.

At the same time, the knot insertion unit 1401 updates control points while inserting knots, and finally outputs control points that define a rational Bezier surface whose shape is a perfect match with the shape of the NURBS surface defined by the inputted NURBS model data.

However, the control points outputted from the knot insertion unit 1401 include unnecessary control points that do not define the rational Bezier surface. The control point trimming unit 1402 is a block for deleting these unnecessary control points and transferring only the necessary control points to the subsequent surface patch division unit 105. Therefore, the rational Bezier control point data outputted from the control point trimming unit 1402 is data that includes no unnecessary control point. Here, the rational Bezier control point data is control points that define a rational Bezier surface, but it is control points that define a rational Bezier curve when the NURBS model data is NURBS curve data. This rational Bezier control point data is transferred to the subsequent surface patch division unit 105.

The surface patch division unit 105 is a block for obtaining points on a rational Bezier surface one after another using the inputted rational Bezier control point data and generating plane polygons by combining these control points. In this manner, the surface patch division unit 105 approximates the rational Bezier surface to a collection of plane polygons.

Further, a display unit (not shown in this figure) of the curved surface image processing apparatus 100 displays 3D polygons on a 2D display. It is assumed that the surface patch division unit 105 approximates a rational Bezier curve to a collection of a plurality line segments when the rational Bezier control point data defines the rational Bezier curve.

Next, a method by which the control point trimming unit 1402 in the present embodiment deletes unnecessary control points from control points after knot insertion will be explained.

It is assumed here that initial knot vectors that describe a NURBS surface are (u[0], u[1], . . . u[I+n]) and (v[0], v[1], . . . v[J+m]), where n and m are degrees of basis functions defined by parameters u and v, and I and J are the number of control points in the u and v directions. Knots are inserted so that the NURBS surface defined by these knot vectors is transformed equivalently into a rational Bezier surface, and the finally obtained knot vectors are (u'[0], u'[1], . . . u'[I'+n]) and (v[0], v[1], . . . v[J'+m]), where the final numbers of control points in the u and v directions are I'+n+1 and J'+m+1. These control points include unnecessary control points that do not define a rational Bezier surface.

A range effective for drawing a NURBS surface using the initial knot vectors is that of (u[3], u[I+n−3]) and (v[3], u[J+m−3]). If the knots within this range are multiplexed due to knot insertion and the multiplicity thereof is equivalent to the degree, the original NURBS surface is transformed into a rational Bezier surface.

FIG. 24 shows how control points change by inserting knots into a knot vector in the u direction on a NURBS surface. In the example of FIG. 24, the degree in the u direction is n=3, and a starting knot u[3] in the effective range of the knot vector is multiplexed. If the earlier knots of the knot vector in the u direction (u[0], u[1], u[2], . . . ) have different values from each other and monotonously increase, the finally generated knot vector (u'[0], u'[1], u'[2], . . . ) satisfies the following:
u[0]=u'[0]
u[1]=U'[1]
u[2]=u'[2]
u[3]=u'[3]=u'[4]=u'[5]

First, when a knot ~u=u'[4] whose value is equivalent to u[3] is inserted, a knot insertion position is k=3 and thus the coefficient array is as follows:

$a[0]=1$ $a[1]=(\sim u-u[1])/(u[4]-u[1])=(u[3]-u[1])/(u[4]-u[1])$ $a[2]=(\sim u-u[2])/(u[5]-u[2])=(u[3]-u[2])/(u[5]-u[2])$ $a[3]=(\sim u-u[3])/(u[6]-u[3])=0$ $a[4]=0$ Therefore, control points to be generated are as follows:

$<Q'[0]>=a[0]*<Q[0]>=<Q[0]>$ $<Q'[1]>=(1-a[1])*<Q[0]>+a[1]*<Q[1]>$ $<Q'[2]>=(1-a[2])*<Q[1]>+a[2]*<Q[2]>$ $<Q'[3]>=(1-a[3])*<Q[2]>+a[3]*<Q[3]>=<Q[2]>$ $<Q'[4]>=(1-a[4])*<Q[3]>+a[4]*<Q[4]>=<Q[3]>$

Therefore, a control point <Q[1]> disappears, and new control points <Q'[1]> and <Q'[2]> are generated. Control points that define a NURBS surface are represented by 2D arrays having indices i and j, but for the sake of simplicity, they are represented here only by a one-dimensional array in the u direction. Such simplification does not trade off generality. Further, when a knot ~u=u'[5] whose value is equivalent to u[3] is inserted, a knot insertion position is k=4, and thus the coefficient array is as follows:

$a[0]=1$ $a[1]=1$ $a[2]=(u[3]-u[2])/(u[4]-u[2])$ $a[3]=0$ $a[4]=0$

Control points to be generated using these arrays are as follows:

$<Q''[0]>=a[0]*<Q'[0]>=<Q'[0]>=<Q[0]>$ $<Q''[1]>=(1-a[1])*<Q'[0]>+a[1]*<Q'[1]>=<Q'[1]>$ $<Q''[2]>=(1-a[2])*<Q'[1]>+a[2]*<Q'[2]>$ $<Q''[3]>=(1-a[3])*<Q'[2]>+a[3]*<Q'[3]>=<Q'[2]>$ $\langle Q''[4]\rangle = (1-a[4])*\langle Q'[3]\rangle + a[4]*\langle Q'[4]\rangle = \langle Q'[3]\rangle = \langle Q[2]\rangle$ Therefore, a new control point <Q''[2]> is generated.

Next, the following shows that the new control point <Q''[2]> is a starting point on the original NURBS surface. The basis function of the NURBS surface is calculated recursively by substituting u=u[3] into the Cox-de Boor's recurrence formula. First, as for n=0, the following is obtained:

$B[0][3](u[3])=1$ $B[0][i](u[3])=0$ (where $i$ is not 3)

As for n=1, the following is obtained using the above:

$B[1][2](u[3])=1$ $B[1][i](u[3])=0$ (where $i$ is not 2)

As for n=2, the following is further obtained using the above:

$B[2][1](u[3])=(u[4]-u[3])/(u[4]-u[2])$ $B[2][2](u[3])=(u[3]-u[2])/(u[4]-u[2])$ $B[2][i](u[3])=0$ (where $i$ is not 1 or 2)

As for n=3, the following is further obtained using the above:

$B[3][0](u[3])=(u[4]-u[3])/(u[4]-u[1])*B[2][1](u[3])$ $B[3][1](u[3])=(u[3]-u[1])/(u[4]-u[1])*B[2][1](u[3])+(u[5]-u[3])/(u[5]-u[2])*B[2][2](u[3])$ $B[3][2](u[3])=(u[3]-u[2])/(u[5]-u[2])*B[2][2](u[3])$ $B[3][i](u[3])=0$ (where $i$ is 3 or larger)

As a result, the starting point of the NURBS surface is as follows, where coefficient arrays are ~a[i]=1−a[i], ~a'[i]=1−a'[i]:

$$< P(u[3]) > = B[3][0](u[3]) * < Q[0] > + B[3][1](u[3]) * < Q[1] > +$$
$$B[3][2](u[3]) * < Q[2] >$$
$$= \sim a'[2] * \sim a[1] * < Q[0] > +$$
$$(\sim a'[2] * \sim a[1] + \sim a'[2] * \sim a[1]) * < Q[1] > +$$
$$a'[2] * a[2] * < Q[2] >$$
$$= < Q''[2] >$$

Therefore, the starting point of the original NURBS surface coincides with the control point <Q''[2]> of the transformed rational Bezier surface, and thus two control points <Q''[0]> and <Q''[1]> become unnecessary.

Another example where elements of an initial knot vector include multiplicity will be explained with reference to FIG. 25. If u[2] is equal to u[3] in the earlier knots of the knot vector in the u direction (u[0], u[1], u[2], . . . ), the finally generated knot vector (u'[0], u'[1], u'[2], . . . ) satisfies the following:
u[0]=u'[0]
u[1]=u'[1]
u[2]=u[3]=u'[2]=u'[3]=u'[4]

When a knot ~u=u'[4] whose value is equivalent to u[2] and u[3] is inserted, a knot insertion position is k=3 and thus the coefficient array is as follows:

$a[0]=1$ $a[1]=(\sim u-u[1])/(u[4]-u[1])=(u[2]-u[1])/(u[4]-u[1])$ $a[2]=(\sim u-u[2])/(u[5]-u[2])=0$ $a[3]=(\sim u-u[3])/(u[6]-u[3])=0$ $a[4]=0$ Therefore, control points to be generated using the above are as follows:

$<Q'[0]> = a[0] * <Q[0]> = <Q[0]>$ $<Q'[1]> = (1-a[1]) * <Q[0]> + a[1] * <Q[1]>$ $<Q'[2]> = (1-a[2]) * <Q[1]> + a[2] * <Q[2]> = <Q[1]>$ $<Q'[3]> = (1-a[3]) * <Q[2]> + a[3] * <Q[3]> = <Q[2]>$ $<Q'[4]> = (1-a[4]) * <Q[3]> + a[4] * <Q[4]> = <Q[3]>$

On the other hand, the non-zero basis function that defines the original NURBS surface is as follows:

$B[2][1](u[3]) = (u[4]-u[3])/(u[4]-u[2]) = 1$ $B[3][0](u[3]) = (u[4]-u[3])/(u[4]-u[1]) * B[2][1](u[3])$ $B[3][1](u[3]) = (u[3]-u[1])/(u[4]-u[1]) * B[2][1](u[3])$

As a result, the starting point of the NURBS surface is as follows:

$$< P(u[3]) > = B[3][0](u[3]) * < Q[0] > + B[3][1](u[3]) * < Q[1] >$$
$$= (1 - a[1]) * < Q[0] > + a[1]) * < Q[1] >$$
$$= < Q'[1] >$$

Therefore, this starting point coincides with the control point $<Q'[1]>$, and thus only one control point $<Q'[0]>$ becomes unnecessary.

Figure 26:
FIG. 26 is a diagram explaining specification of unnecessary control points in the fourth embodiment.
Figure 27:
FIG. 27 is a diagram explaining specification of unnecessary control points in the fourth embodiment.
Figure 28:
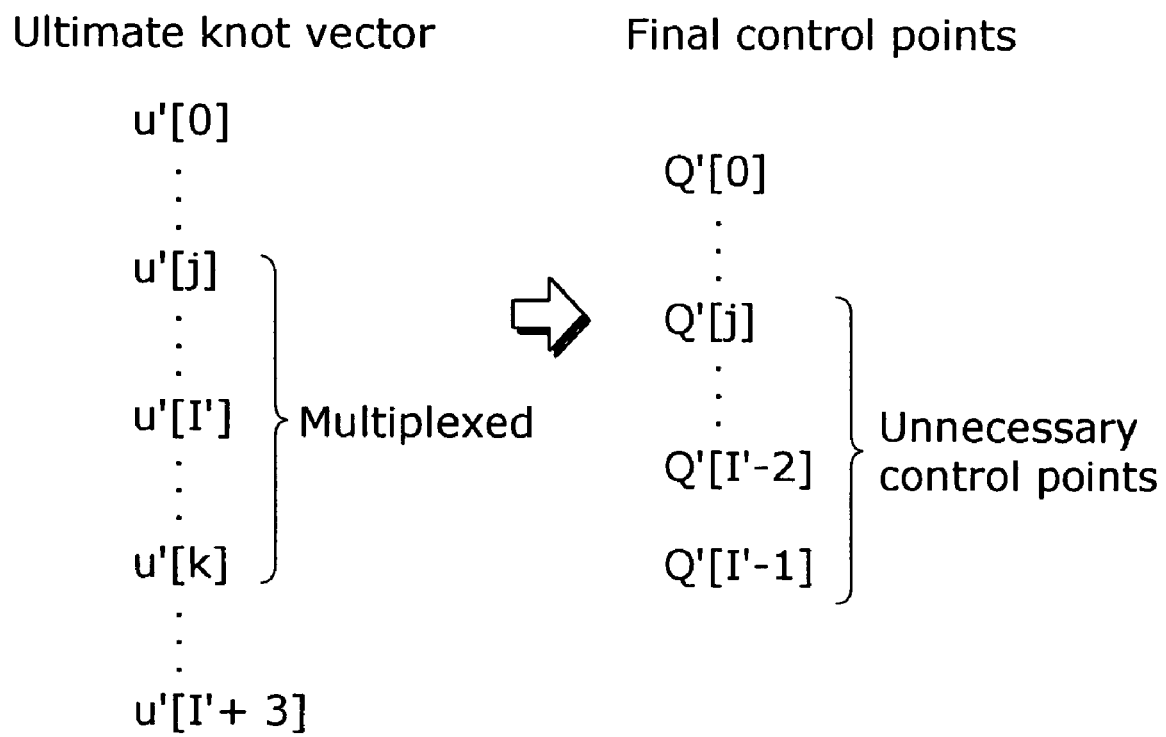
FIG. 28 is a diagram explaining how to trim control points in the fourth embodiment.

Furthermore, still another example where elements of an initial knot vector include multiplicity will be explained with reference to FIG. 26. If u[3] is equal to u[4] in the earlier knots of the knot vector in the u direction (u[0], u[1], u[2], . . . ), the finally generated knot vector (u'[0], u'[1], u'[2], . . . ) satisfies the following:

u[0]=u'[0]

u[1]=u'[1]

u[2]=u'[2]

u[3]=u[4]=u'[3]=u'[4]=u'[5]

When a knot ~u=u'[5] whose value is equivalent to u[3] and u[4] is inserted; a knot insertion position is k=4 and thus the coefficient array is as follows:

$a[0]=1$ $a[1]=1$ $a[2]=(~u-u[2])/(u[5]-u[2])=(u[3]-u[2])/(u[5]-u[2])$ $a[3]=(~u-u[3])/(u[6]-u[3])=0$ $a[4]=(~u-u[4])/(u[7]-u[4])=0$

Therefore, control points to be generated using the above are as follows:

$<Q'[0]> = a[0] * <Q[0]> = <Q[0]>$ $<Q'[1]> = (1-a[1]) * <Q[0]> + a[1] * <Q[1]> = <Q[1]>$ $<Q'[2]> = (1-a[2]) * <Q[1]> + a[2] * <Q[2]>$ $<Q'[3]> = (1-a[3]) * <Q[2]> + a[3] * <Q[3]> = <Q[2]>$ $<Q'[4]> = (1-a[4]) * <Q[3]> + a[4] * <Q[4]> = <Q[3]>$

On the other hand, the starting point of the NURBS surface is as follows:

$$< P(u[3]) > = B[3][1](u[3]) * < Q[1] > + B[3][2](u[3]) * < Q[2] >$$
$$= (1 - a[2]) * < Q[1] > + a[2]) * < Q[2] >$$
$$= < Q'[2] >$$

Therefore, this starting point coincides with the control point $<Q'[2]>$, and thus two control points $<Q'[0]>$ and $<Q'[1]>$ become unnecessary.

When the degree n=3 is generalized according to the above examples, the following holds for control points which becomes unnecessary after knot insertion. When the finally generated control points are (Q'[0], Q'[1], . . . Q'[I'-1]), the finally generated knot vector is (u'[0], u'[1], . . . u'[I'+3]), the values of (k-j+1) knots in (u'[j], . . . , u'[3], . . . , u'[k]) are equal to the value of the knot u'[3] that is the starting point of rendering a NURBS surface, and the knots in this range are multiplexed at 3 or higher multiplicity level, (k-3) control points in the control points (Q'[0], Q'[1], . . . , Q'[k-4]) are unnecessary.

Note that unnecessary control points are generated not only at the starting point of a NURBS surface but also at the ending point thereof. In this case, considering that relation of indices between control points and a knot vector is in the reverse direction, unnecessary control points can be deleted in exactly the same manner. To be more specific, when the finally generated control points are (Q'[0], . . . Q'[I'-2], Q'[I'-1]), the finally generated knot vector is (u'[0], . . . , u'[I'+2], u'[I'+3]), the values of (k-j+1) knots in (u'[j], . . . , u'[I'], . . . , u'[k]) are equal to the value of the knot u'[I'] that is the ending point of rendering a NURBS surface, and the knots in this range are multiplexed at 3 or higher multiplicity level, (I'-j) control points in the control points (Q'[j], . . . , Q'[I'-2], Q'[I'-1]) are unnecessary.

A method of deleting unnecessary control points in control points in the u direction has been described, but this method can also be applied to control points in the v direction in the same manner. Also, a control point has weight actually, but the above-mentioned method of deleting unnecessary control points can be applied using a homogeneous coordinate obtained by multiplying a position coordinate by the weight.

Figure 15:
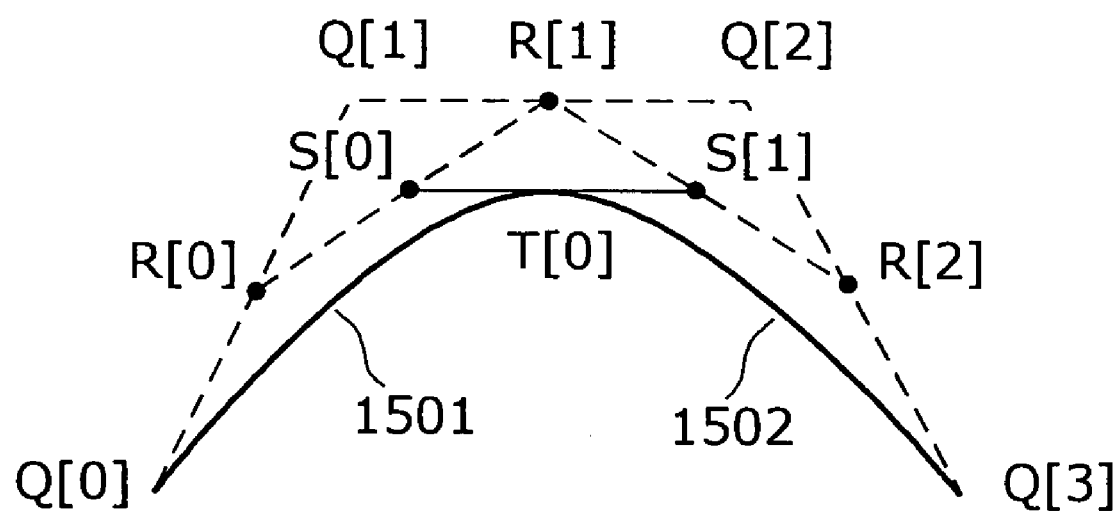
FIG. 15 is a diagram explaining an application of a subdivision method to a rational Bezier curve.

Polygon division of a rational Bezier surface using the subdivision method will be explained below. First, for the sake of simplicity, a rational Bezier curve will be described. Suppose the rational Bezier curve is approximated to a plurality of line segments using the subdivision method, as shown in FIG. 15. The rational Bezier curve in FIG. 15 is defined by the degree n=3 and four control points (Q[0], Q[1], Q[2], Q[3]). The weight on each control point is qw[i], where i=0, 1, 2, 3. As shown in FIG. 15, the rational Bezier curve is a curve having the control points Q[0] and Q[3] as both ends thereof. According to the subdivision method in the present embodiment, new points (R[0], R[1], R[2]) are added at the midpoints between respective adjacent two control points. The coordinate calculation is performed as follows using the homogeneous coordinate obtained by multiplying the position coordinate by the weight:

$rw[0] * <R[0]> = (qw[0] * <Q[0]> + qw[1] * <Q[1]>)/2$ $rw[1] * <R[1]> = (qw[1] * <Q[1]> + qw[2] * <Q[2]>)/2$ $rw[2] * <R[2]> = (qw[2] * <Q[2]> + qw[3] * <Q[3]>)/2$ where, $$rw[0]=(qw[0]+qw[1])/2$$

$$rw[1]=(qw[1]+qw[2])/2$$

$$rw[2]=(qw[2]+qw[3])/2$$

New points (S[0], S[1]) are further added at the midpoints between R[0] and R[1] and R[1] and R[2], and the coordinates thereof are as follows:

$$sw[0]*<S[0]>=(rw[0]*<R[0]>+rw[1]*<R[1]>)/2$$

$$sw[1]*<S[1]>=(rw[1]*<R[1]>+rw[2]*<R[2]>)/2$$

where, $$sw[0]=(rw[0]+rw[1])/2$$

$$sw[1]=(rw[1]+rw[2])/2$$

A new point T[0] is further added at the midpoint between S[0] and S[1], and the coordinate thereof is as follows:

$$tw[0]*<T[0]>=(sw[0]*<S[0]>+sw[1]*<S[1]>)/2$$

where, $$tw[0]=(sw[0]+sw[1])/2$$

As a result of the above calculation, the original rational Bezier curve is divided into two continuous rational Bezier curves, a rational Bezier curve 1501 that is formed by the control points (Q[0], R[0], S[0], T[0]) and a rational Bezier curve 1502 that is formed by the control points (T[0], S[1], R[2], Q[3]), and the final point T[0] is a point on the original rational Bezier curve. Therefore, the original rational Bezier curve can be approximated to two line segments (Q[0], T[0]) and (T[0], Q[3]). In order to improve approximation degree by further dividing the line segments, subdivision of these divided line segments 1501 and 1502 can be repeated using the subdivision method again. As mentioned above, subdivision processing is iterations of multiplication, addition and division by "2", and much simpler than the computation for obtaining a NURBS basis function.

On the analogy of the above-mentioned subdivision method for rational Bezier curves, polygon division can be done using this subdivision method for rational Bezier surfaces. A curved surface is defined by a 2D array of control points having indices i and j corresponding to parameters u and v, namely, the control points are expressed as Q[i][j]. How to do polygon division by applying the subdivision method to a rational Bezier surface will be explained with reference to FIG. 16.

Figure 16:
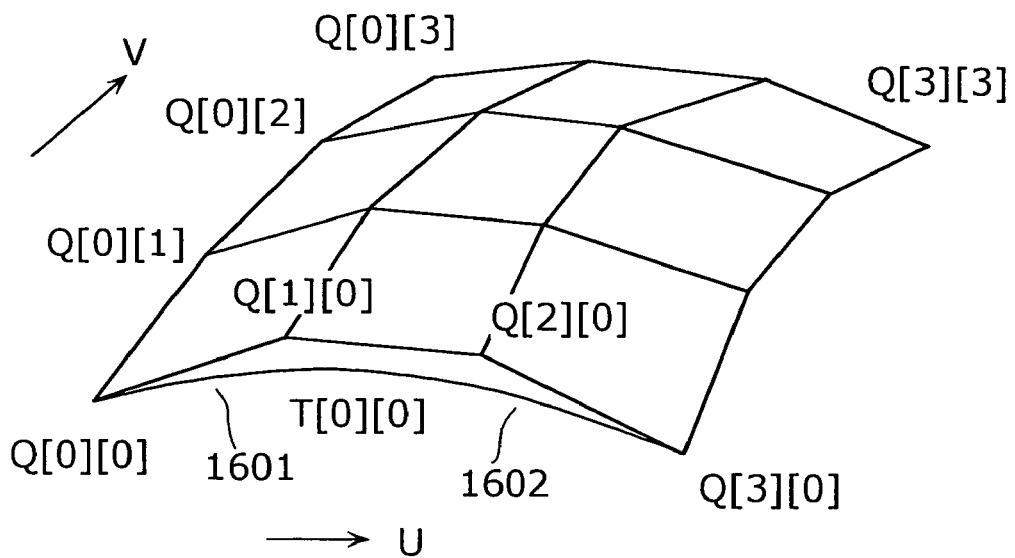
FIG. 16 is a diagram showing schematically control points that define a rational Bezier surface.

FIG. 16 is a schematic diagram showing control points that define a rational Bezier surface, not showing the rational Bezier surface itself. In this figure, the degree is n=m=3 in both u direction and v direction, and the number of control points is 4×4=16. In FIG. 16, the control points (Q[0][0], Q[1][0], Q[2][0], Q[3][0]) at the four corners are points on the rational Bezier surface.

The subdivision method is applied to this rational Bezier surface using 4 control points (Q[0][0], Q[1][0], Q[2][0], Q[3][0]) by fixing the value of the index j of the control points to 0. As a result, a rational Bezier curve 1601 that is formed by the control points (Q[0][0], R[0][0], S[0][0], T[0][0]) and a rational Bezier curve 1602 that is formed by the control points (T[0][0], S[1][0], R[2][0], Q[3][0]) are generated, and a new point T[0][0] on the original rational Bezier surface is obtained. FIG. 16 indicates this point only.

Figure 17:
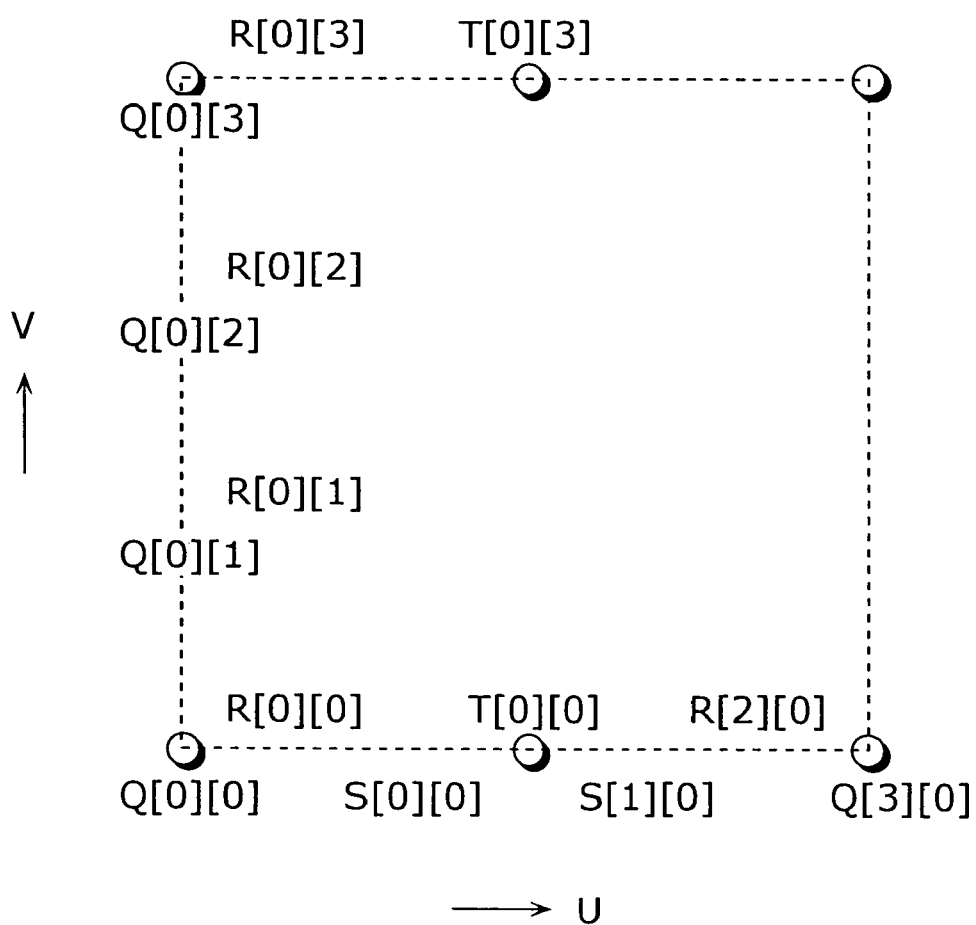
FIG. 17 is a diagram explaining an application of the subdivision method to a rational Bezier surface.

Next, the subdivision method is applied using 4 control points (Q[0][1], Q[1][1], Q[2][1], Q[3][1]) by incrementing the indices j by 1 so as to calculate a new control point in the same manner. As a result, control points (Q[0][1], R[0][1], S[0][1], T[0][1]) and control points (T[0][1], S[1][1], R[2][1], Q[3][1]) are obtained. These are intermediate data which is generated during the process of calculation, and the control points Q[0][1] and Q[3][1] are not points on the original rational Bezier surface, and thus the generated control point T[0][1] is not also a point on the original rational Bezier surface. The same processing is repeated until the index j becomes 3. FIG. 17 shows 28 control points which are generated up to then, the points T[0][0] and T[0][3] among them are new points on the original rational Bezier surface. Note that ○ is marked on the control points on the original rational Bezier surface.

Further, the control points generated by the above-mentioned subdivision method in the u direction are separated into the following seven sets of control points, and the subdivision method is applied again to each of these sets in the v direction.

(Q[0][0], Q[0][1], Q[0][2], Q[0][3])
(R[0][0], R[0][1], R[0][2], R[0][3])
(S[0][0], S[0][1], S[0][2], S[0][3])
(T[0][0], T[0][1], T[0][2], T[0][3])
(S[1][0], S[1][1], S[1][2], S[1][3])
(R[2][0], R[2][1], R[2][2], R[2][3])
(Q[3][0], Q[3][1], Q[3][2], Q[3][3])

Figure 18:
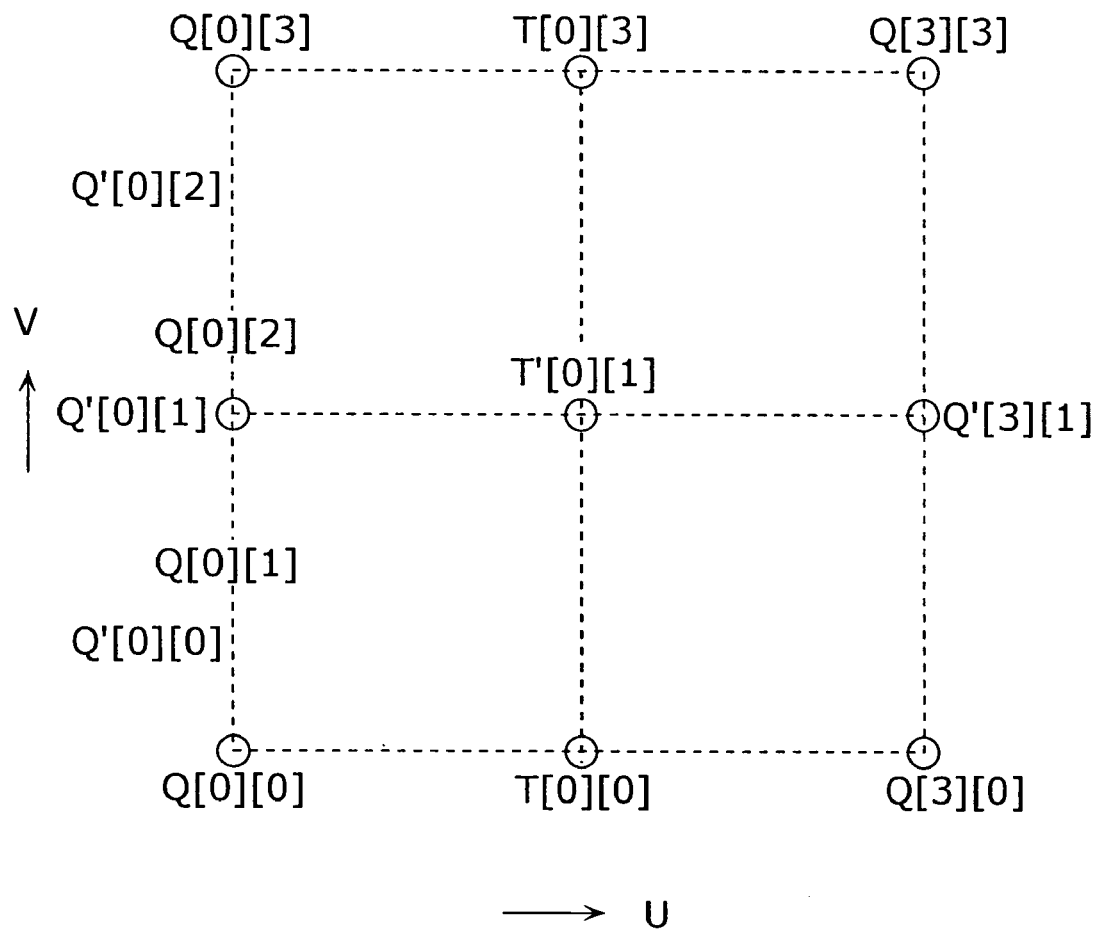
FIG. 18 is a diagram explaining an application of the subdivision method to a rational Bezier surface.
Figure 19:
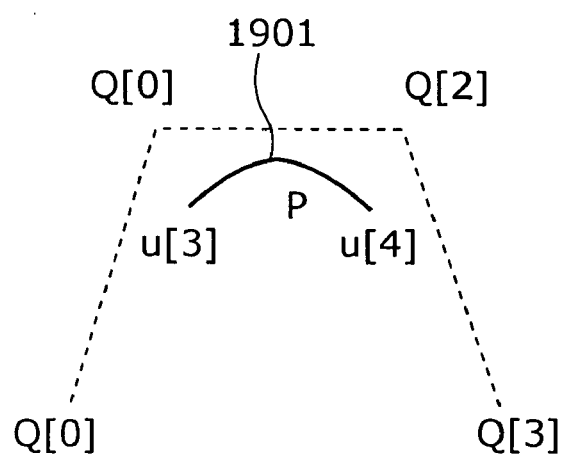
FIG. 19 is a diagram explaining an application of the subdivision method to a rational Bezier curve.
Figure 20:
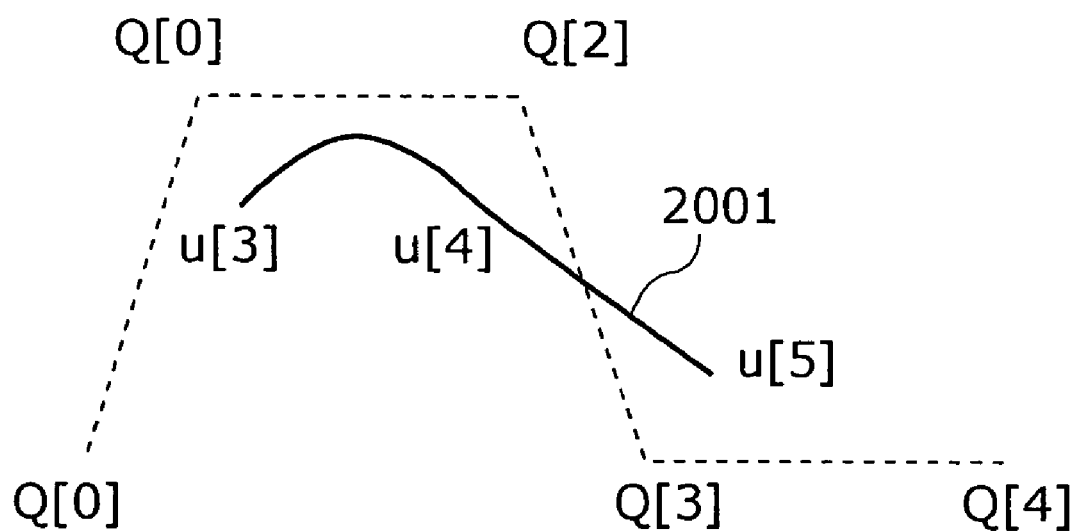
FIG. 20 is a diagram showing an example of a NURBS curve.
Figure 21:
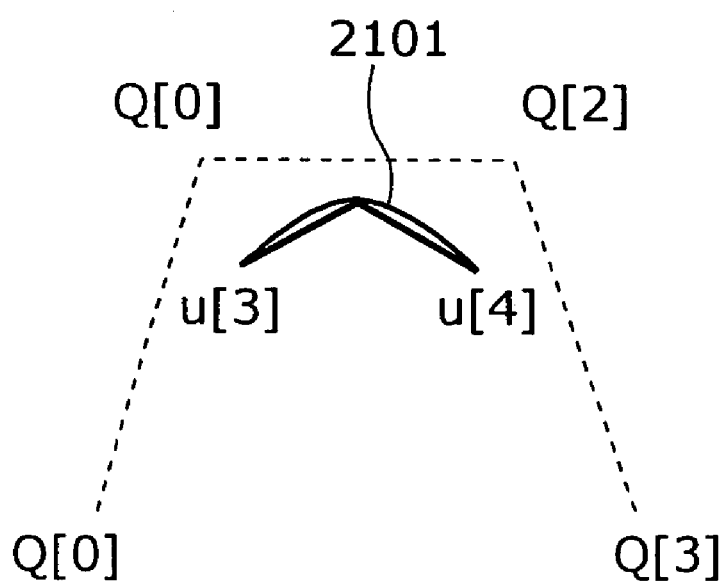
FIG. 21 is a diagram showing an example of a NURBS curve.
Figure 22:
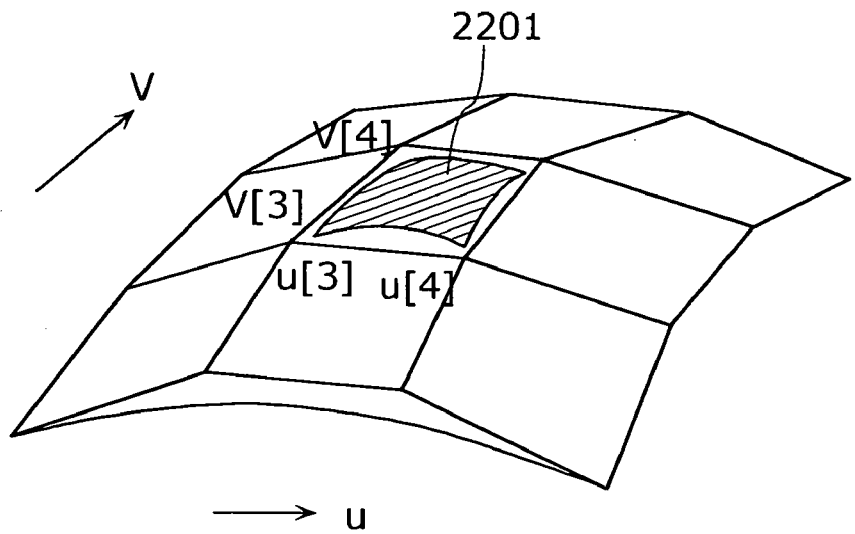
FIG. 22 is a diagram explaining conventional segment approximation of a NURBS surface.
Figure 23:
FIG. 23 is a diagram explaining conventional polygon division of a NURBS surface.

As shown in FIG. 18, when applying the subdivision method to the first set of control points (Q[0][0], Q[0][1], Q[0][2], Q[0][3]), control points (Q[0][0], Q'[0][0], Q[0][1], Q'[0][1]) and control points (Q'[0][1], Q[0][2], Q'[0][2], Q[0][3]) are obtained. Here the point Q'[0][1] is a point on the original rational Bezier surface. By applying the subdivision method to other sets of control points in the same manner, 7×7=49 control points are obtained finally, and the original rational Bezier surface is divided into 4 small rational Bezier surfaces that are defined by 4×4=16 control points. 4 control points at the corners, among the control points on each of the small rational Bezier surfaces, are points on the original rational Bezier surface, namely, 9 points on the rational Bezier surface are obtained. In FIG. 18, ○ is marked on the control points on the original rational Bezier surface. Plane polygons can be structured by combining the control points adjacent to each other on the rational Bezier surface. In order to improve approximation degree by further dividing the polygons into smaller polygons, the subdivision method can also be applied again to the divided rational Bezier surfaces.

The above-mentioned subdivision processing in the surface patch division unit 105 of the curved surface image processing apparatus 100 in the fourth embodiment needs a smaller amount of computation than direct calculation of control points on a NURBS surface because unnecessary control points are deleted by the control point trimming unit 1402. Use of the method of deleting unnecessary control points that do not define a rational Bezier surface allows efficient transformation of sets of control points on a given NURBS surface into sets of control points on a rational Bezier surface to which the subdivision processing can be applied.

(Fifth Embodiment)

Next, the processing performed by the surface patch division unit 105 of the curved surface image processing apparatus 100 of the present invention will be explained.

The processing performed by the surface patch division unit 105 will be explained in the following fifth–eighth embodiments.

The surface patch division unit 105 of the curved surface image processing apparatus 100 in the fifth embodiment will be explained below with reference to the drawings.

Figure 29:
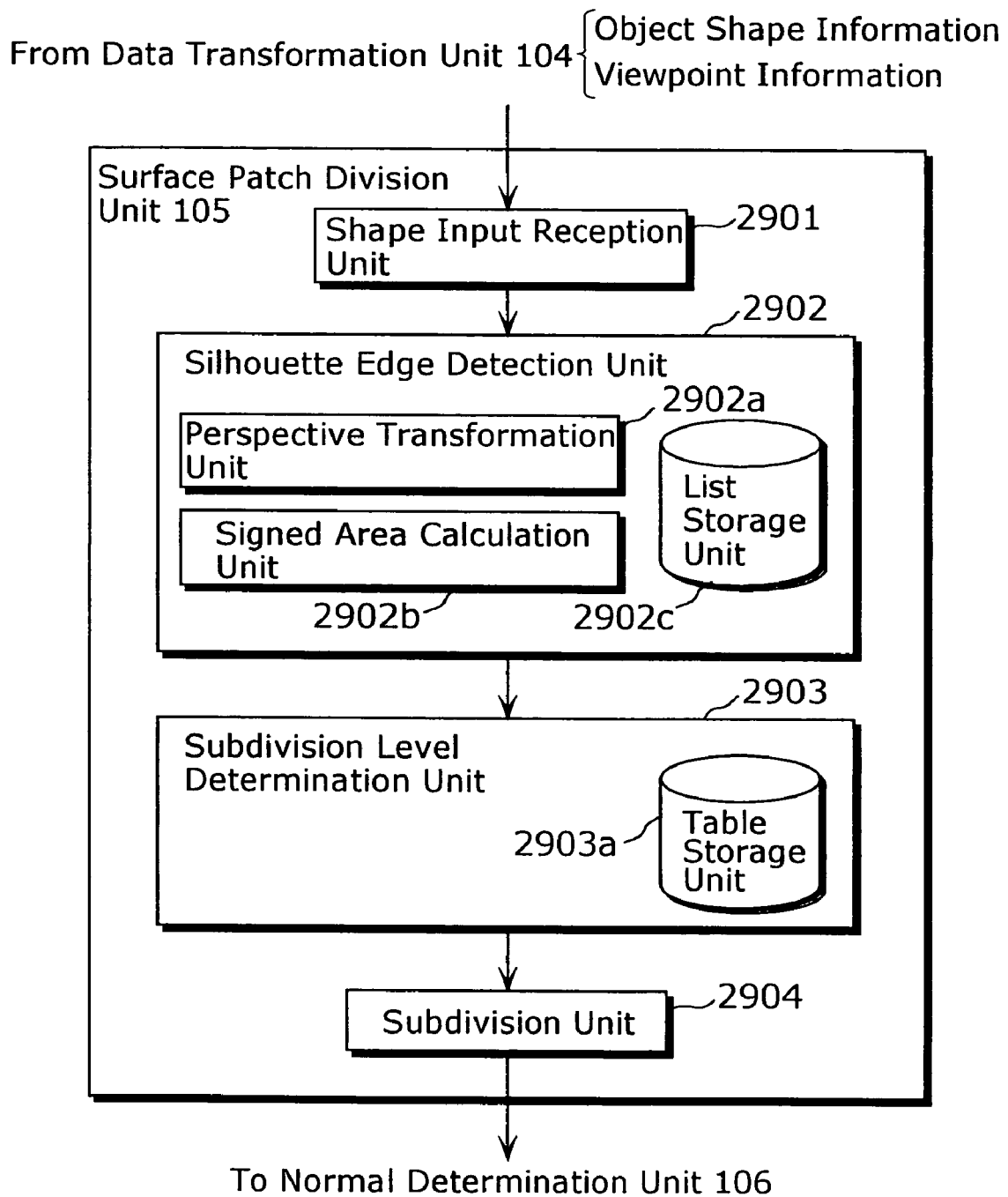
FIG. 29 is a functional block diagram showing a surface patch division unit in a fifth embodiment.

FIG. 29 is a functional block diagram showing the structure of the surface patch division unit 105 in the fifth embodiment.

The surface patch division unit 105 in the fifth embodiment includes a shape input reception unit 2901, a silhouette edge detection unit 2902, a subdivision level determination unit 2903 and a subdivision unit 2904. The function of each unit will be described below in detail.

The shape input reception unit 2901 receives input of viewpoint information and object shape information from the data transformation unit 104. Here, the viewpoint information includes a viewing transformation matrix for transforming representation in a global coordinate system into that in a viewpoint coordinate system defined by viewpoints and a perspective transformation matrix for transforming representation in the viewpoint coordinate system into that in a coordinate system defined on a 2D screen by perspective transformation, and the object shape information is information on the shape of an object to be rendered.

This object shape information inputted from the data transformation unit 104 includes coordinates of control points defining the shapes of patches that make up the object (homogeneous coordinate system representation) and adjacent patch information that is information on patches adjacent to respective patches. How to represent adjacent patch information is not particularly limited. For example, adjacent patch information may be represented by ordering one by one indices assigned to patches adjacent to each other at v=0, u=1, v=1 and u=0 in parametric space. When there is no adjacent patch, a special index, for example, "−1", may be assigned. The object shape information may also include attribute information of patches used for rendering, for example, normal vectors of vertices, texture coordinate information and the like.

The silhouette edge detection unit 2902 judges whether or not each patch that makes up the object obtained by the shape input reception unit 2901 is a patch that forms a silhouette edge. In order to hold the judgment result, an identifier (hereinafter referred to as an edge identifier) indicating whether each patch is a silhouette edge forming patch or not is defined for the patch, and the edge identifier 0 indicates that the patch is not a silhouette edge forming patch when the default value thereof is 0, for example.

Figure 31:
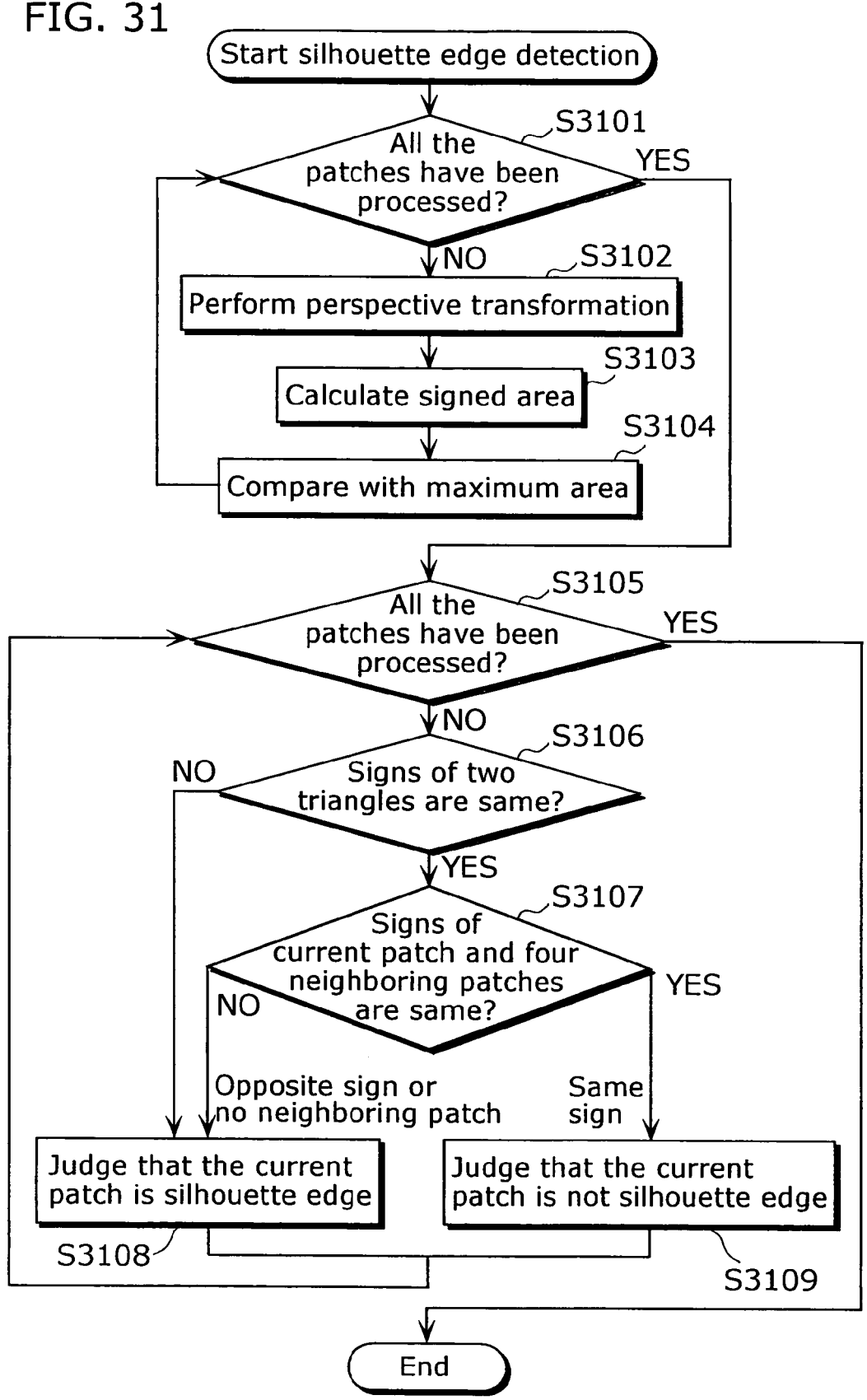
FIG. 31 is a flowchart showing a flow of processing performed by a silhouette edge detection unit in the fifth embodiment.

FIG. 31 is a flowchart showing a flow of processing in the silhouette edge detection unit 2902 in the fifth embodiment. The flow of the processing in the silhouette edge detection unit 2902 will be explained.

First, as for each patch, a perspective transformation unit 2902a of the silhouette edge detection unit 2902 performs perspective transformation to transform 4 vertices $Q_{00}$, $Q_{30}$, $Q_{03}$ and $Q_{33}$ on a surface among control points into coordinates on a screen using the viewing transformation matrix and the perspective transformation matrix included in the viewpoint information (S3102).

Next, a signed area calculation unit 2902b calculates a signed area of a 2D graphic that is formed by these 4 vertices transformed on the screen (S3103). Generally, a signed area S of a triangle that is defined by 3 vertices A ($a_x$, $a_y$), B ($b_x$, $b_y$), C ($c_x$, $c_y$) on a 2D plane is obtained by the following Equation 13. The triangle is front facing when the signed area is plus, whereas the triangle is back facing when the signed area is minus.

$$S = \frac{1}{2} \begin{vmatrix} a_x & a_y & 1 \\ b_x & b_y & 1 \\ c_x & c_y & 1 \end{vmatrix} \qquad (13)$$

When the coordinates on the screen after the perspective transformation of these 4 vertices $Q_{00}$, $Q_{30}$, $Q_{03}$ and $Q_{33}$ are respectively $R_{00}(r_{00x}, r_{00y})$, $R_{30}(r_{30x}, r_{30y})$, $R_{03}(r_{03x}, r_{03y})$, and $R_{33}(r_{33x}, r_{33y})$, the graphic that is formed by these 4 vertices are divided into two triangles $R_{00}$, $R_{30}$, $R_{03}$ and $R_{30}$, $R_{33}$, $R_{03}$ and respective signed areas thereof $S_0$ and $S_1$ are calculated by the following equations.

$S_0 = (r_{00x}*r_{30y} + r_{03x}*r_{00y} + r_{30x}*r_{03y} - r_{03x}*r_{30y} - r_{30x}*r_{00y} - r_{00x}*r_{03y})/2$ $S_1 = (r_{30x}*r_{33y} + r_{03x}*r_{30y} + r_{33x}*r_{03y} - r_{03x}*r_{33y} - r_{33x}*r_{30y} - r_{30x}*r_{03y})/2$

Figure 32B:
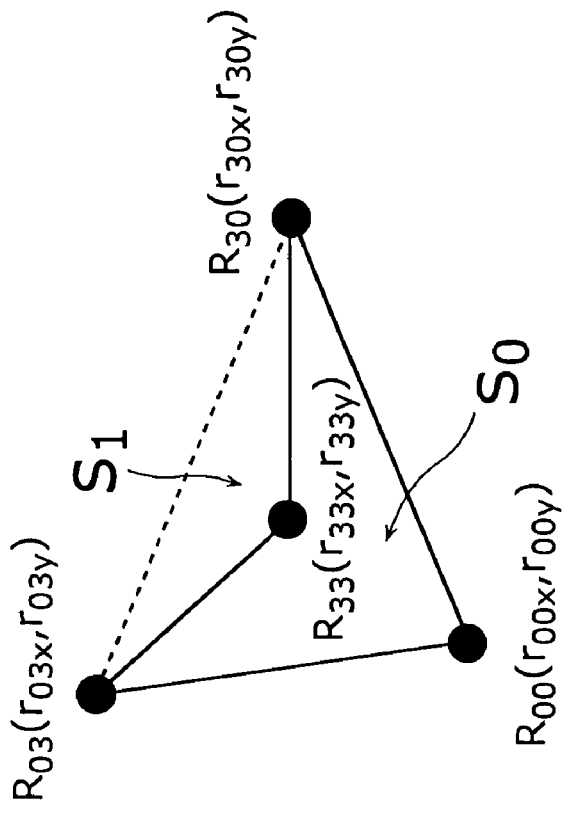
FIG. 32B is a diagram showing an example where the signed areas of the two triangles have opposite signs.
Figure 32A:
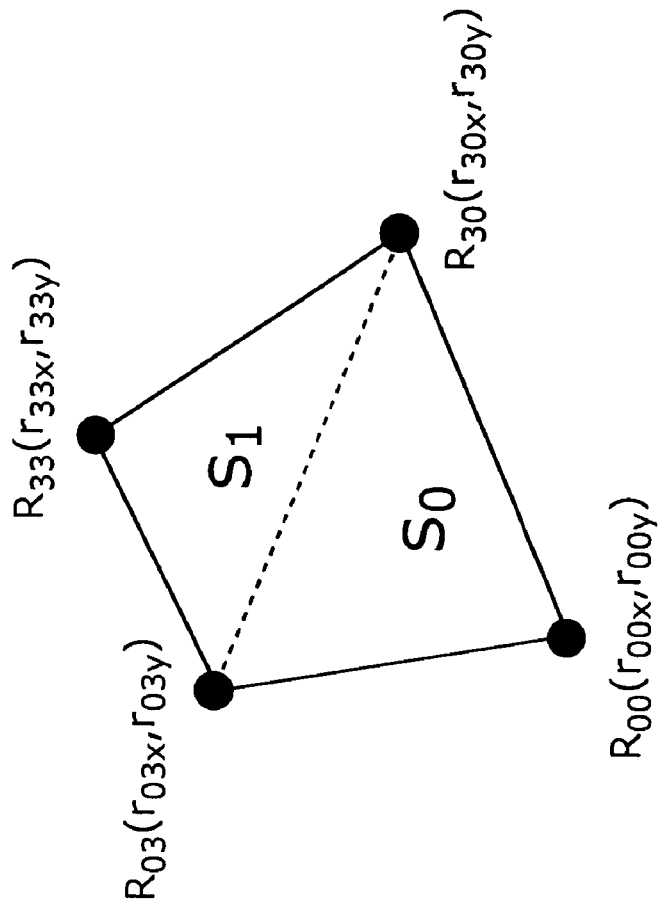
FIG. 32A is a diagram showing an example where signed areas of two triangles that are formed by perspective transformation of control points have the same sign.

Here, * is a product. When 4 vertices are located as shown in FIG. 32A on a screen, the signed areas $S_0$ and $S_1$ have the same sign, but they have opposite signs when they are located as shown in FIG. 32B.

Therefore, the silhouette edge detection unit 2902 stores the signed areas of respective patches in different storage regions (not shown in the figures) in order to distinguish plus and minus signs. If $S_0$ and $S_1$ have the same sign, the value obtained by adding the values thereof is stored in the storage region. In the present embodiment, 4 vertices are divided into two triangles $R_{00}$, $R_{30}$, $R_{03}$ and $R_{30}$, $R_{33}$, $R_{03}$, but they may be divided into any other sets of triangles, for example, $R_{00}$, $R_{33}$, $R_{03}$ and $R_{00}$, $R_{30}$, $R_{33}$, and any other sets may be processed in the same manner.

Next, the silhouette edge detection unit 2902 compares the maximum value of the signed areas in a storage region (not shown in the figures) which is reserved separately from the storage regions for storing the values of signed areas of respective patches with the value of the signed area calculated in S3103 (S3104). When the signed area is larger, the silhouette edge detection unit 2902 updates the maximum value and writes the updated value in the storage region. Here, the sum of the absolute values of the signed areas $S_0$ and $S_1$ is used for the comparison with the maximum value. To be more specific, when the plus signed area calculated in S3103 is $A_p$, the minus signed area is $A_m$ and the maximum value of the signed area stored in the storage region is MAXA, the following processing is performed.

(1) Calculate the sum of absolute values of signed areas $A_p + |A_m|$ (2) If $A_p + |A_m| >$ MAXA, MAXA $= A_p + |A_m|$ After completing the above-mentioned processing for all the patches that make up the object (YES in S3101), the flow goes to S3101.

When finding with reference to the calculated signed areas of each patch that both the plus and minus values thereof are not 0 (FIG. 32B), the silhouette edge detection unit 2902 sets the edge identifier to 1 based on its judgment that the patch forms a silhouette edge, and shifts to the judgment of the next patch (S3106). When either one of the plus and minus values is 0 in S3106, the silhouette edge detection unit 2902 shifts to S3107.

Next, the silhouette edge detection unit 2902 compares the sign of the signed area of the current patch with the sign of the signed area of the adjacent patch which is referred to using adjacent patch information so as to judge whether the current patch is a silhouette edge forming patch or not (S3107).

When the sign of the signed area of the current patch is opposite to that of the adjacent patch (NO in S3107), it is found that there is a boundary between these two patches as the front face and the back face, and thus it can be judged that the current patch is a silhouette edge forming patch. Therefore, when the value of the product of the signed areas of the current patch and the adjacent four patches is minus, the silhouette edge detection unit 2902 judges that the current patch is a silhouette edge forming patch and sets the edge identifier to 1 (S3108).

On the other hand, when the sign of the signed area of the current patch is same as those of all the adjacent patches (YES in S3107), it judges that the current patch is not a silhouette edge forming patch (S3109). When there is no adjacent patch (−1 is given to the adjacent patch information in the present embodiment), the silhouette edge detection unit 2902 sets the edge identifier to 1 based on its judgment that the current patch forms an edge. After the silhouette edge detection unit 2902 completes the above processing for all the patches, the flow shifts to the processing of the subdivision level determination unit 2903. The signed area calculated by the silhouette edge detection unit 2902 and the edge identifier of each patch are sent to the subdivision level determination unit 2903.

The subdivision level determination unit 2903 can determine the subdivision level using the signed area calculated by the silhouette edge detection unit 2902 and the edge identifier of each patch.

By the way, methods of approximating a patch to a collection of polygons are roughly divided into the following two methods.

In the first method, uv parametric space is divided based on a step width (predetermined by any method) for dividing a patch so as to generate grid points. Next, the coordinates of the generated grid points on 3D space are calculated, and a polygon is generated by connecting the vertices of these points.

In the second method, control points are generated to divide a patch into two, and this division is repeated to generate polygons. The first method is referred to as a tessellation algorithm and the second method is referred to as a subdivision algorithm, respectively.

In the present embodiment, a process of dividing a patch into two in the u and v directions using the subdivision algorithm is defined as Level 1, and the number of subdivisions is defined as a subdivision level. This definition can also be applied to the tessellation algorithm. For example, it is recommended to prepare a table indicating correspondences between the subdivision levels and the numbers of subdivisions, for example, Level 1 and 10-part division of parametric space in the u and v directions, and Level 2 and 20-part division thereof, and so on.

Figure 33A:
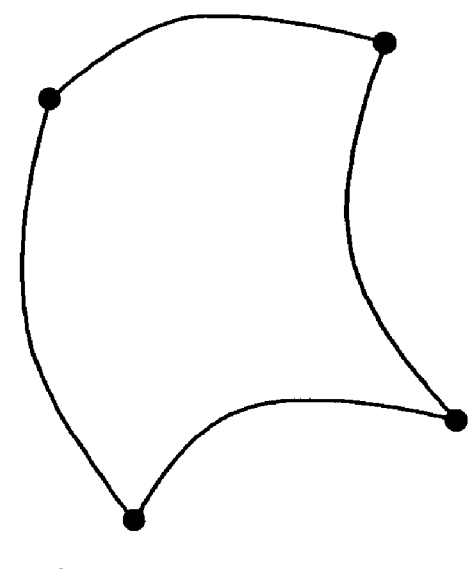
FIG. 33A is a diagram showing an example of a patch before subdivision.
Figure 33B:
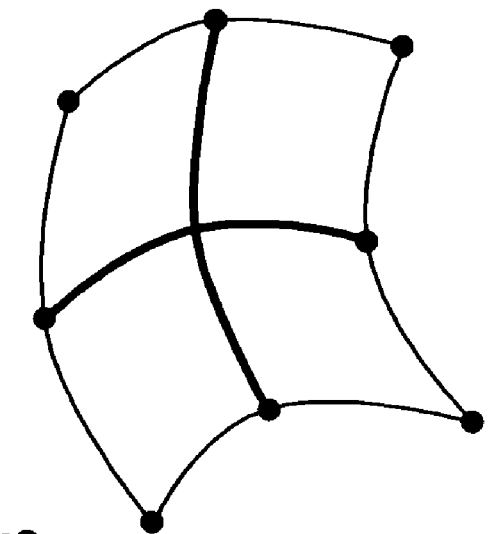
FIG. 33B is a diagram showing an example of a patch after the level 1 subdivision.
Figure 33C:
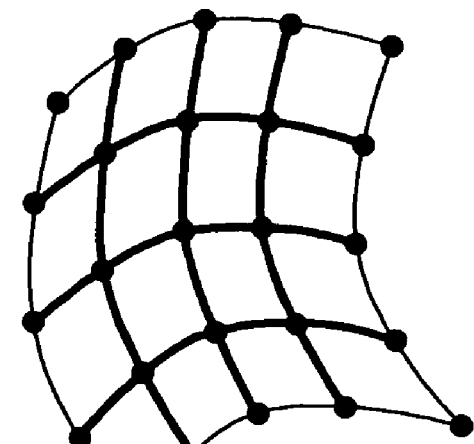
FIG. 33C is a diagram showing an example of a patch after the level 2 subdivision.

FIG. 33A shows an example of a patch before subdivision, FIG. 33B shows an example of the patch subdivided up to Level 1, and FIG. 33C shows an example of the patch subdivided up to Level 2. 4 subpatches are formed in FIG. 33B, and 16 subpatches are formed in FIG. 33C.

Figure 34:
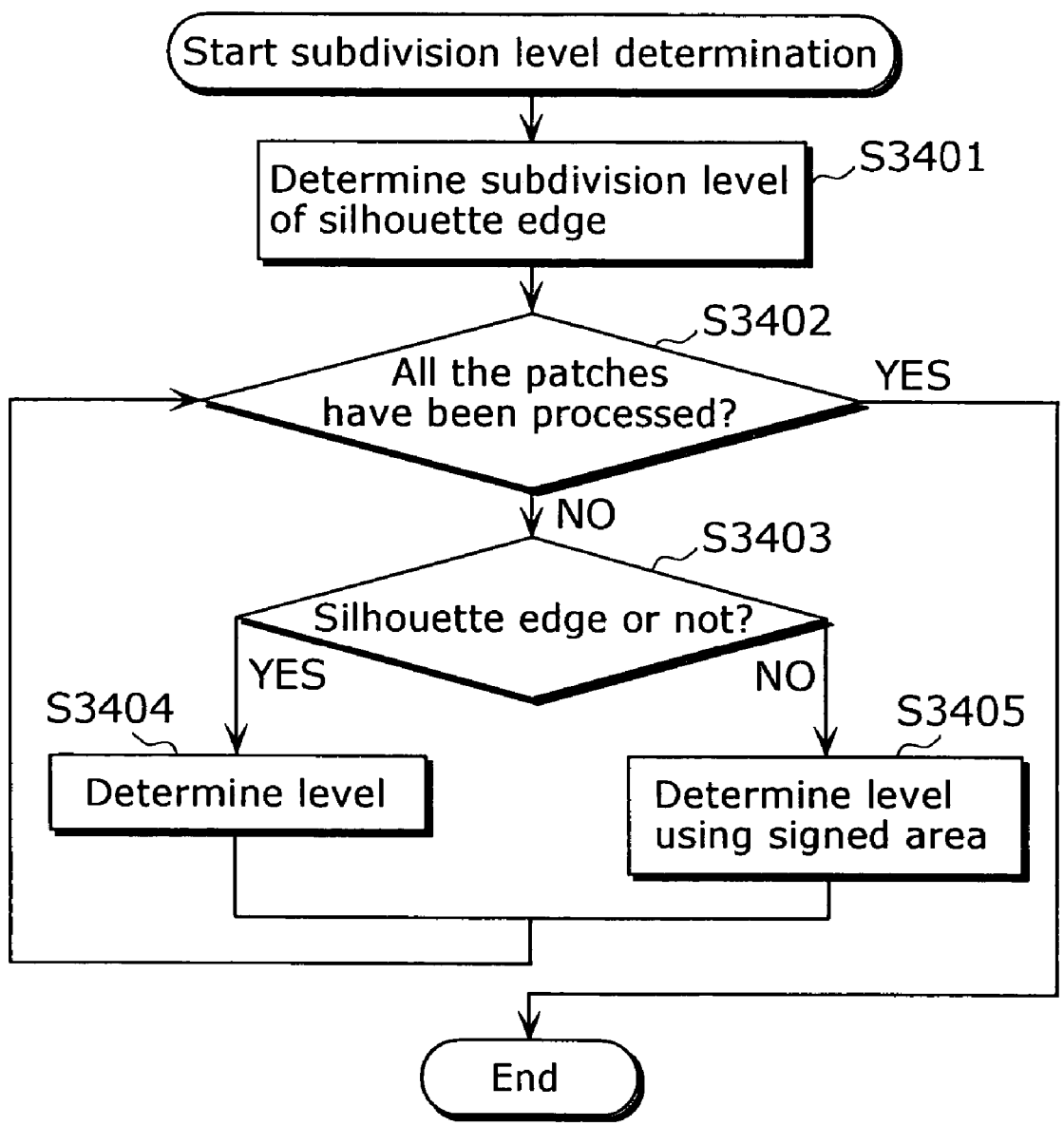
FIG. 34 is a flowchart showing a flow of processing performed by a subdivision level determination unit in the fifth embodiment.

FIG. 34 is a flowchart showing a flow of processing performed by the subdivision level determination unit 2903. Each step will be explained below in detail with reference to FIG. 34.

It is desirable to divide a silhouette edge forming patch into smaller pieces than other patches because it forms the edge of an object to be rendered. However, since the signed areas of a silhouette edge forming patch tend to be small, determination of subdivision levels depending on the areas may cause failure of fine division. Therefore, in the present embodiment, the subdivision level (a fixed value) of a silhouette edge forming patch is determined using the maximum value of the signed area calculated by the silhouette edge detection unit 2902. Use of the maximum value of the signed area achieves both a request for fine division and a request for reduction of a subdivision level in a case where an object is displayed very small with a distance from a viewpoint.

More specifically, as shown in FIG. 35A, the subdivision level determination unit 2903 holds a table describing correspondences between the maximum values of signed areas and subdivision levels of a silhouette edge forming patch. This table is compared with the maximum value of the signed area calculated by the silhouette edge detection unit 2902 so as to determine the subdivision level of the silhouette edge forming patch (S3401). Note that $MA_I$ (I=0, ..., 4) is a threshold of the maximum value of the signed area in FIG. 35A.

Next, the subdivision level determination unit 2903 judges whether each patch that makes up an object is a silhouette edge forming patch or not with reference to the edge identifier (S3403). Since it is a silhouette edge forming patch when the edge identifier is 1 (YES in S3403), the subdivision level is determined immediately (S3404).

On the other hand, the subdivision level determination unit 2903 determines the subdivision level of a patch with reference to the plus signed area of the patch when the edge identifier is 0 and thus the patch is not a silhouette edge forming patch (NO in S3403). That is why the patch does not need to be divided because that patch having a large minus signed area is back facing, namely, the patch has a very large area invisible from a viewpoint. To be more specific, the subdivision level is determined with reference to a table 3502, as shown in FIG. 35B, recorded in a table storage unit 2903a (S3405). Note that $A_I$ (I=0, ..., 4) is a threshold of the signed area in the table 3502 as shown in FIG. 35B. The above processing is continued for all the patches (S3402).

In the present embodiment, the subdivision level of a silhouette edge forming patch is determined to be a fixed value based on the maximum value of the signed area, but it may be determined based on the signed area with reference to the table 3502 as shown in FIG. 35B in the same manner as the patches other than the silhouette edge forming patch. In this case, it is preferable to record another table for silhouette edge forming patches than a table for ordinary patches in the table storage unit 2903a. It is also preferable to set a lower threshold of the signed area. In addition, as mentioned above, it is necessary to pay due attention to the problem that the signed area may be very small.

The subdivision unit 2904 subdivides each patch using the subdivision algorithm based on the subdivision level determined by the subdivision level determination unit 2903. The subdivision unit 2904 also performs the processing of correcting the gap between adjacent patches with different subdivision levels, but the method for the correction is not particularly limited.

Figure 36B:
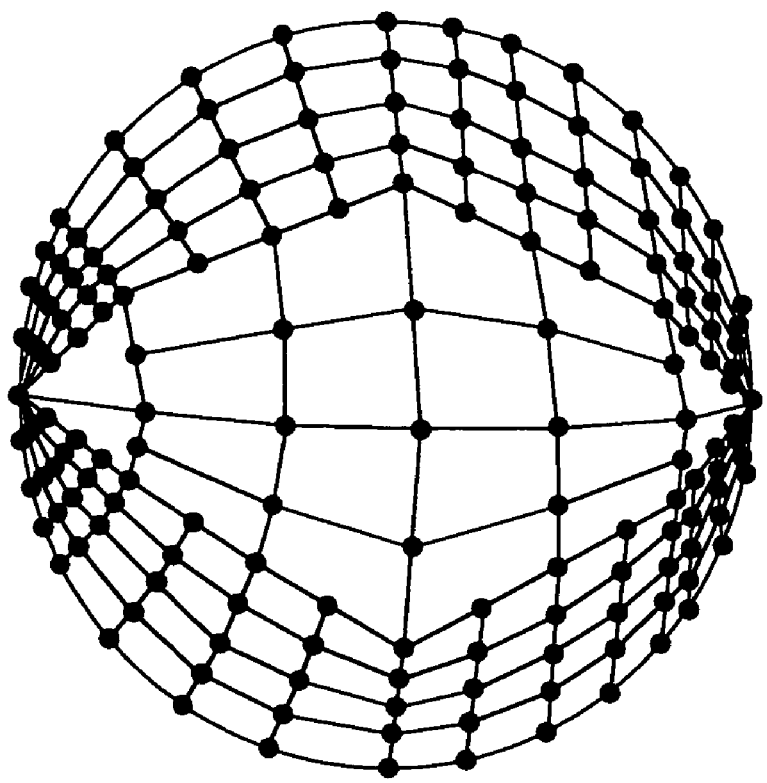
FIG. 36B is a diagram showing an example of an object obtained after subdividing each patch that forms the object according to its subdivision level.
Figure 36A:
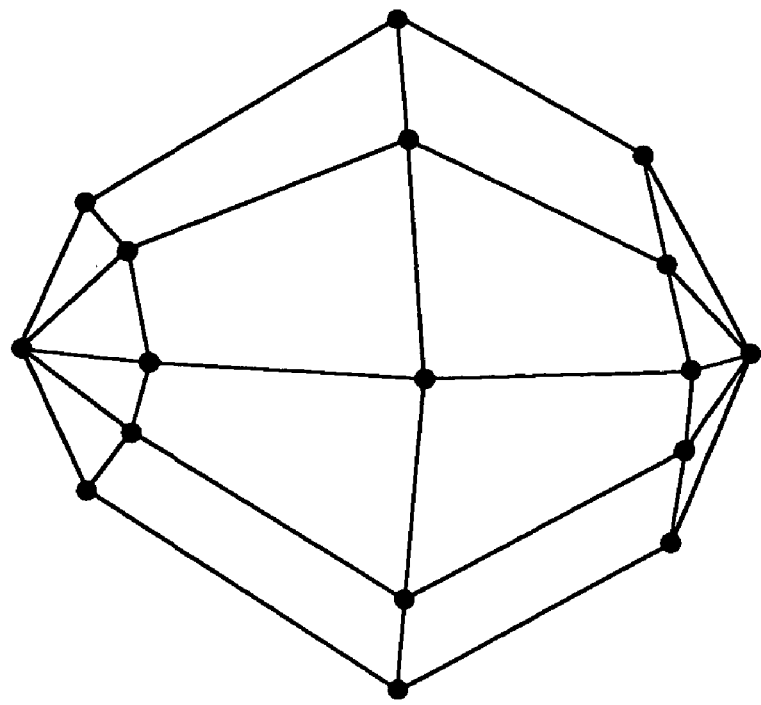
FIG. 36A is a diagram showing an example of an object before subdivision.

For example, there is a method of generating a new polygon in the generated gap. FIG. 36A shows an example of an object before subdivision, and FIG. 36B shows an example of the object after subdivision. In FIG. 36B, the silhouette edge forming patches that generate the silhouette of the object are divided up to Level 2, and other patches are divided up to Level 0 or Level 1 depending on their areas on the screen. Therefore, it is possible to render the surface image more finely.

As described above, according to the curved surface image processing apparatus 100 in the fifth embodiment, perspective transformation is performed on 4 vertices located on each patch that makes up an object among the control points of the patch so as to calculate the signed area of the graphics that is formed by the transformed vertices. Next, the silhouette edge detection unit 2902 judges whether each patch is a silhouette edge forming patch or not with reference to the sign of the calculated signed area. Then, the subdivision level determination unit 2903 determines the subdivision level of each patch based on the judgment and the signed area.

The above processing makes it possible to generate an object with smooth edges with controlling the subdivision levels adaptively. Since the subdivision level is determined only once before subdivision processing, an amount of calculation is smaller than that in the background art that determines whether to divide or not based on the smoothness calculated on every subdivision. In addition, since the signed area is also used for judgment of a silhouette edge forming patch, it is possible to reduce the calculation load to the minimum.

Note that the curved surface image processing apparatus 100 in the fifth embodiment is particularly effective for rendering an object by polygon approximation using only control points located on patches.

(Sixth Embodiment)

Next, the curved surface image processing apparatus 100 in the sixth embodiment will be explained with reference to the drawings. The functional structure of the curved surface image processing apparatus 100 in the present embodiment is same as that in the fifth embodiment, but the processing in the silhouette edge detection unit 2902 and the subdivision level determination unit 2903 in the former is different from that in the latter. Each function of these units will be explained below in detail.

The curved surface image processing apparatus 100 in the sixth embodiment is particularly effective for rendering an object by polygon approximation using all the control points that define the shapes of patches. The shape input reception unit 2901 receives input of viewpoint information including viewing transformation matrices and perspective transformation matrices and object shape information including information on the shape of an object and adjacent patch information, in the same manner as the fifth embodiment.

Figure 37:
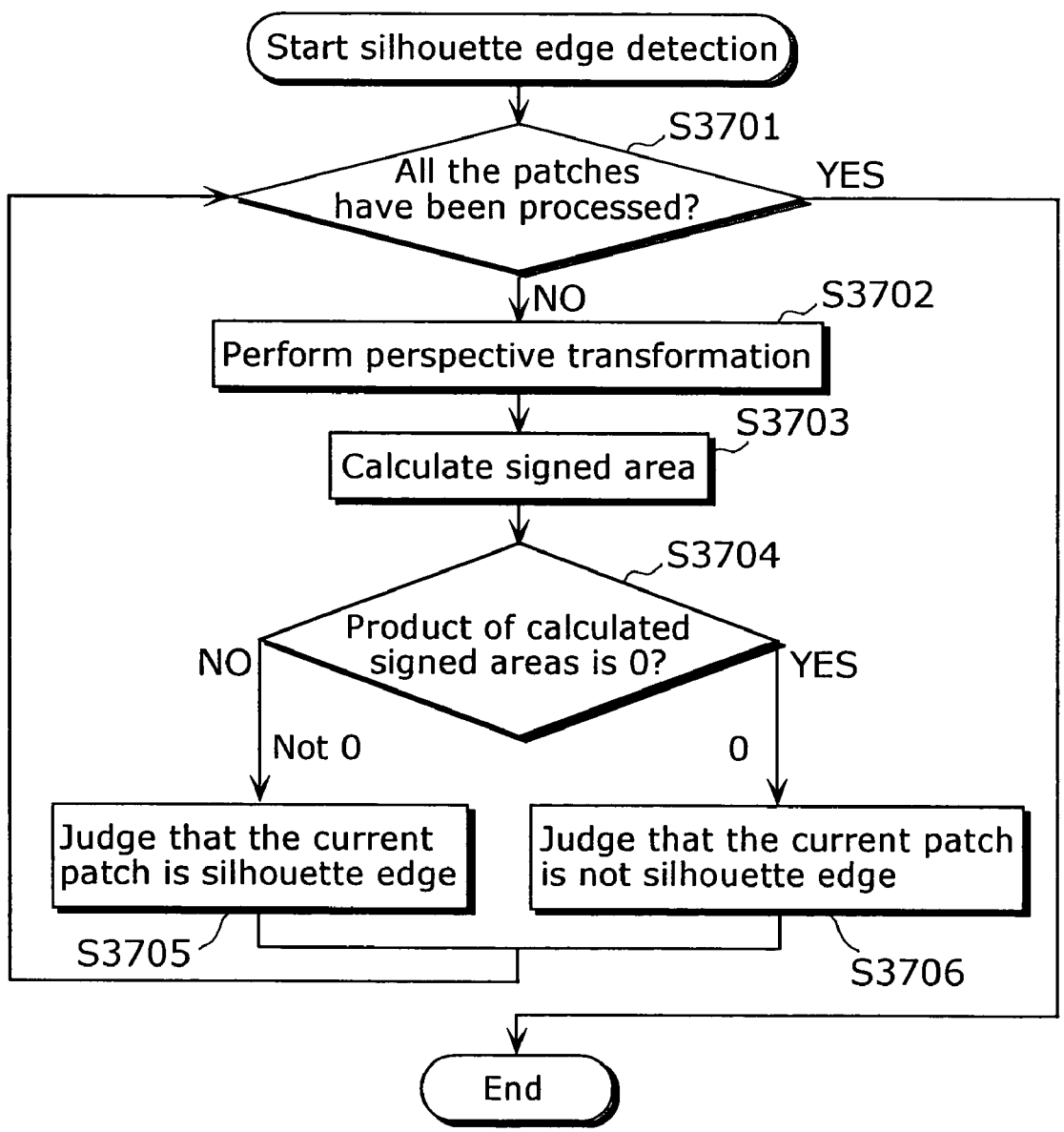
FIG. 37 is a flowchart showing a flow of processing performed by a silhouette edge detection unit in a sixth embodiment.

FIG. 37 is a flowchart showing a flow of processing in the silhouette edge detection unit 2902 in the sixth embodiment.

First, perspective transformation is performed on all the control points (16 vertices in a case of a rational Bezier surface of the order 4 (cubic)) for transformation into graphics on a 2D screen (S3702), differently from the fifth embodiment in which perspective transformation is performed on only the control points located on a patch. Connection of adjacent control points generates 3×3=9 graphic forms on a 2D screen. The generated graphics are hereinafter referred to as control polygons.

Next, as for each surface patch, the signed areas of all the generated control polygons are calculated in the same manner as the fifth embodiment (S3703) while reserving separate storage regions to distinguish the plus and minus values of the signed areas of the control polygons. When a plus value is calculated, it is added to the value of the storage region for storing plus areas, and when a minus value is calculated, it is added to the value of the storage region for storing minus areas. After the processing for 9 control polygons is completed, the flow goes to S3704.

Figure 38B:
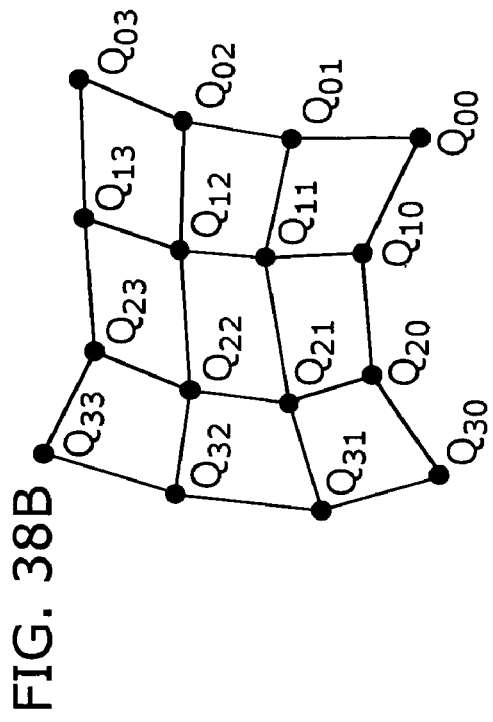
FIG. 38B is a diagram showing an example of a case where all the control polygons are back facing.
Figure 38D:
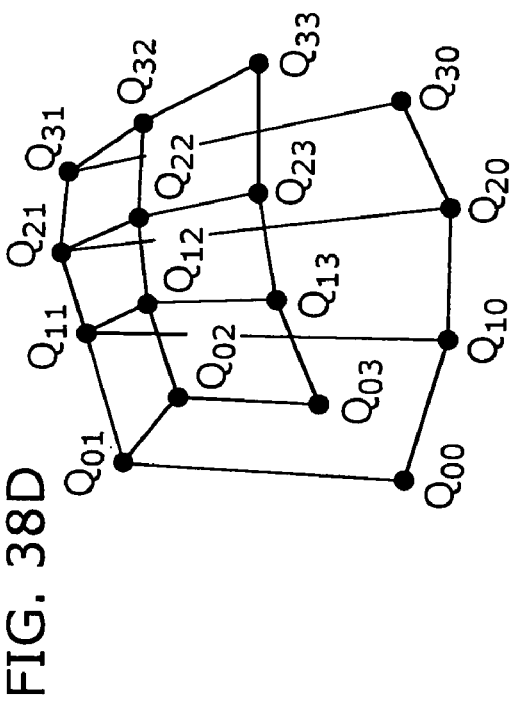
FIG. 38D is a diagram showing another example of a case where some control polygons are front facing and others are back facing.
Figure 38A:
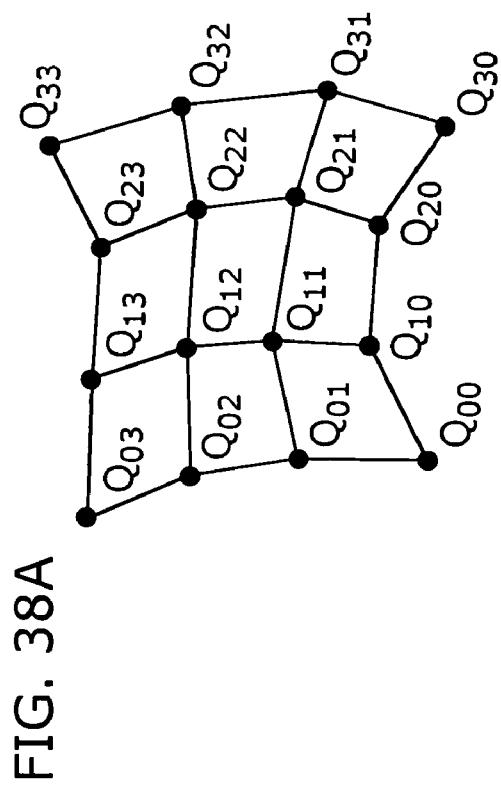
FIG. 38A is a diagram showing an example of a case where all the control polygons are front facing.
Figure 38C:
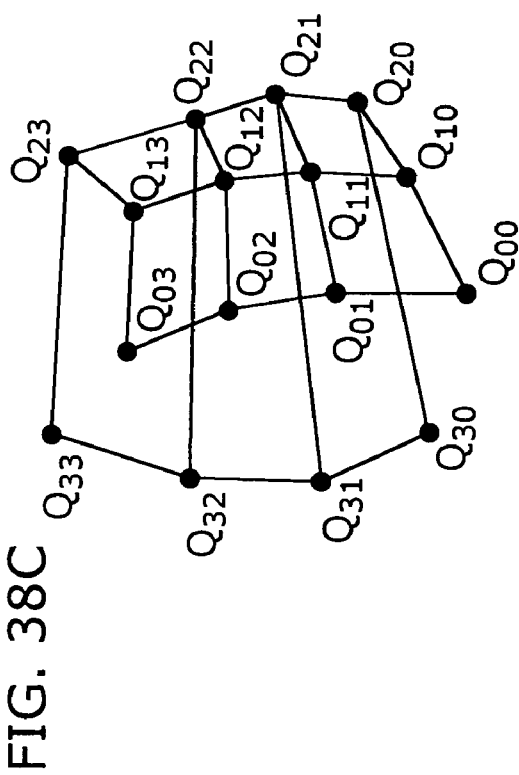
FIG. 38C is a diagram showing an example of a case where some control polygons are front facing and others are back facing.

Since the shape of a patch is defined by control points and a Bezier patch has a convex hull property, use of control polygons makes it possible to judge whether the patch is a silhouette edge forming patch or not. For example, all the control polygons are front facing in FIG. 38A whereas all of them are back facing in FIG. 38B, and thus it is judged that neither of them are silhouette edge forming patches. On the other hand, since the patches in FIG. 38C and FIG. 38D include both front facing and back facing control polygons, it is judged that they are silhouette edge forming patches.

In other words, the silhouette edge detection unit 2902 judges that a patch is not a silhouette edge forming patch when the signed areas of the control polygons calculated by the signed area calculation unit 2902b include either plus or minus values, whereas it judges that the patch is a silhouette edge forming patch when the singed areas include both plus and minus values.

So the silhouette edge detection unit 2902 obtains the added plus and minus values of the signed areas from the above storage region, calculates the product thereof and judges whether the product is 0 or not (S3704). The silhouette edge detection unit 2902 judges that the patch is a silhouette edge forming patch (S3705) when the product is not 0 (NO in S3704) and sets the edge identifier to 1.

The silhouette edge detection unit 2902 judges that the patch is not a silhouette edge forming patch (S3706) when the product of the added plus and minus values of the signed areas is 0 (YES in S3704). The above processing is applied to all the patches (S3701), and when the processing for all the patches is completed, the processing ends.

Figure 39:
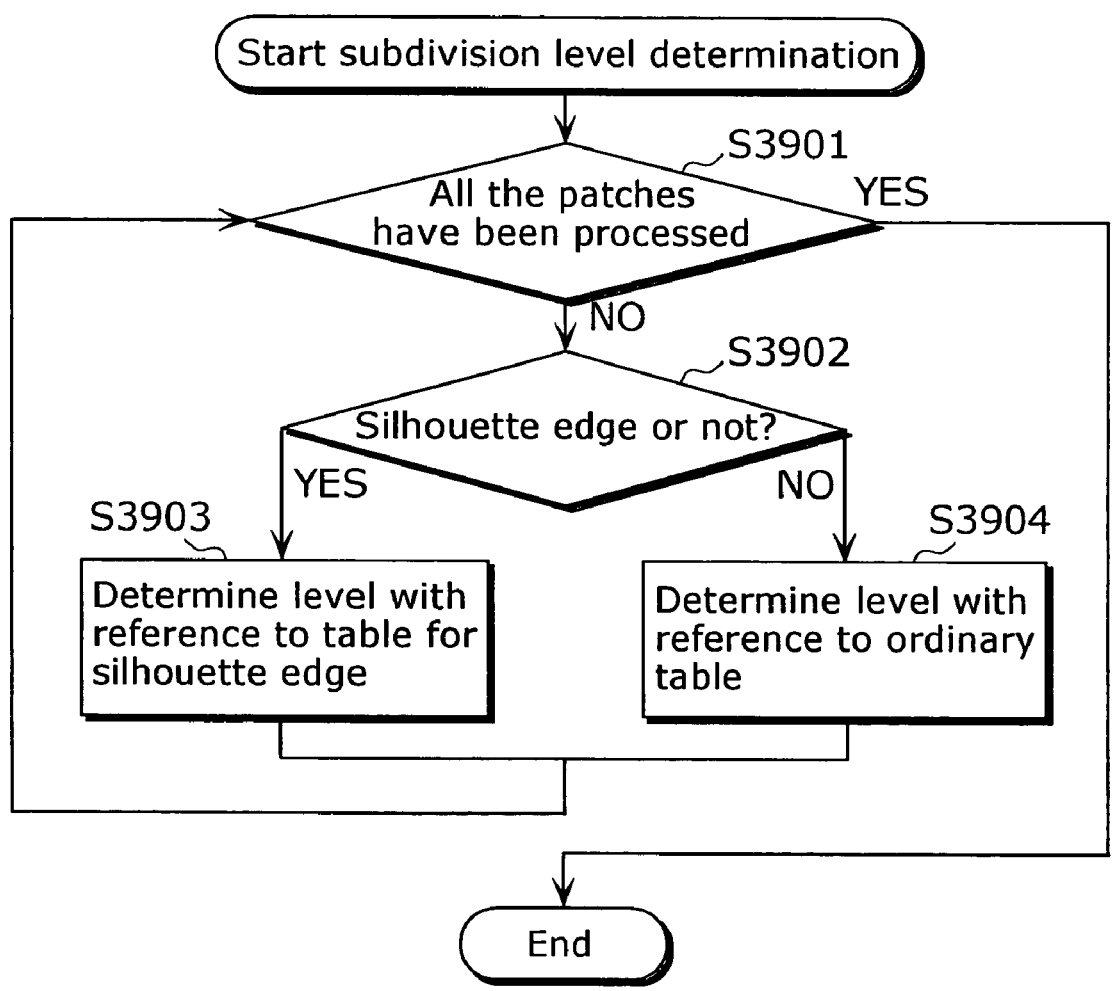
FIG. 39 is a flowchart showing a flow of processing performed by a subdivision level determination unit in the sixth embodiment.

FIG. 39 is a flowchart showing a flow of processing in the subdivision level determination unit 2903 in the sixth embodiment.

First, the subdivision level determination unit 2903 checks whether the patch is a silhouette edge forming patch or not with reference to the edge identifier assigned by the silhouette edge detection unit 2902 (S3902). The subdivision level of a silhouette edge forming patch is fixed in the fifth embodiment, but it is determined with reference to the signed area in the sixth embodiment. For that purpose, the sum of absolute values of the plus and minus signed areas is used as an index in order to relieve the problem that the signed area becomes smaller, as mentioned above.

The subdivision level determination unit 2903 determines the subdivision level of a current patch with reference to a table 4000 indicating correspondences between signed areas and subdivision levels for silhouette edge forming patches as shown in FIG. 40 (S3903). The subdivision level determination unit 2903 may determine the subdivision level of a silhouette edge forming patch with reference to the maximum signed area of the patch that makes up an object in the same manner as the fifth embodiment, although the explanation thereof is not given here. Also, the subdivision level determination unit 2903 may determine the subdivision level with reference to a table indicating correspondences between plus signed areas and subdivision levels as is the case with the patches other than a silhouette edge forming patch, not to the table 4000 as shown in FIG. 40. When a patch is not a silhouette edge patch with its edge identifier of 0 (NO in S3902), the subdivision level determination unit 2903 determines the subdivision level of the patch with reference to the ordinary table in the same manner as the fifth embodiment (S3904).

It is sometimes preferable that subdivision levels in the u and V axis directions can be set separately from each other, because an object such as a circular cylinder does not need to be divided so finely in the direction of the rotation axis. However, the same subdivision level is set for both directions of u and v axes according to the above-mentioned algorithms. So, the following is the explanation of a method of determining subdivision levels for the directions of u and v axes separately using the calculated signed areas of control polygons.

Figure 30:
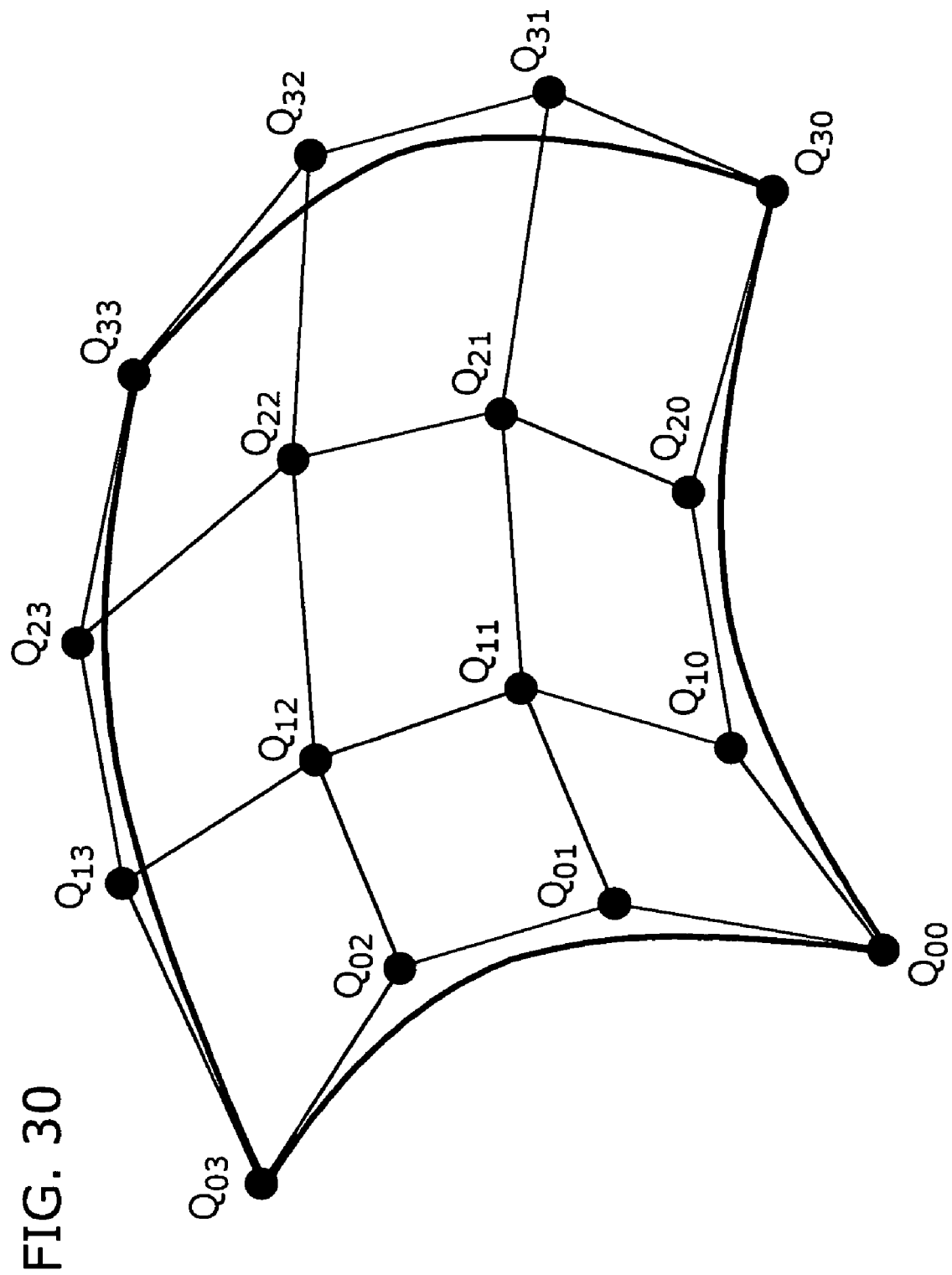
FIG. 30 is a diagram showing an example of a cubic (order=4) rational Bezier surface that is a parametric surface.

The silhouette edge detection unit 2902 performs perspective transformation of all the control points that define the shape of the patch to generate control polygons and calculates the signed area of each control polygon in the same manner as mentioned above. The calculated signed area of the control polygon is added to the storage region depending on the sign. Then, the silhouette edge detection unit 2902 judges whether the patch is a silhouette edge or not based on the value of the storage region at the time when the processing for all the control polygons is completed. Further, in the present invention, not only the sum of the signed areas but the values of the signed areas of respective control polygons are stored separately in storage regions (not shown in the figures). As for a Bezier patch of the order 4 (cubic) (See FIG. 30), the signed areas of respective control polygons are stored in 9 storage regions. These values are sent to the subdivision level determination unit 2903.

Figure 41:
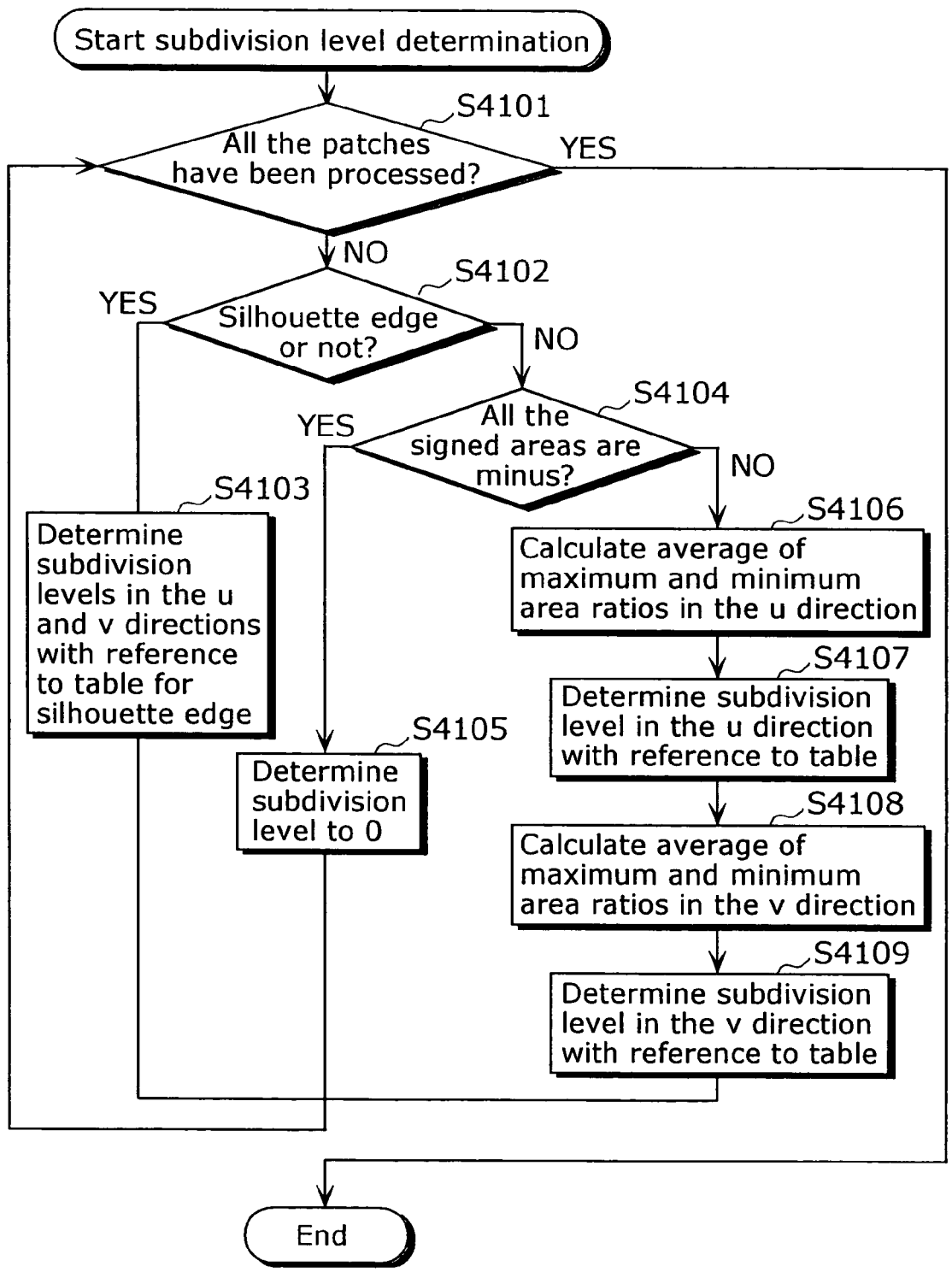
FIG. 41 is a flowchart showing a flow of processing performed by the subdivision level determination unit.

FIG. 41 is a flowchart showing a flow of processing in the subdivision level determination unit 2903 using the above-mentioned method.

First, the silhouette edge detection unit 2902 checks whether each patch is a silhouette edge forming patch or not with reference to the edge identifier (S4102). When it is a silhouette edge forming patch (YES in S4102), it determines the subdivision level in the directions of u and v axes with reference to the table for silhouette edges based on the sum of absolute values of plus and minus signed areas (S4103). Therefore, the subdivision levels in the directions of u and v axes are same for a silhouette edge forming patch. However, the subdivision levels for a silhouette edge forming patch may be determined separately in the directions of u and v axes using a method to be mentioned later. In this case, it needs to be considered that the silhouette edge portion may not be smooth.

Processing performed by the subdivision level determination unit 2903 in a case where the edge identifier is 0 will be explained with reference to FIGS. 42A–42D. FIGS. 42A–42D show curved surfaces, each of which is made up of a collection of control polygons. The control polygons in FIG. 42A are all similar in shape and area. Therefore, it can be said that this patch is not so curved in either u axis or v axis.

Figure 42B:
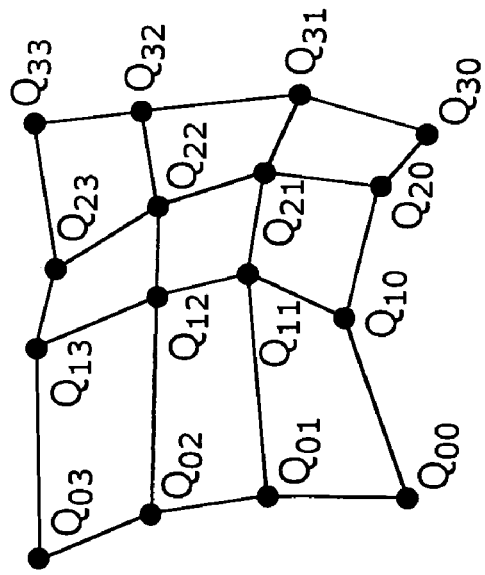
FIG. 42B is a diagram showing an example of a patch that needs to be divided finely in the u axis direction.

On the other hand, in FIG. 42B, control points $Q_{10}$, $Q_{11}$, $Q_{12}$, $Q_{13}$, $Q_{20}$, $Q_{21}$, $Q_{22}$ and $Q_{23}$ are biased toward control points $Q_{30}$, $Q_{31}$, $Q_{32}$ and $Q_{33}$ namely, curved in the u axis direction. This means that the patch in FIG. 42B needs to be divided finely in the u axis direction.

Figure 42D:
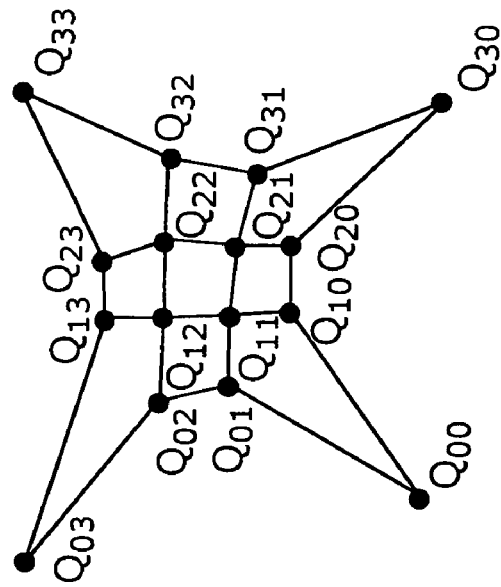
FIG. 42D is a diagram showing an example of a patch that needs to be divided finely in both u and v axis directions.
Figure 42A:
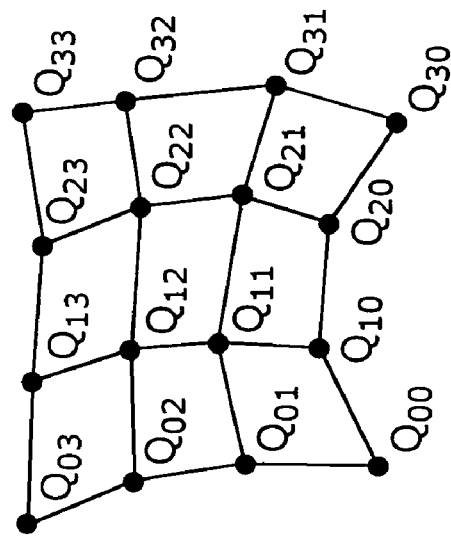
FIG. 42A is a diagram showing an example of a patch that does not need to be divided so finely in both u and v axis directions.
Figure 42C:
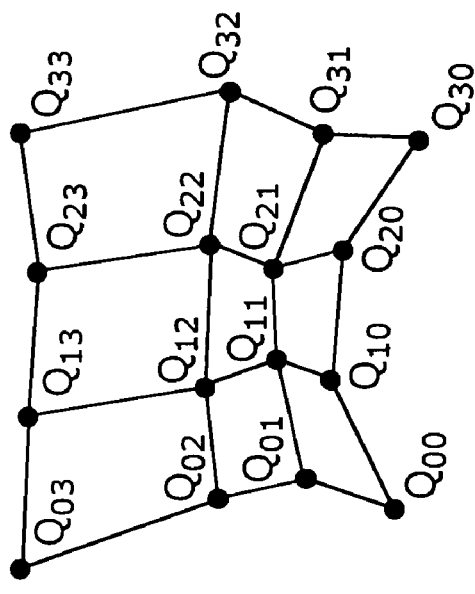
FIG. 42C is a diagram showing an example of a patch that needs to be divided finely in the v axis direction.

Similarly, a patch in FIG. 42C need to be divided finely in the v axis direction, and a patch in FIG. 42D need to be divided finely in both u and v axis directions, respectively. With the help of this property, the ratio of areas of control polygons located in respective directions of u and v axes is used as an index indicating curvature of a patch to determine the subdivision level in the present method. This index indicating the curvature is hereinafter referred to as a curvature parameter.

First, the subdivision level determination unit 2903 checks whether all the signed areas of control polygons that make up a patch are minus or not (S4104), and determines the subdivision level of the patch to be 0 (S4105) when they are all minus (YES in S4104) and shifts to the processing of the next patch.

The subdivision level determination unit 2903 checks whether all the signed areas of control polygons that make up a patch are minus or not (S4104), and calculates the ratios of areas of the control polygons located in the u axis direction (S4106) when all of them are not minus (NO in S4104). To be more specific, the following procedures are executed.

(1) Obtain the values of the signed areas of 3 control polygons that are formed by the control points $Q_{j0}$ and $Q_{j1}$ (j=0, . . . , 3).

(2) Calculate the maximum value AMAX and the minimum value AMIN among the values $A_0$, $A_1$ and $A_2$ of the signed areas obtained in (1).

(3) Solve the following equation to calculate a curvature parameter $C_{u0}$.

$$C_{u0} = A\text{MAX}/A\text{MIN}$$

(4) Perform the same processing using control polygons that are formed by $Q_{j1}$ and $Q_{j2}$ (j=0, . . . , 3) and control polygons that are formed by $Q_{j2}$ and $Q_{j3}$ (j=0, . . . , 3) to calculate curvature parameters $C_{u1}$ and $C_{u2}$.

(5) Average the value of (3) and the value of (4) to calculate a curvature parameter $C_u$ used for determination of the subdivision level.

$$C_u = (C_{u0} + C_{u1} + C_{u2})/3$$

Here, the area ratios are calculated using all the control polygons to make the average thereof a curvature parameter, but the present invention is not limited to that. For example, it is possible to calculate a curvature parameter using only the control polygons adjacent to the boundaries v=0 and v=1 so as to calculate the average thereof. On the contrary, a curvature parameter may be calculated using only the control polygons which are not adjacent to the boundary parallel to the u axis.

The subdivision level determination unit 2903 determines the subdivision level in the u axis direction in S4106 based on the calculated curvature parameter (S4107). For that purpose, the subdivision level determination unit 2903 determines the subdivision level based on the calculated value with reference to a table 4301 stored in the table storage unit 2903a indicating correspondences between curvature parameters C and subdivision levels. Note that in FIG. 43, Ci (i=0, . . . , 4) is a threshold of a curvature parameter.

The subdivision level determination unit 2903 performs the processing same as that in S4106 and S4107 for 3 control polygons adjacent to each other in the direction of v axis (S4108 and S4109), and then determines the subdivision level in the direction of v axis. The subdivision level determination unit 2903 performs this processing for all the patches (S4101). Using the above-described method, the curved surface image processing apparatus 100 can determine the subdivision levels in the directions of u and v axes independently.

Then, the subdivision unit 2904 subdivides each patch based on the subdivision level determined by the subdivision level determination unit 2903. It also performs the processing of correcting a gap, if there is the gap between patches.

As described above, in the curved surface image processing apparatus 100 according to the sixth embodiment, perspective transformation of all the control points that make up each patch is performed to transform them into control polygons in a screen coordinate system, and the signed areas of all the control polygons formed as a result of the transformation are calculated. The silhouette edge detection unit 2902 judges whether each patch is a silhouette edge forming patch or not based on the calculated value of the signed area, and the subdivision level determination unit 2903 determines the subdivision level depending on the judgment result and the value of the signed area.

Accordingly, even if a method of polygon approximation using all the control points that define the shape of a patch is used, it is possible to generate an object having smooth edge portions with restraining the increase in the number of polygons. Also, the subdivision level determination unit 2903 needs to perform its processing only once before the subdivision, which allows a smaller amount of calculation than the background art. Further, addition of only a small amount of processing allows judgment of a silhouette edge forming patch, which is very efficient from a viewpoint of calculation load.

(Seventh Embodiment)

Figure 44:
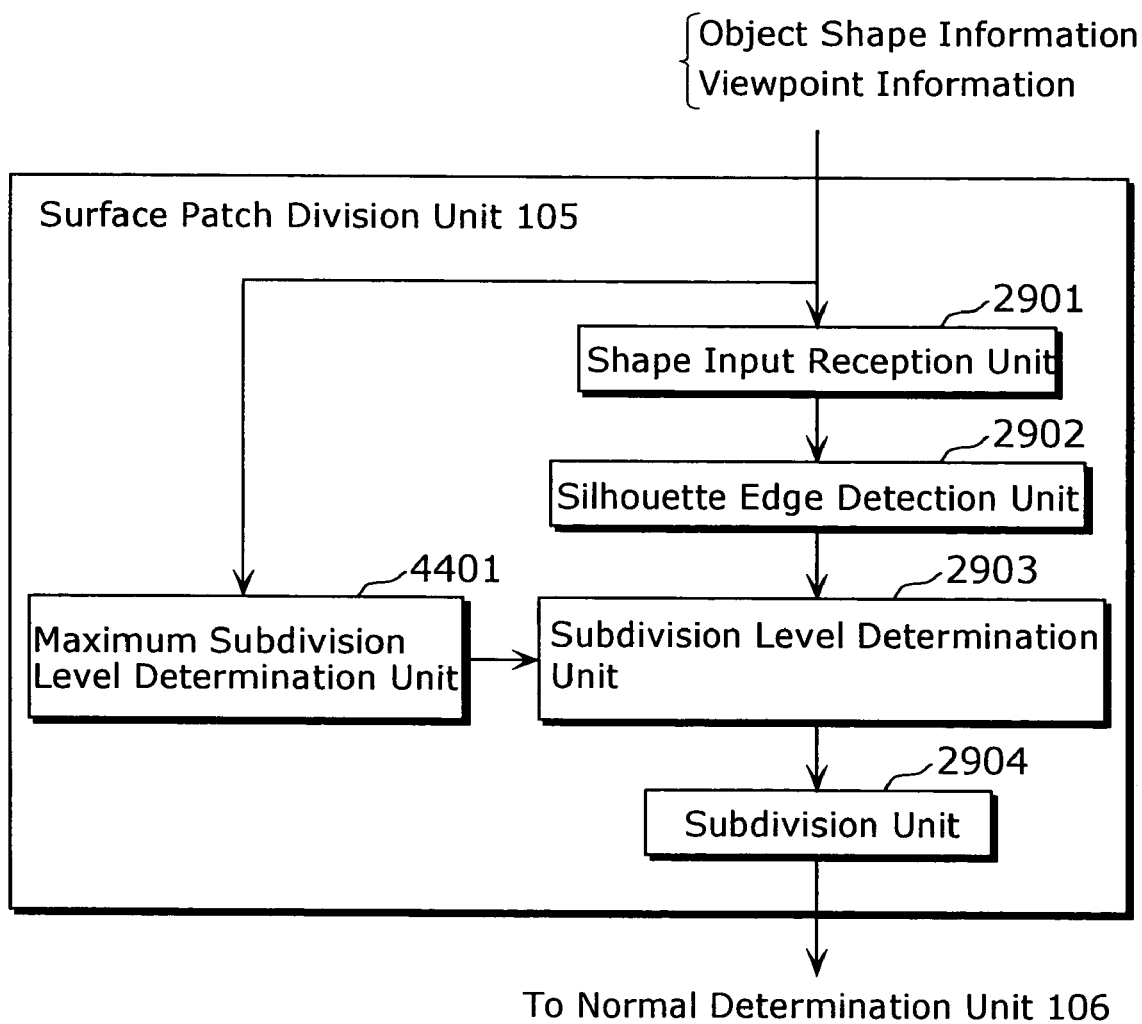
FIG. 44 is a diagram showing an example of a structure of a curved surface image processing apparatus in a seventh embodiment.

The curved surface image processing apparatus 100 according to the seventh embodiment will be explained with reference to the drawings. FIG. 44 is a diagram showing an example of a structure of the curved surface image processing apparatus 100 in the seventh embodiment. The curved surface image processing apparatus 100 in the present embodiment includes a maximum subdivision level determination unit 4401 in addition to the units which have been explained in the fifth embodiment.

Inclusion of the maximum subdivision level determination unit 4401 allows no division of patches which do not need to be subdivided even if their areas on a screen are large, and further restraint on the number of polygons. Each function will be explained below in detail, but the same numbers are assigned to the elements same as those in FIG. 29 and the explanation thereof is omitted. In the seventh embodiment, polygon approximation using only vertices located on each patch among control points defining the shape of the patch that is an element of an object will be explained, but the present embodiment can be applied to polygon approximation using all the control points in the same manner. In FIG. 44, the processing in the shape input reception unit 2901 and the silhouette edge detection unit 2902 is same as that in the fifth embodiment, and the signed areas of each patch and the judgment result of a silhouette edge patch are sent to the subdivision level determination unit 2903.

For example, a smooth patch does not need to be divided finely even if it has a large area on a screen. Therefore, the maximum subdivision level determination unit 44011 obtains the object shape information and calculates an index indicating the degree of the curve of each patch that is an element of an object so as to determine the maximum subdivision level. An index indicating the degree of a curve is hereinafter referred to as a curvature parameter.

Two methods by which the maximum subdivision level determination unit 4401 determines this curvature parameter will be explained below. Any indices take advantage of the fact that a polygon that is formed by control points is rough approximation of a patch shape. Note that the following processing is performed in a global coordinate system, so there is no need to perform viewing transformation nor perspective transformation.

(Method 1)

Figure 45A:
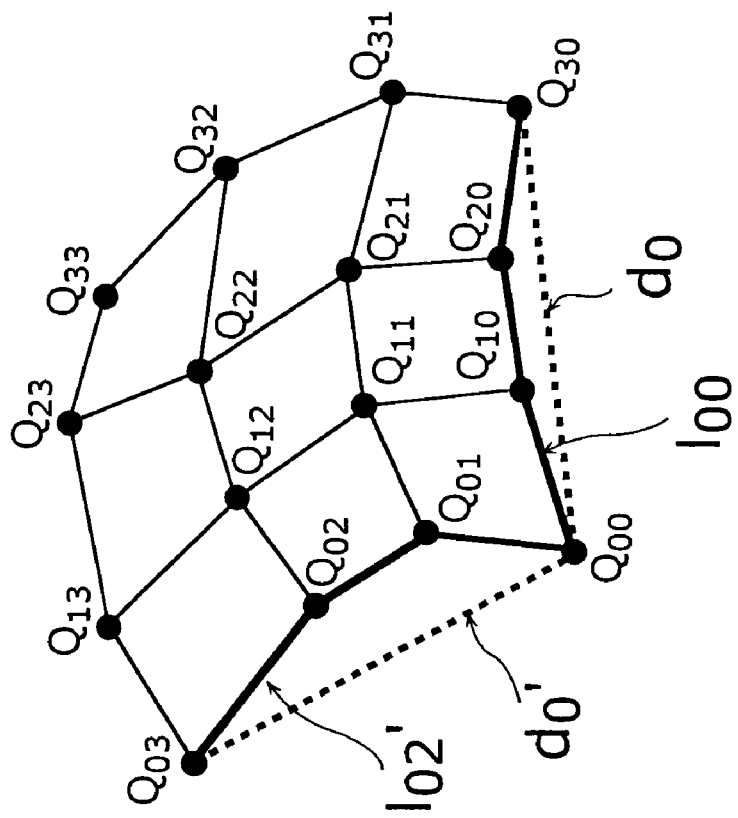
FIG. 45A is a diagram explaining how to determine the maximum subdivision level by Method 1.

Method 1 will be explained with reference to FIG. 45A. Using Method 1, the maximum subdivision level determination unit 4401 calculates distances between a plane that is formed by control points located on a patch and other control points so as to determine a curvature parameter. More specifically, the procedure is as follows.

(1) Find an equation $a_0$ of a plane that is formed by control points $Q_{00}$, $Q_{30}$ and $Q_{03}$.

(2) Generally, a distance L between a plane a: $a*x+b*y+c*z+d=0$ and a point P on 3D space $(x_0, y_0, z_0)$ is obtained using the following equation, where * is a product.

$$L = \frac{|ax_0 + by_0 + cz_0 + d|}{\sqrt{a^2 + b^2 + c^2}} \tag{14}$$

Using the above equation, distances $I_{01}$, $I_{02}$, $I_{10}$, $I_{11}$, $I_{12}$, $I_{20}$ and $I_{21}$ between the plane $a_0$ obtained in (1) and control points $Q_{01}$, $Q_{02}$, $Q_{10}$, $Q_{11}$, $Q_{12}$, $Q_{20}$ and $Q_{21}$ are calculated.

(3) Obtain an equation $a_1$ of a plane that is formed by control points $Q_{30}$, $Q_{33}$ and $Q_{03}$.

(4) Calculate distances $I_{12}'$, $I_{13}'$, $I_{21}'$, $I_{22}'$, $I_{23}'$, $I_{31}'$ and $I_{32}'$ between the plane $a_1$ obtained in (3) and control points $Q_{12}$, $Q_{13}$, $Q_{21}$, $Q_{22}$, $Q_{23}$, $Q_{31}$ and $Q_{32}$.

(5) Calculate lengths $d_0$ and $d_1$ of diagonal lines connecting control points $Q_{03}$ and $Q_{30}$ and $Q_{00}$ and $Q_{33}$.

(6) Calculate a curvature parameter C by solving the following equations.

$l_0 = l_{01} + l_{02} + l_{10} + l_{11} + l_{12} + l_{20} + l_{21}$ $l_1 = l_{12}' + l_{13}' + l_{21}' + l_{22}' + l_{23}' + l_{31}' + l_{32}'$ $C = (l_0 + l_1)/(d_0 + d_1)$

Here, control points used for calculating distances from a plane are divided into two groups depending on the plane, but how to calculate the distances is not particularly limited. For example, a curvature parameter may be determined by calculating distances between each plane and all the control points which are not located on the plane. On the contrary, only representative points (for example, control points $Q_{11}$, $Q_{12}$, $Q_{21}$ and $Q_{22}$ which are located around the center of the patch) may be used.

(Method 2)

Figure 45B:
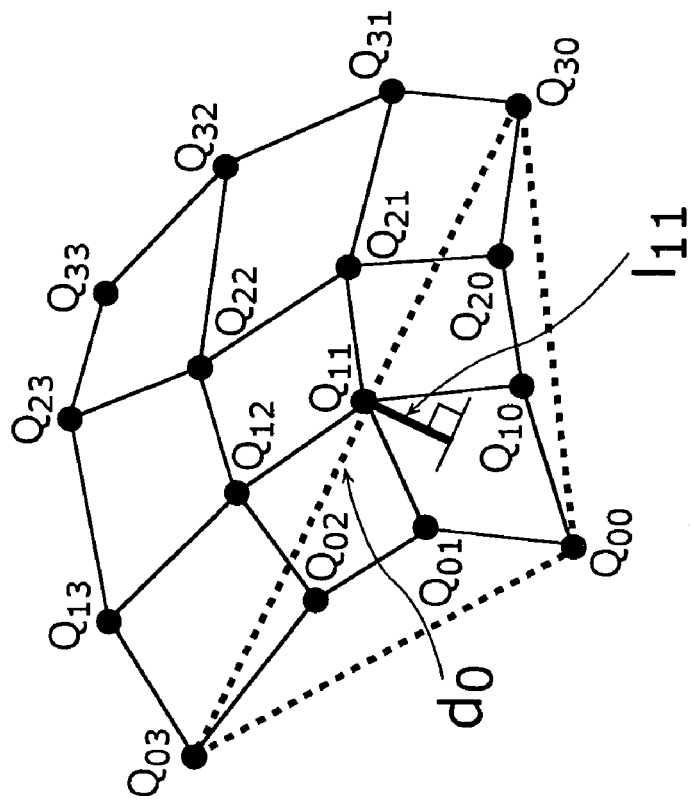
FIG. 45B is a diagram explaining how to determine the maximum subdivision level by Method 2.

Method 2 will be explained with reference to FIG. 45B. Using Method 2, the maximum subdivision level determination unit 4401 calculates the sum of lengths of line segments connecting edge points of control points and distances between adjacent control points so as to determine a curvature parameter. More specifically, the procedure is as follows.

(1) Calculate length di of a line segment between control points $Q_{0i}$ and $Q_{3i}$.

(2) Calculate length $l_{ij}$ (j=0, . . . , 2) of a line segment between control points $Q_{ji}$ and $Q_{(j+i)i}$ adjacent to each other in the u direction.

(3) Solve the following equation to calculate $C_i$.

$C_i = (l_{i0} + l_{i1} + l_{i2})/d_i$ (4) Repeat the processing (1)~(3) to calculate $C_0$, $C_1$, $C_2$ and $C_3$.

(5) Calculate length $d_i$ of a line segment between control points $Q_{i0}$ and $Q_{i3}$.

(6) Calculate length $l_{ij}'$ (j=0, . . . , 2) of a line segment between control points $Q_{ij}$ and $Qi_{(j+1)}$ adjacent to each other in the v direction.

(7) Solve the following equation to calculate $C_i'$.

$$C_i'=(l_{i0}'+l_{i1}'+l_{i2}')/d_i'$$

(8) Repeat the processing (5)~(7) to calculate $C_0'$, $C_1'$, $C_2'$ and $C_3'$.

(9) Calculate the average of the values obtained in (4)~(8) as a curvature parameter C.

$$C=(C_0+C_1+C_2+C_3+C_o'+C_1'+C_2'+C_3')/8$$

Here, the above processing is performed for all the line segments formed using control points to determine a curvature parameter, but how to determine it is not particularly limited. For example, the processing may be performed only for a boundary (u=0, u=1, v=0, v=1) to determine a curvature parameter.

Next, the maximum subdivision level determination unit 4401 determines the maximum subdivision level of a patch based on the calculated C with reference to a table 4601 indicating correspondences between curvature parameters and the maximum subdivision levels as shown in FIG. 46. Note that $\epsilon_i$ (i=0, . . . , 4) is a threshold of a curvature parameter in FIG. 46. The above processing is performed for all the patches. The calculated maximum subdivision level is sent to the subdivision level determination unit 2903.

The subdivision level determination unit 2903 determines the subdivision level of each patch using the signed area of each patch calculated by the silhouette edge detection unit 2902 and the edge identifier in consideration of the maximum subdivision level determined by the maximum subdivision level determination unit 4401. Therefore, the subdivision level determination unit 2903 updates the column of subdivision levels according to the maximum subdivision level sent from the maximum subdivision level determination unit 4401 with reference to a table 4701 as shown in FIG. 47 obtained by modifying the table as shown in FIG. 35B. Then, the subdivision level determination unit 4401 determines the subdivision level by the same procedure as that in the fifth embodiment using the updated table.

Note that in FIG. 47, MAXL is the maximum subdivision level sent from the maximum subdivision level determination unit 4401 and CLIP(x) is the value of "x" when it is 0 or larger, whereas CLIP(x) is 0 when the value of "x" is less than 0.

The subdivision unit 2904 subdivides each patch depending on the subdivision level determined by the subdivision level determination unit 2903 to perform the processing of correcting the gap.

As described above, in the curved surface image processing apparatus 100 according to the seventh embodiment, the maximum subdivision level determination unit 4401 determines the maximum subdivision level of each patch in advance. Therefore, it is possible to avoid unnecessary division of a patch which does not need to be subdivided because it is approximately smooth and to generate polygons more efficiently to approximate them to an actual object shape. In addition, the maximum subdivision level determination unit 4401 needs to perform the processing only once at the time when object shape information is inputted, and thus the processing can be realized with the minimum calculation load.

(Eighth Embodiment)

The curved surface image processing apparatus 100 according to the eighth embodiment will be explained with reference to the drawings.

Figure 48:
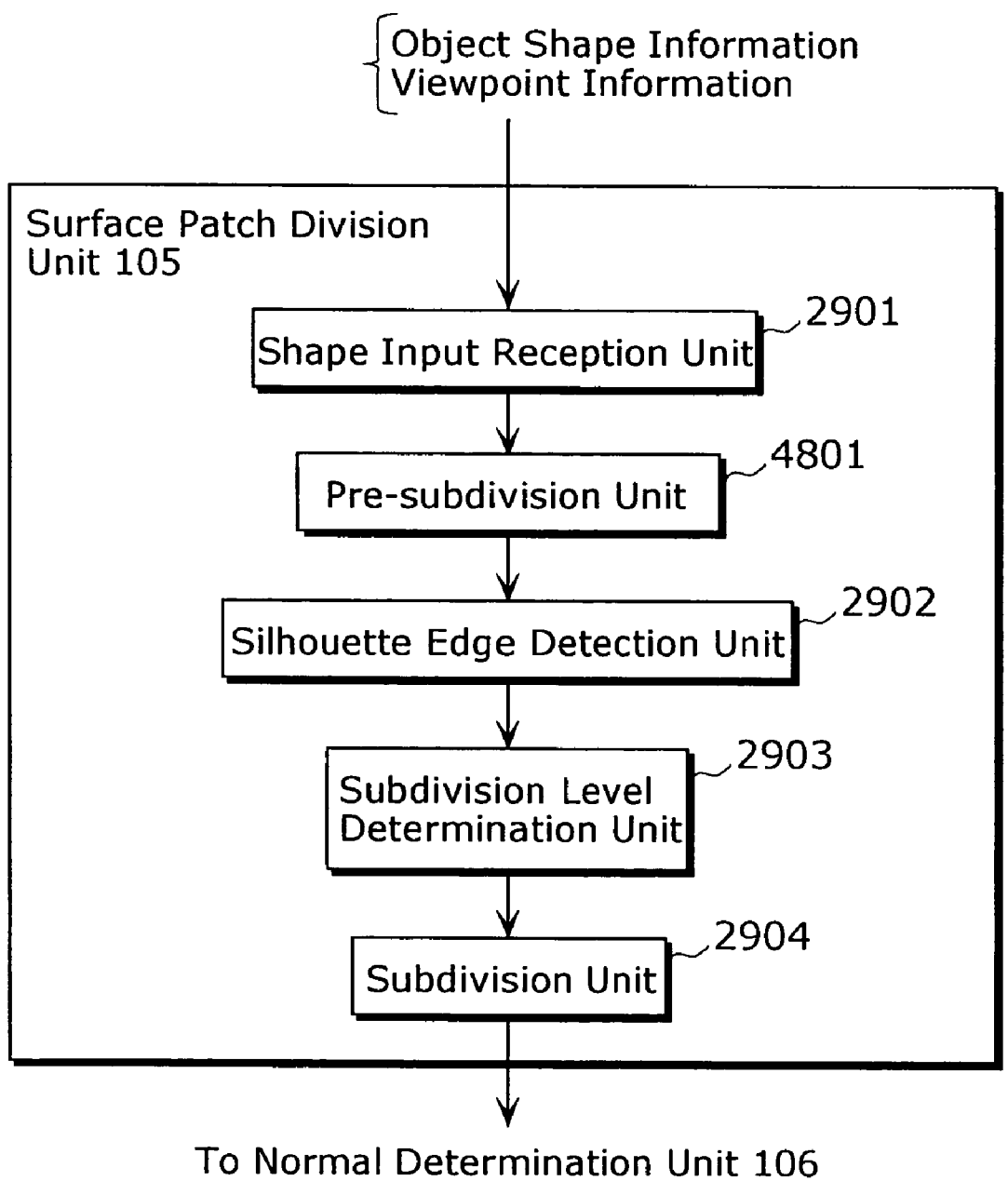
FIG. 48 is a diagram showing an example of a structure of a curved surface image processing apparatus in an eighth embodiment.
Figure 49:
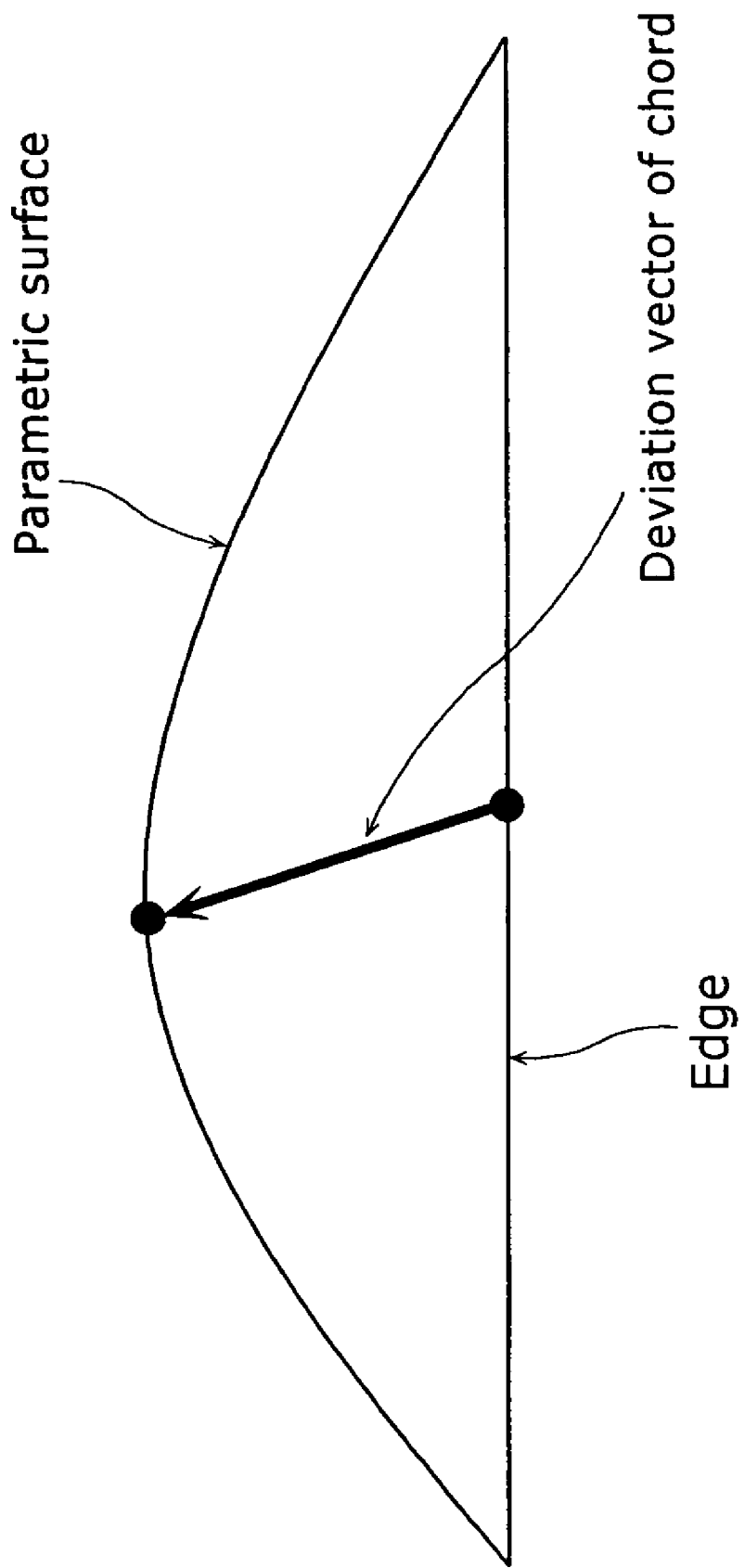
FIG. 49 is a diagram explaining how to divide a curved surface in the background art.

FIG. 48 is a diagram showing an example of a structure of the curved surface image processing apparatus 100 in the eighth embodiment. The surface patch division unit 105 in the curved surface image processing apparatus 100 in FIG. 48 includes a pre-subdivision unit 4801 in addition to the units which have been explained in the fifth embodiment. Inclusion of the pre-subdivision unit 4801 allows determination of the subdivision level of each smaller patch before determination of a subdivision level of a patch and thus allows more flexible polygon approximation of an object. The function of each unit will be explained below in detail. The same numbers are assigned to the same units as those in FIG. 29 and the explanation thereof is omitted.

The shape input reception unit 2901 receives input of the viewpoint information and the object shape information. The received data is sent to the pre-subdivision unit 4801.

If an object is made up of several patches or very large patches, the patches could be divided roughly as a whole or too finely if subdivision levels are set for the patches, and thus flexible level control is difficult. Therefore, the pre-subdivision unit 4801 conducts subdivisions of a few levels in advance before determining the subdivision level. The subdivision level determination unit 2903 determines the subdivision level of each patch which has been already subdivided. How the pre-subdivision unit 4801 determines the subdivision level is not particularly limited. It may determine the level in advance, or determine it depending on the number of patches that make up an object. Or, it may perform perspective transformation of initial patches that make up an object to calculate the signed areas thereof, and determine the subdivision level based on the minimum value among the calculated signed areas.

In a case of polygon approximation of an object using control points located on each patch among control points that define the shape of each patch, the pre-subdivision unit 4801 may perform subdivision using either a tessellation algorithm or a subdivision algorithm. Since the polygon approximation using all the control points requires the control points of the subdivided patch, subdivision using the above-mentioned de Casteljau's algorithm needs to be performed.

All the patches that make up the object are subdivided at the subdivision level determined by the above-mentioned method. Data of subdivided patches is sent to the silhouette edge detection unit 2902.

The silhouette edge detection unit 2902, the subdivision level determination unit 2903 and the subdivision unit 2904 perform the processing for all the patches subdivided by the pre-subdivision unit 4801 so as to generate polygon approximation of an object. Note that the curved surface image processing apparatus 100 in the eighth embodiment may include the maximum subdivision level determination unit 4401.

As described above, in the curved surface image processing apparatus 100 according to the eighth embodiment, the pre-subdivision unit 4801 subdivides each patch that is an element of an object at a level of some extent before the subdivision level is determined. Then, the subdivision level of the patch generated as a result of subdivision is determined using the silhouette edge detection unit 2902 and the subdivision level determination unit 2903. Therefore, subdivision levels can be flexibly set for an object that is made up of a small number of patches or very large patches, and thus it is possible to generate an object with its smooth edge portions as well as restrain the increase in the number of polygons.

(Ninth Embodiment)

Next, how the normal determination unit 106 in the curved surface image processing apparatus 100 according to the ninth embodiment calculates a normal of each control point on a Bezier surface patch will be explained. Normals are calculated for determining brightness and the like of a Bezier surface.

Figure 50:
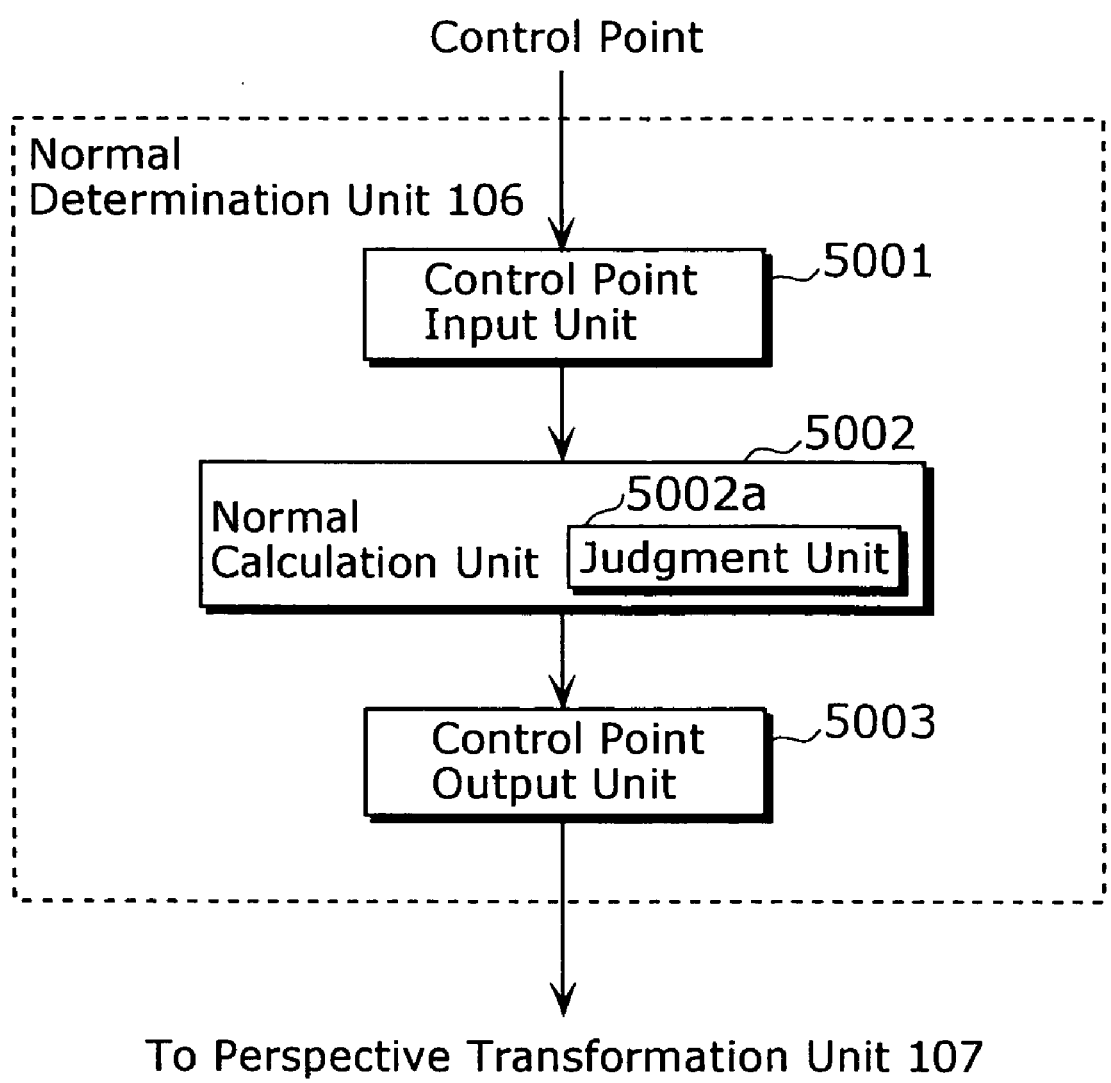
FIG. 50 is a functional block diagram showing a structure of a normal determination unit in a ninth embodiment.

FIG. 50 is a functional block diagram showing a structure of the normal determination unit 106 in the ninth embodiment.

The normal determination unit 106 includes a control point input unit 5001 for receiving a coordinate of each control point on a Bezier surface that is Bezier data transformed by the data transformation unit 105, a normal calculation unit 5002 for calculating normal vectors of each control point, and a control point output unit 5003 for outputting control points to the perspective transformation unit 107.

The normal calculation unit 5002 includes a judgment unit 5002a for judging whether a control point is degenerated or not and whether it is a control point of which normal is to be calculated or not.

Figure 51:
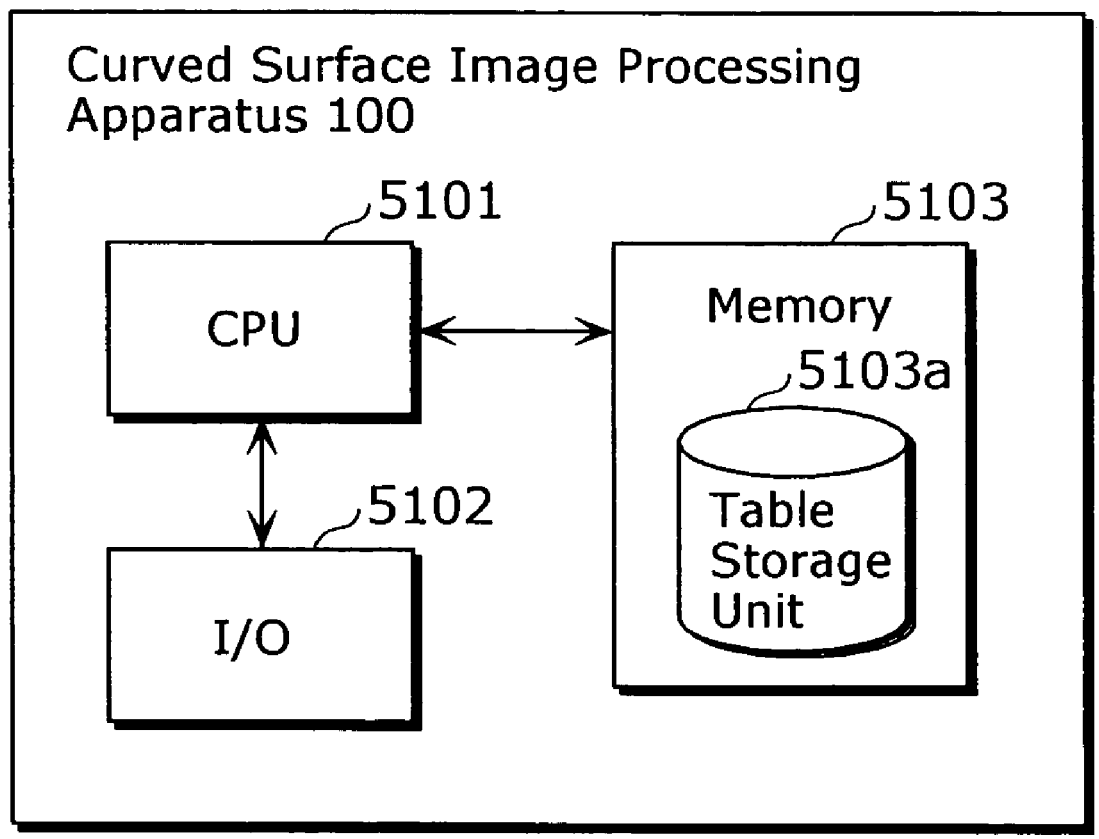
FIG. 51 is a block diagram showing another structure of the curved surface image processing apparatus in the ninth embodiment.

FIG. 51 is a block diagram showing another structure of the curved surface image processing apparatus 100, and it includes a CPU 5101 for performing actual calculation of a normal vector, an I/O 5102 and a memory 5103 for storing information on control points of a Bezier surface. The memory 5103 includes a table storage unit 5103a for storing table information as shown in FIGS. 55A and 55B.

Figure 52:
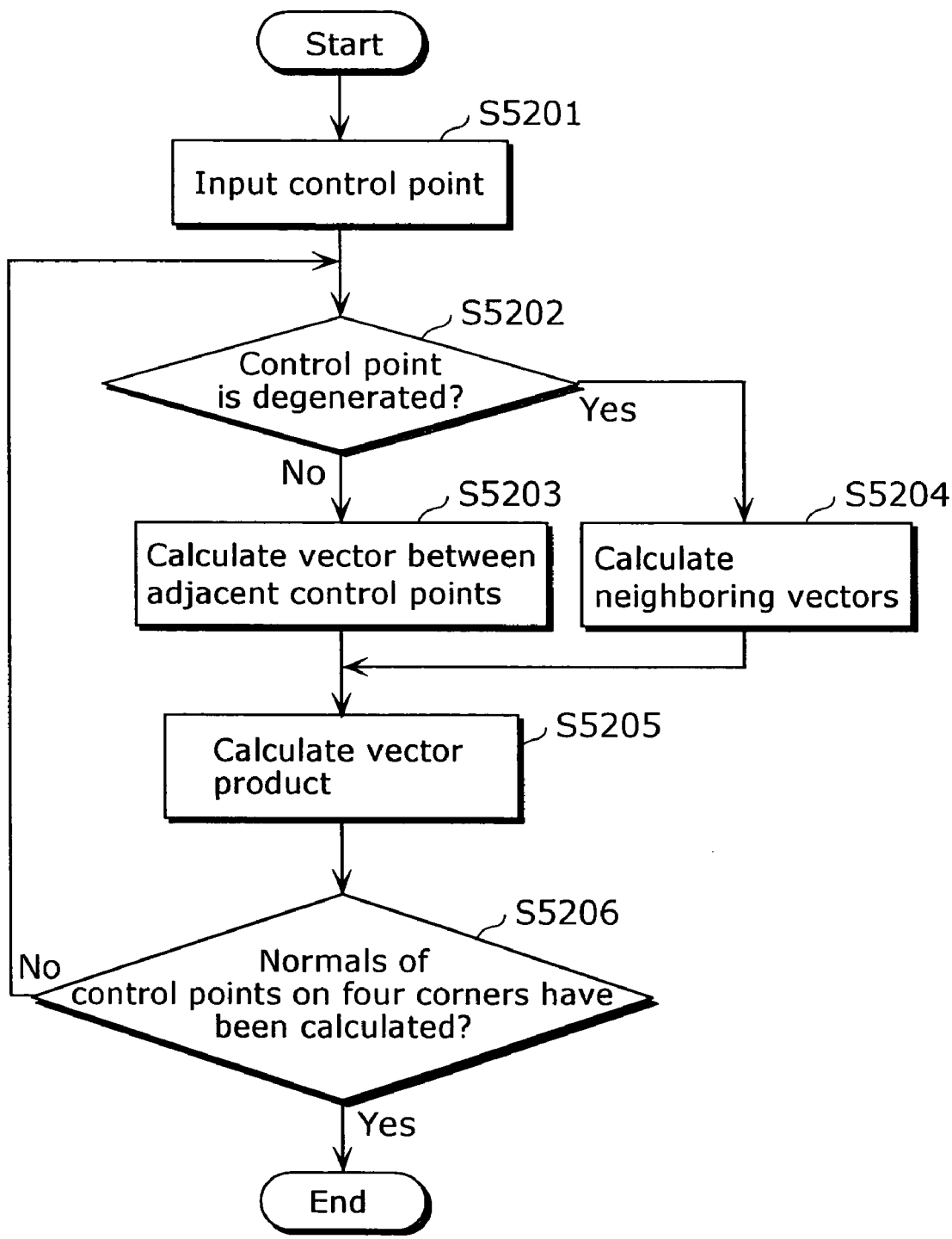
FIG. 52 is a flowchart showing procedures of processing performed by a normal calculation unit in the ninth embodiment.

FIG. 52 is a flowchart showing procedure of processing performed by the normal calculation unit 5002 according to the ninth embodiment.

First, the control point input unit 5001 receives a control point $P_{ij}$ ($0 \leq i, j \leq 3$) that forms a Bezier surface from the surface patch division unit 105 (S5201). The control point information is recorded in the memory 5103 via the I/O 5102. This control point information may be inputted on a keyboard as mentioned above, or via a reading unit of a material recorded on a storage medium.

FIGS. 55A and 55B show examples of a list 5501 of control points and their coordinates stored in the memory 5103 and a list 5502 of the control points and their normals. The control points on these lists may be inputted on the basis of every patch of a Bezier surface, or a plurality of patches.

The normal calculation unit 5002 calculates a normal vector of a control point inputted from the control point input unit 5001. For that purpose, the judgment unit 5002a judges whether or not an inputted control point $P_{00}$ is degenerated into an adjacent control point, namely, it judges whether or not the control points $P_{00}$ and $P_{01}$ or $P_{00}$ and $P_{10}$ coincides with each other (S5202).

When the control point $P_{00}$ is not degenerated into any other control point, namely it does not coincide with any other control point (NO in S5202), the normal calculation unit 5002 calculates differential vectors between these adjacent control points, namely, a differential vector ($P_{10}-P_{00}$) and a differential vector ($P_{01}-P_{00}$) (S5203).

Next, the normal calculation unit 5002 calculates a product of differential vectors ($P_{10}-P_{00}$)×($P_{01}-P_{00}$) (S5205) and normalizes it to calculate a normal of the control point $P_{00}$ (S5205). Equation 15 used for calculation of a normal in the normal calculation unit 5002 is as follows. The normal calculation unit 5002 stores the calculated normal as a normal vector on each control point in the memory 5103.

$$\frac{(P_{10}-P_{00}) \times (P_{01}-P_{00})}{|(P_{10}-P_{00}) \times (P_{01}-P_{00})|} \tag{15}$$

Next, the normal calculation unit 5002 checks whether the normals of the control points on the four corners of a Bezier surface have already calculated or not (S5206). The processing following that in S5202 is repeated when the normals of all the control points have not yet calculated (NO in S5206), whereas a series of processing is ended when the normal calculation unit 5002 have calculated the normals of all the control points (YES in S5206).

Figure 53:
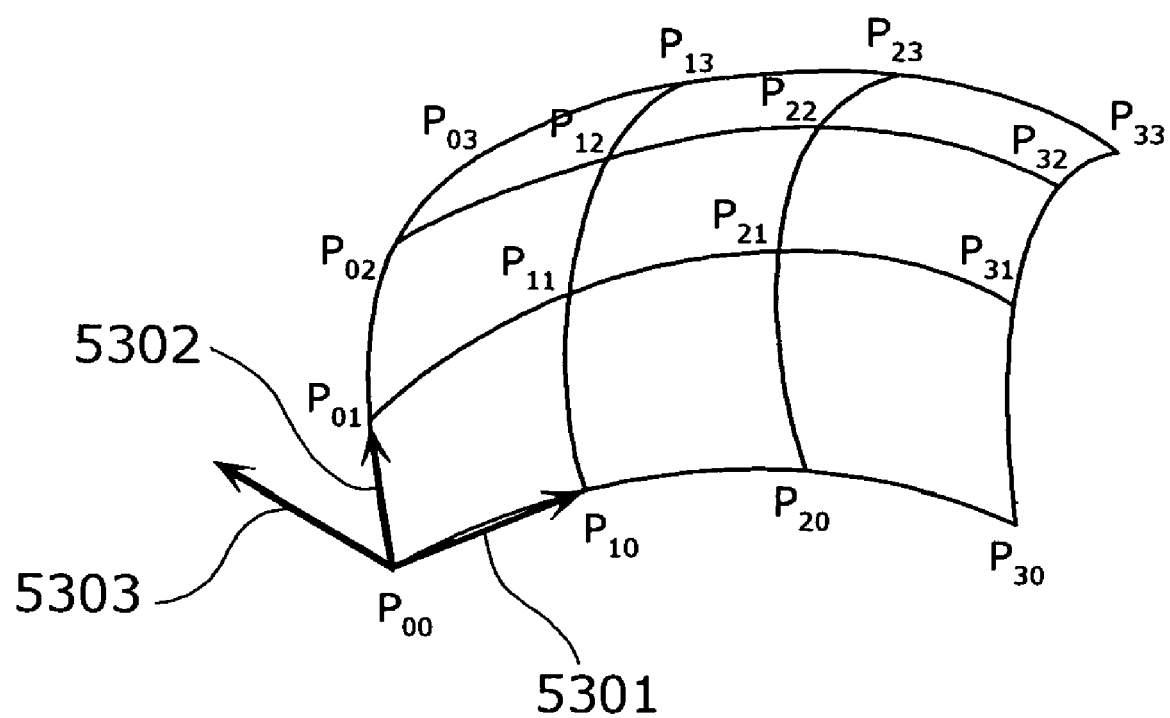
FIG. 53 is a diagram showing an example of normal vectors in a case where control points adjacent to a control point of which normal is to be calculated are not degenerated.

FIG. 53 shows an example of a differential vector 5301 ($P_{10}-P_{00}$), a differential vector 5302 ($P_{01}-P_{00}$) and a product of differential vectors 5303 ($P_{10}-P_{00}$)×($P_{01}-P_{00}$) in a case where control points adjacent to a control point of which normal is to be calculated are not degenerated.

On the other hand, the normal calculation unit 5002 calculates the normal using neighboring control points in a case where either one of the control points $P_{01}$ and $P_{10}$ or both of them are degenerated into the control point $P_{00}$ to coincide with each other (YES in S5202). This case where an adjacent control point is degenerated will be explained with reference to FIGS. 54A–54C.

When the control points $P_{00}$ and $P_{01}$ coincide and $P_{00}$ and $P_{10}$ do not coincide, the judgment unit 5002a in the normal calculation unit 5002 according to the present embodiment decides to calculate the differential vectors ($P_{10}-P_{00}$) and ($P_{11}-P_{00}$). If $P_{11}$, and $P_{00}$ coincide, the judgment unit 5002a searches the control points that do not coincide with $P_{00}$ in the order of $P_{12}, P_{13}, P_{21}, P_{22}, P_{23}, P_{31}, P_{32}$ and $P_{33}$, and then decides to calculate differential vectors between $P_{00}$ and the searched points.

Figure 54A:
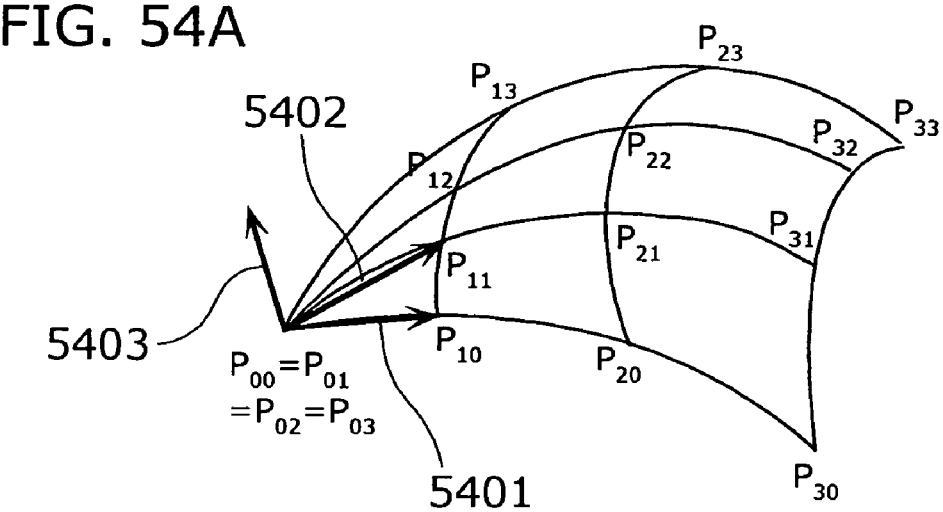
FIG. 54A is a reference diagram explaining a case where control points adjacent to a control point $P_{00}$ of which normal is to be calculated are degenerated.
Figure 54B:
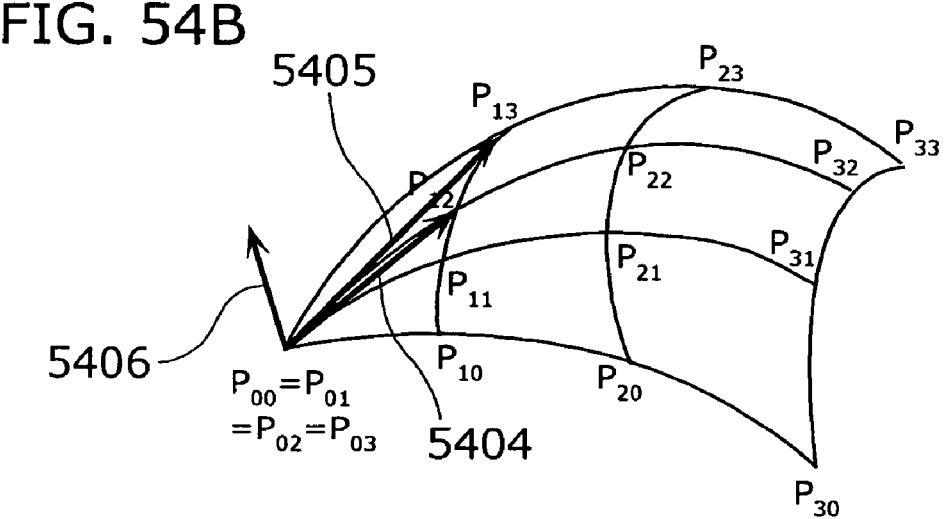
FIG. 54B is a reference diagram explaining another case where control points adjacent to a control point $P_{00}$ of which normal is to be calculated are degenerated.
Figure 54C:
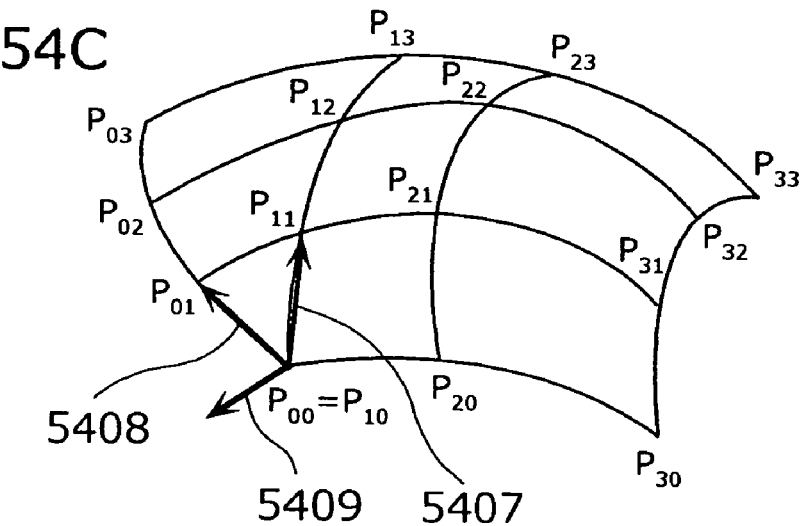
FIG. 54C is a reference diagram explaining still another case where control points adjacent to a control point $P_{00}$ of which normal is to be calculated are degenerated.

FIGS. 54A, 54B and 54C are reference diagrams for explaining the case where control points adjacent to $P_{00}$ of which normal is to be calculated are degenerated.

FIG. 54A shows a case where $P_{00}$ and $P_{01}$ coincide. A differential vector 5401 is ($P_{10}-P_{00}$), a differential vector 5402 is ($P_{11}-P_{00}$), and a vector product 5403 is ($P_{10}-P_{00}$)×($P_{11}-P_{00}$).

FIG. 54B shows a case where a normal vector of $P_{00}$ is calculated using other differential vectors when $P_{00}$ and $P_{01}$ coincide. When an angle between two differential vectors to be calculated is smaller than a predetermined angle or a distance between the control point $P_{00}$ of which normal vector is to be calculated and a control point of which differential vector is to be calculated is shorter than a predetermined distance, it is conceivable to calculate a normal vector 5406 using the differential vectors 5404 and 5405, as shown in FIG. 54B in order to calculate the accurate normal vector.

Or, when $P_{00}$ and $P_{01}$ do not coincide and $P_{00}$ and $P_{10}$ coincide as shown in FIG. 54C, the normal calculation unit 5002 calculates differential vectors 5408 ($P_{01}-P_{00}$) and 5407 ($P_{11}-P_{00}$), and as a result, a vector product 5409 ($P_{11}-P_{00}$)×($P_{01}-P_{00}$) is obtained. If $P_{11}$ and $P_{00}$ coincide, the judgment unit 5002a searches the control points that do not coincide with $P_{00}$ in the order of $P_{21}, P_{31}, P_{12}, P_{22}, P_{32}, P_{13}, P_{23}$ and $P_{33}$, and then decides to calculate differential vectors between $P_{00}$ and the searched points.

When $P_{00}, P_{01}$ and $P_{10}$ coincide, the judgment unit 5002a decides to calculate differential vectors ($P_{20}-P_{00}$) and ($P_{02}-P_{00}$). When $P_{02}$ and $P_{00}$ coincide, it searches the control points in the order of $P_{03}$, $P_{21}$, $P_{31}$, $P_{32}$ and $P_{33}$. When $P_{20}$ and $P_{00}$ coincide, it searches the control points in the order of $P_{30}$, $P_{12}$, $P_{13}$, $P_{23}$ and $P_{33}$. After searching the control points that do not coincide, the judgment unit 5002a decides to calculate differential vectors between $P_{00}$ and the searched points.

When all the control points are located on a single curve or degenerated into one point, the surface is not a Bezier surface and thus may be deleted from the surfaces to be rendered.

The control point output unit 5003 receives information on the normals calculated by the normal determination unit 106, or stores the information in the memory 203. FIG. 55B shows an example of normal data which is stored in the memory 203. FIGS. 55A and 55B show how the coordinates of control points and the normals thereof are managed separately, but it goes without saying that they can be managed together.

The control points calculated by the normal determination unit 106 according to the ninth embodiment is used for 3D image rendering processing performed by the perspective transformation unit 107 and the rendering unit 108.

As described above, in the normal determination unit 106 according to the ninth embodiment, the normal calculation unit 5002 can calculate normal vectors of control points located on a Bezier surface correctly and efficiently, even if control points are degenerated into an adjacent control point of which normal is to be calculated. When a 3D original image is rendered using only control points located on a Bezier surface, normals of control points inside the surface do not need to be calculated.

INDUSTRIAL APPLICABILITY

The curved surface image processing apparatus according to the present invention can be used as a curved surface image processing apparatus for rendering a 3D object using free-form surfaces such as NURBS surfaces and Bezier surfaces in the field of 3D computer graphics. For example, the curved surface image processing apparatus according to the present invention has a number of applications in entertainment apparatuses equipped with screens for displaying 3D objects such as mobile terminals, car navigation devices, portable game machines and TV sets.

What is claimed is:

1. A curved surface image processing apparatus for rendering a 3D object on a screen using NURBS data that is shape data of the 3D object, the apparatus comprising:
   a data transformation unit operable to perform parameter transformation on the NURBS data to transform the NURBS data into rational Bezier control points, the NURBS data forming a NURBS curve and a NURBS surface, and the rational Bezier control points forming a rational Bezier curve and a rational Bezier surface;
   a curved surface division unit operable to subdivide a rational Bezier surface patch into a plurality of surface patches, the rational Bezier surface patch being made up of the rational Bezier control points transformed by the data transformation unit; and
   a rendering unit operable to render the 3D object using the plurality of surface patches,
   wherein the NURBS data includes control points and knot vectors, and
   the data transformation unit includes:
   a knot insertion unit operable to perform an operation of inserting knots into the knot vectors using a knot insertion algorithm; and
   a control point trimming unit operable to delete unnecessary control points in control points that are generated by the operation performed by the knot insertion unit.

2. The curved surface image processing apparatus according to claim 1,
   wherein the knot insertion unit searches for an index of a knot located at a particular position on a final knot vector in the process of transforming an initial knot vector and initial control points included in the NURBS data into the final knot vector and final control points that represent the rational Bezier control points, and
   the control point trimming unit deletes a particular control point in the final control points using the searched index.

3. The curved surface image processing apparatus according to claim 1,
   wherein the control point trimming unit deletes (k−3) number of control points (Q[0], Q[1], . . . , Q[k−4]) in final control points when a degree of the NURBS data is 3, the final control points are (Q[0], Q[1], . . . , Q[I−1]) where I is an integer, a final knot vector is (u[0], u[1], . . . , u[I+3]), and values of (k−j+1) number of knots in (u[j], . . . , u[3], . . . , u[k]) are equal to a value of a knot u[3] and are multiplexed at a multiplicity level 3 or higher, said knot u[3] being a starting knot at which rendering of the NURBS data starts.

4. The curved surface image processing apparatus according to claim 1,
   wherein the control point trimming unit deletes (I−j) number of control points (Q[j], . . . , Q[I−2], Q[I−1]) in final control points when a degree of the NURBS data is 3, the final control points are (Q[0], . . . , Q[I−2], Q[I−1]) where I is an integer, a final knot vector is (u[0], . . . , u[I+2], u[I+3]), and values of (k−j+1) number of knots in (u[j], . . . , u[I], . . . , u[k]) are equal to a value of a knot u[I] and are multiplexed at a multiplicity level 3 or higher, said knot u[I] being an ending knot at which rendering of the NURBS data ends.

5. The curved surface image processing apparatus according to claim 1,
   wherein each of the control points has a weight, and
   the knot insertion unit controls the control points in a homogeneous coordinate system.

6. The curved surface image processing apparatus according to claim 1,
   wherein the knot insertion unit inserts the knot so that each element in a particular range of the knot vector is multiplexed at a particular multiplicity level.

7. The curved surface image processing apparatus according to claim 1,
   wherein the surface patches are a plurality of polygon data, and
   the rendering unit renders the 3D object by transforming the plurality of polygon data into pixel data.

8. The curved surface image processing apparatus according to claim 1,
   wherein the curved surface division unit further includes:
   an area calculation unit operable to calculate a signed area of 2D graphics obtained by performing perspective transformation on the rational Bezier control points that define a shape of each of the surface patches that form the object; and
   a detection unit operable to detect whether said each surface patch is a silhouette edge forming patch or not based on a value of the signed area, said silhouette edge forming patch being a surface patch that forms a contour of the object.

9. The curved surface image processing apparatus according to claim 8,
wherein the curved surface division unit further includes a subdivision level determination unit operable to determine a subdivision level of said each surface patch depending on a result of the detection of the silhouette edge forming patch and the value of the signed area of said each surface patch on a screen calculated by the area calculation unit.

10. The curved surface image processing apparatus according to claim 9,
wherein the subdivision level determination unit further specifies a maximum value of the signed area calculated by the area calculation unit and determines the subdivision level of the silhouette edge forming patch based on the specified maximum value of the signed area.

11. The curved surface image processing apparatus according to claim 9,
wherein the area calculation unit calculates signed areas of 2D graphics obtained by performing perspective transformation on all the control points that define the shape of each of the surface patches that form the object, and
the subdivision level determination unit determines the subdivision level of the silhouette edge forming patch based on a sum of absolute values of the signed areas of the 2D graphics calculated by the area calculation unit.

12. The curved surface image processing apparatus according to claim 9,
wherein the subdivision level determination unit determines the subdivision levels in the directions of a first axis and a second axis separately, the first axis and the second axis defining each of the surface patches that form the object.

13. The curved surface image processing apparatus according to claim 12,
wherein the area calculation unit further calculates signed areas of 2D graphics adjacent to each other in the directions of the first axis and the second axis respectively, with reference to said 2D graphics, in 2D graphics obtained by performing perspective transformation on all the control points that define the shape of each of the surface patches that form the object, and
the subdivision level determination unit determines the subdivision level in the first axis direction according to a ratio between a maximum value and a minimum value of the calculated signed areas of the 2D graphics adjacent to each other in the first axis direction, and determines the subdivision level in the second axis direction according to a ratio between a maximum value and a minimum value of the calculated signed areas of the 2D graphics adjacent to each other in the second axis direction.

14. The curved surface image processing apparatus according to claim 9,
wherein the curved surface division unit further includes a pre-subdivision unit operable to perform subdivision of Level 1 or higher for each of the surface patches that form the object before the subdivision level determination unit determines the subdivision level of said each surface patch.

15. The curved surface image processing apparatus according to claim 9,
wherein the subdivision level determined by the subdivision level determination unit is defined as Level 1 when each of the surface patches that form the object is subdivided one time both in the first axis direction and the second axis direction or in either the first axis direction or the second axis direction using a subdivision algorithm, said Level being the number of the subdivisions.

16. The curved surface image processing apparatus according to claim 8,
wherein the area calculation unit calculates the signed area of the 2D graphics obtained by performing perspective transformation on rational Bezier control points located on each of the surface patches among the rational Bezier control points, and
the detection unit detects whether said each patch is a silhouette edge forming patch or not using the signed area.

17. The curved surface image processing apparatus according to claim 8,
wherein the detection unit further compares plus or minus sign of the calculated signed area of 2D graphics of a first surface patch with a plus or minus sign of a signed area of 2D graphics of a surface patch adjacent to the first surface patch, and detects that each of the surface patches is a silhouette edge forming patch when the signs are opposite.

18. The curved surface image processing apparatus according to claim 8,
wherein the detection unit detects whether said each patch is a silhouette edge forming patch or not using as an index the calculated signed area of the 2D graphics obtained by performing perspective transformation on all the control points that define the shape of each of the surface patches that form the object.

19. The curved surface image processing apparatus according to claim 8,
wherein the area calculation unit first calculates signed areas of 2D graphics obtained by performing perspective transformation on all the control points that define the shape of each of the surface patches that form the object, and then calculates total sums of plus signed areas and minus signed areas separately, and
the detection unit detects that said each surface patch is not a silhouette edge forming patch when either one of the total sums calculated by the area calculation unit is 0.

20. The curved surface image processing apparatus according to claim 8,
wherein the curved surface division unit further includes a maximum subdivision level determination unit operable to predetermine a maximum subdivision level of each of the surface patches that form the object.

21. The curved surface image processing apparatus according to claim 20,
wherein the maximum subdivision level determination unit determines the maximum subdivision level of each of the surface patches according to a ratio between a distance and a length, said distance being a distance between a plane that is formed by control points which are located on said each surface patch and a control point which is not located on said each surface patch among the control points that define the shape of said each surface patch, and said length being a length of a diagonal line connecting the control points located on said each surface patch.

22. The curved surface image processing apparatus according to claim 20,
wherein the maximum subdivision level determination unit calculates a length of a line segment connecting the control points which are located on the surface patch among the control points that define the shape of each of the surface patches that form the object, calculates a sum of distances between control points adjacent to each other in a sequence of control points, said sequence of control points including the control points which are located on the surface patch and control points which are not located on the surface patch but located between said control points on the patch, and determines the maximum subdivision level of each surface patch according to a ratio between the calculated sum of the distances and the length of the line segment.

23. The curved surface image processing apparatus according to claim 8,
wherein the surface patches that form the object are rational Bezier surfaces.

24. The curved surface image processing apparatus according to claim 1, further comprising a normal calculation unit operable to calculate a normal of each of four corner control points using the rational Bezier control points of the rational Bezier surface,
wherein the normal calculation unit includes:
a selection unit operable to select each of said four corner control points, and select two control points adjacent to the selected corner control point of which normal is to be calculated, in order to calculate normals of all the four corner control points on the surface patch; and
a calculation unit operable to calculate the normal of said selected corner control point by calculating differential vectors between said selected corner control point and said adjacent two control points respectively, calculating a product of the calculated two differential vectors and normalizing the product.

25. The curved surface image processing apparatus according to claim 24,
wherein in order to calculate the normals of said four corner control points on the rational Bezier surface, the selection unit selects said each of four corner control points, and selects one or two other control points which are adjacent to but not degenerated into said selected corner control point when at least one of the two adjacent control points is degenerated into the selected corner control point on the same coordinate, and
the calculation unit calculates the normal of said selected corner control point by calculating differential vectors between said selected corner control point and said adjacent two control points selected by the selection unit respectively, calculating a product of the calculated two differential vectors and normalizing the product, and proceeds with the calculation until said two adjacent control points are not degenerated into said selected corner control point.

26. The curved surface image processing apparatus according to claim 24,
wherein in order to calculate the normals of the four corner control points on the rational Bezier surface, the selection unit selects another control point which is adjacent but not degenerated when the control point adjacent to said selected corner control point of which normal is to be calculated is degenerated into said selected corner control point.

27. The curved surface image processing apparatus according to claim 24,
wherein the selection unit selects still another control point when an angle between the two differential vectors calculated by the calculation unit is a predetermined angle or less.

28. The curved surface image processing apparatus according to claim 24,
wherein the selection unit does not select a control point which is located at a predetermined or shorter distance from the selected corner control point of which normal is to be calculated.

29. The curved surface image processing apparatus according to claim 24,
wherein in order to calculate the normals of the four corner control points on the rational Bezier surface, the selection unit selects one of the four corner control points (P00) and two control points (P01 and P10) adjacent to said selected corner control point when the coordinates of said control points (P00, P01 and P10) are different,
the calculation unit calculates the normal of said selected corner control point (P00) by calculating differential vectors between said selected corner control point (P00) and said two adjacent control points (P01 and P10) respectively, calculating a product of the two differential vectors and normalizing the product,
the selection unit selects a neighboring control point that is not degenerated when at least one of the coordinates of the two adjacent control points (P01 and P10) is same as the coordinate of said selected corner control point, and
the calculation unit calculates the normal of said selected corner control point (P00) by calculating a differential vector between said selected corner control point (P00) and the neighboring control point and a differential vector between said selected corner control point and either one of the two control points (P01 and P10) that is not degenerated, calculating a product of said calculated two differential vectors and normalizing the product.

30. A curved surface image processing apparatus for rendering a 3D object on a screen using NURBS data that is shape data of the 3D object, comprising:
a data transformation unit operable to perform parameter transformation on the NURBS data to transform said NURBS data into rational Bezier control points, said NURBS data forming a NURBS curve and a NURBS surface, and said rational Bezier control points forming a rational Bezier curve and a rational Bezier surface;
a curved surface division unit operable to subdivide a rational Bezier surface patch into a plurality of surface patches, said rational Bezier surface patch being made up of the rational Bezier control points transformed by the data transformation unit; and
a rendering unit operable to render the 3D object using said plurality of surface patches,
wherein the curved surface division unit further includes:
an area calculation unit operable to calculate a signed area of 2D graphics obtained by performing perspective transformation on the rational Bezier control points that define a shape of each of the surface patches that form the object;

a detection unit operable to detect whether each of the surface patches is a silhouette edge forming patch or not based on a value of the signed area, said silhouette edge forming patch being a surface patch that forms a contour of the object, and a subdivision level determination unit operable to determine a subdivision level of said each surface patch depending on a result of the detection of the silhouette edge forming edge and a value of the signed area of said each surface patch on a screen calculated by the area calculation unit.

31. The curved surface image processing apparatus according to claim 30, wherein the detection unit further compares plus or minus sign of the calculated signed area of 2D graphics of a first surface patch with a plus or minus sign of a signed area of 2D graphics of a surface patch adjacent to the first surface patch, and detects that each of the surface patches is a silhouette edge forming patch when the signs are opposite.

32. A curved surface image processing method for rendering a 3D object on a screen using NURBS data that is shape data of the 3D object, the method comprising:

a data transformation step of performing parameter transformation on the NURBS data to transform the NURBS data into rational Bezier control points, the NURBS data forming a NURBS curve and a NURBS surface, and the rational Bezier control points forming a rational Bezier curve and a rational Bezier surface;

a curved surface division step of subdividing a rational Bezier surface patch into a plurality of surface patches, the rational Bezier surface patch being made up of the rational Bezier control points transformed in the data transformation step; and a rendering step of rendering the 3D object using the plurality of surface patches, wherein the NURBS data includes control points and knot vectors, and the data transformation step includes:

a knot insertion step of performing an operation of inserting knots into the knot vectors using a knot insertion algorithm; and a control point trimming step of deleting unnecessary control points in control points that are generated by the operation performed in the knot insertion step.

33. The curved surface image processing method according to claim 32, wherein the curved surface division step further includes:

an area calculation step of calculating a signed area of 2D graphics obtained by performing perspective transformation on the rational Bezier control points that define a shape of each of the surface patches that form the object; and a detection step of detecting whether said each surface patch is a silhouette edge forming patch or not based on a value of the signed area, said silhouette edge forming patch being a surface patch that forms a contour of the object.

34. The curved surface image processing method according to claim 33, wherein the curved surface division step further includes a subdivision level determination step of determining a subdivision level of said each surface patch depending on a result of the detection of the silhouette edge forming patch and the value of the signed area of said each surface patch on a screen calculated in the area calculation step.

35. The curved surface image processing method according to claim 32 further comprising a normal calculation step of calculating a normal of each of four corner control points using the rational Bezier control points of the rational Bezier surface, wherein the normal calculation step includes:

a selection step of selecting each of four corner control points, and selecting two control points adjacent to said selected corner control point of which normal is to be calculated, in order to calculate normals of all the four corner control points on the surface patch; and a calculation step of calculating the normal of said selected corner control point by calculating differential vectors between said selected corner control point and said adjacent two control points respectively, calculating a product of the calculated two differential vectors and normalizing the product, and proceeding with the calculation until said two adjacent control points are not degenerated into said selected corner control point.

36. A program embodied on a computer-readable medium, the program causing a curved surface image processing apparatus to perform a method for rendering a 3D object on a screen using NURBS data that is shape data of the 3D object, the method comprising:

a data transformation step of performing parameter transformation on the NURBS data to transform the NURBS data into rational Bezier control points, the NURBS data forming a NURBS curve and a NURBS surface, and the rational Bezier control points forming a rational Bezier curve and a rational Bezier surface;

a curved surface division step of subdividing a rational Bezier surface patch into a plurality of surface patches, the rational Bezier surface patch being made up of the rational Bezier control points transformed in the data transformation step; and a rendering step of rendering the 3D object using said plurality of surface patches, wherein the NURBS data includes control points and knot vectors, and the data transformation step includes:

a knot insertion step of performing an operation of inserting knots into said knot vectors using a knot insertion algorithm; and a control point trimming step of deleting unnecessary control points in control points that are generated by the operation performed in the knot insertion step.

37. The program according to claim 36, wherein the curved surface division step further includes:

an area calculation step of calculating a signed area of 2D graphics obtained by performing perspective transformation on the rational Bezier control points that define a shape of each of the surface patches that form the object; and a detection step of detecting whether said each surface patch is a silhouette edge forming patch or not based on a value of the signed area, said silhouette edge forming patch being a surface patch that forms a contour of the object.

38. The program according to claim 37, wherein the curved surface division step further includes a subdivision level determination step of determining a subdivision level of said each surface patch depending on a result of the detection of the silhouette edge forming patch and the value of the signed area of said each surface patch on a screen calculated in the area calculation step.

39. The program according to claim 36, further comprising a normal calculation step of calculating a normal of each of four corner control points using the rational Bezier control points of the rational Bezier surface, wherein the normal calculation step includes:

a selection step of selecting each of said four corner control points, and selecting two control points adjacent to said selected corner control point of which normal is to be calculated, in order to calculate normals of all the four corner control points on the surface patch; and a calculation step of calculating the normal of said selected corner control point by calculating differential vectors between said selected corner control point and said adjacent two control points respectively, calculating a product of the calculated two differential vectors and normalizing the product, and proceeding with the calculation until said two adjacent control points are not degenerated into said selected corner control point.

* * * * *